United States Patent
Suda et al.

(10) Patent No.: US 7,108,306 B2
(45) Date of Patent: Sep. 19, 2006

(54) ELECTRIC STOWING SYSTEM FOR VEHICLE SEAT

(75) Inventors: Hirohide Suda, Wako (JP); Tetsuya Kayumi, Wako (JP); Taizou Kikuchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 74 days.

(21) Appl. No.: 10/518,659

(22) PCT Filed: Dec. 9, 2003

(86) PCT No.: PCT/JP03/15711

§ 371 (c)(1),
(2), (4) Date: Dec. 16, 2004

(87) PCT Pub. No.: WO2004/060713

PCT Pub. Date: Jul. 22, 2004

(65) Prior Publication Data

US 2005/0236881 A1   Oct. 27, 2005

(30) Foreign Application Priority Data

| Dec. 26, 2002 | (JP) | ............................. 2002-378062 |
| Dec. 26, 2002 | (JP) | ............................. 2002-378154 |
| Dec. 26, 2002 | (JP) | ............................. 2002-378190 |
| Dec. 26, 2002 | (JP) | ............................. 2002-378213 |
| Jun. 30, 2003 | (JP) | ............................. 2003-188711 |
| Jul. 8, 2003 | (JP) | ............................. 2003-193843 |
| Jul. 8, 2003 | (JP) | ............................. 2003-193857 |
| Jul. 8, 2003 | (JP) | ............................. 2003-193876 |

(51) Int. Cl.
*B60N 2/02* (2006.01)

(52) U.S. Cl. ................................. 296/65.08; 296/65.09

(58) Field of Classification Search ............. 296/65.08, 296/65.09; 297/15
See application file for complete search history.

(56) References Cited

U.S. PATENT DOCUMENTS

| 3,227,488 | A |   | 1/1966 | Kosbab et al. |
| 4,880,274 | A | * | 11/1989 | Ichikawa ..................... 297/362 |
| 5,199,764 | A | * | 4/1993 | Robinson ............... 297/362.11 |
| 5,269,581 | A |   | 12/1993 | Odagaki et al. |
| 5,660,437 | A | * | 8/1997 | Bauer et al. ........... 297/344.15 |
| 5,702,155 | A | * | 12/1997 | Ito ........................ 297/362.11 |
| 5,788,329 | A | * | 8/1998 | Pilarczyk et al. ...... 297/354.13 |
| 5,860,702 | A | * | 1/1999 | Pilarczyk et al. ...... 297/354.13 |
| 5,868,451 | A | * | 2/1999 | Uno et al. ..................... 296/66 |
| 5,975,612 | A | * | 11/1999 | Macey et al. ................. 296/66 |
| 6,131,999 | A | * | 10/2000 | Piekny et al. .......... 297/378.12 |
| 6,231,101 | B1 | * | 5/2001 | Kamida et al. .......... 296/65.09 |
| 6,318,784 | B1 | * | 11/2001 | Nishide ................... 296/65.09 |
| 6,416,107 | B1 | * | 7/2002 | Kanaguchi et al. ...... 296/65.09 |
| 6,435,589 | B1 | * | 8/2002 | Shimizu et al. .......... 296/65.09 |
| 6,464,297 | B1 | * | 10/2002 | Garrido et al. ............... 296/66 |

(Continued)

*Primary Examiner*—Kiran B. Patel
(74) *Attorney, Agent, or Firm*—Hamre, Schumann, Mueller & Larson, P.C.

(57) ABSTRACT

The invention provides a seat stowing system for stowing in a floor recess (16) a seat (15) with a seat back (22, 23) tipped forward to fold it against a seat cushion (21). The stowing system (20) includes a seat back forward-tipping mechanism for automatically tipping the seat back forward and a swinging mechanism (30) for automatically swinging the folded seat back and the seat cushion as one. The seat back forward-tipping mechanism and the swinging mechanism are drive-controlled by a control unit, and the operation of stowing the seat in the floor recess is thus made electric.

21 Claims, 45 Drawing Sheets

U.S. PATENT DOCUMENTS

| | | | |
|---|---|---|---|
| 6,637,819 B1 * | 10/2003 | Tame | 296/65.08 |
| 6,682,120 B1 * | 1/2004 | Kamida et al. | 296/65.09 |
| 6,705,658 B1 * | 3/2004 | Jach et al. | 296/65.09 |
| 6,746,083 B1 * | 6/2004 | Drew et al. | 296/65.09 |
| 6,793,265 B1 * | 9/2004 | Kamida et al. | 296/65.09 |
| 6,837,530 B1 * | 1/2005 | Rudberg et al. | 296/65.09 |
| 6,896,309 B1 * | 5/2005 | Satoh et al. | 296/65.09 |
| 6,962,384 B1 * | 11/2005 | Rhodes et al. | 296/66 |
| 6,983,985 B1 * | 1/2006 | McGowan et al. | 296/66 |
| 7,040,685 B1 * | 5/2006 | Sumida et al. | 296/65.09 |
| 2001/0052718 A1 * | 12/2001 | Sugiura et al. | 297/15 |
| 2003/0184112 A1 * | 10/2003 | Furui | 296/65.01 |
| 2005/0017564 A1 * | 1/2005 | Kayumi | 297/378.1 |
| 2005/0168035 A1 * | 8/2005 | Boudinot | 297/378.1 |

\* cited by examiner

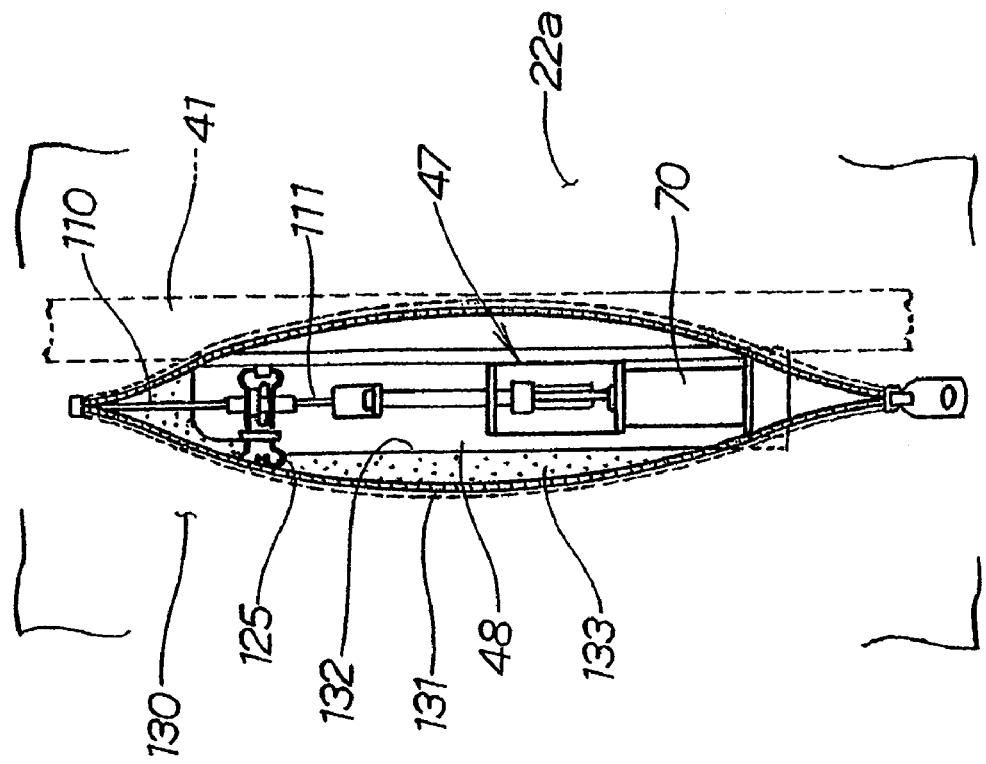
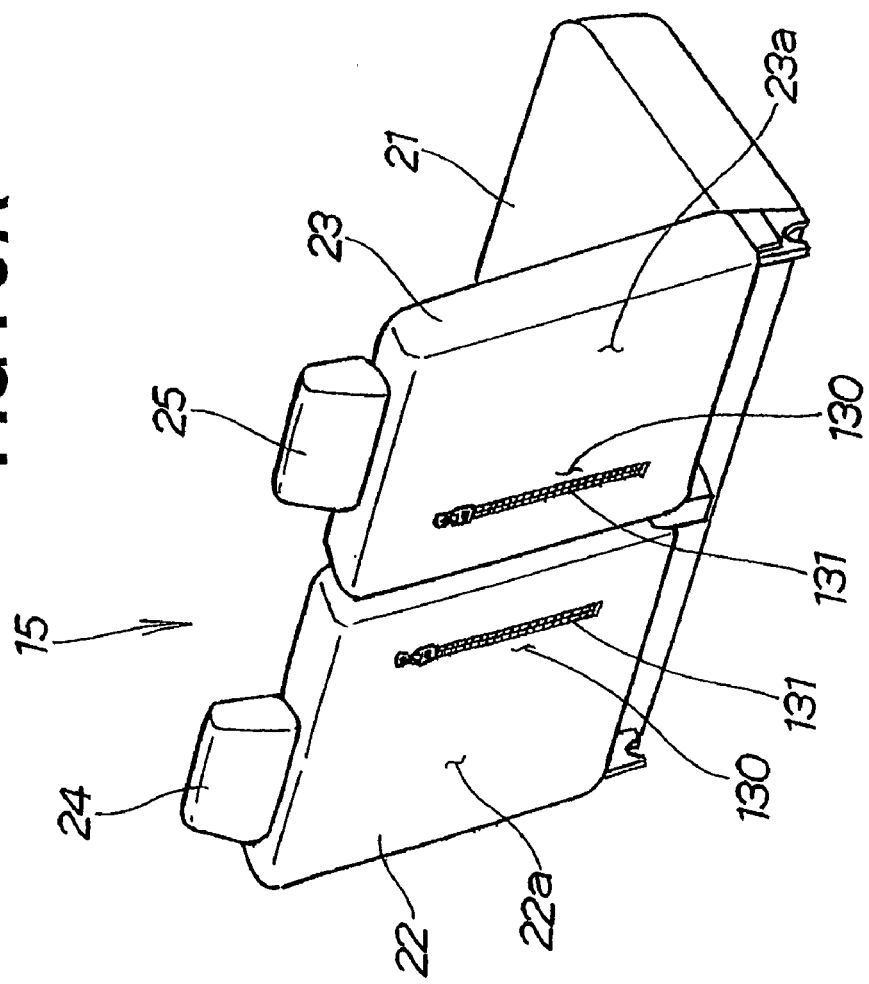

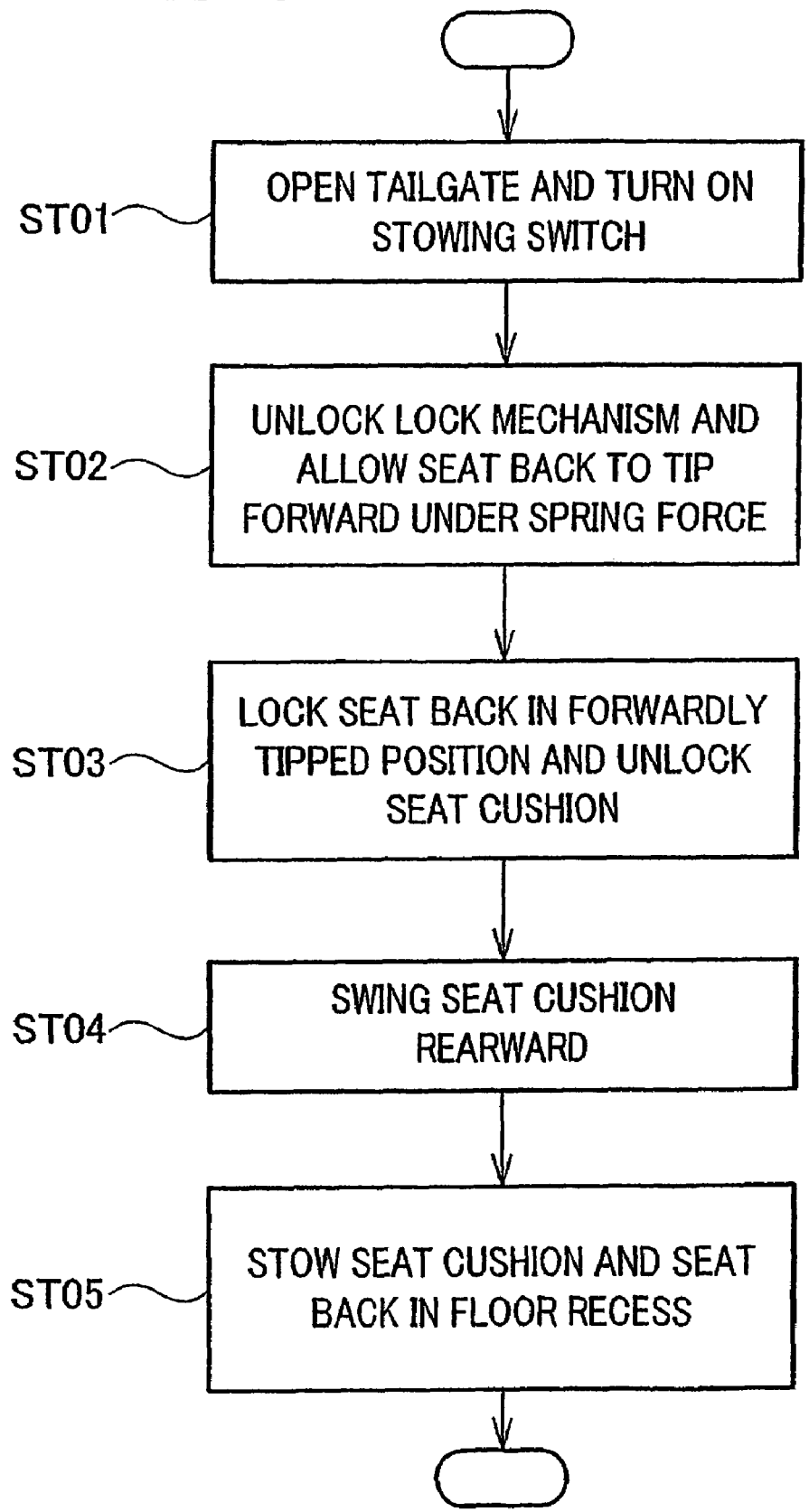

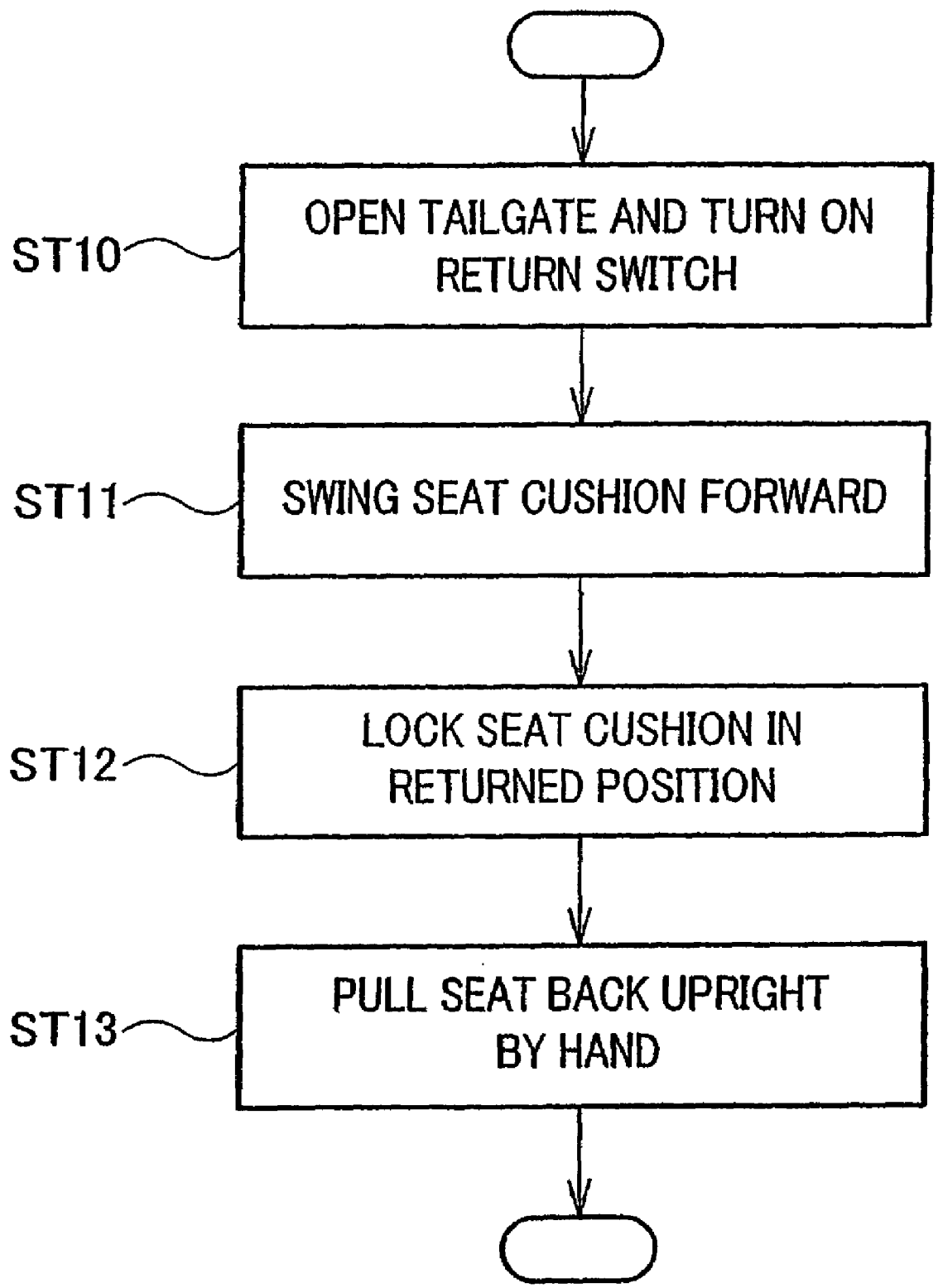

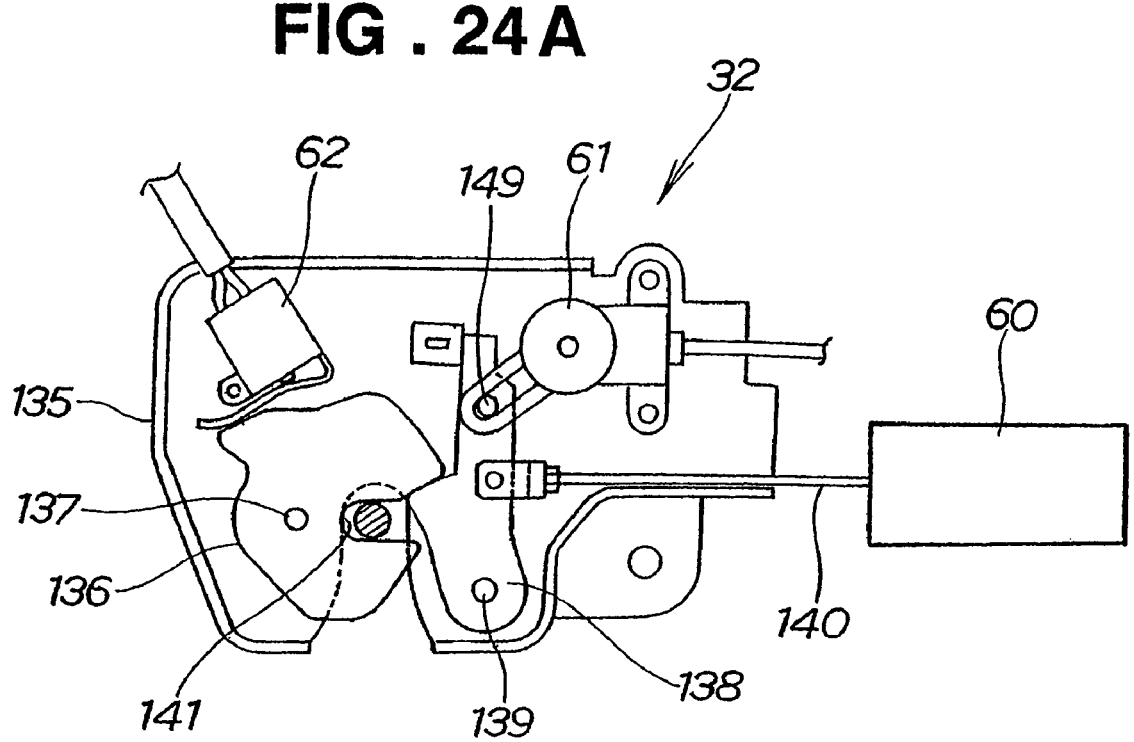
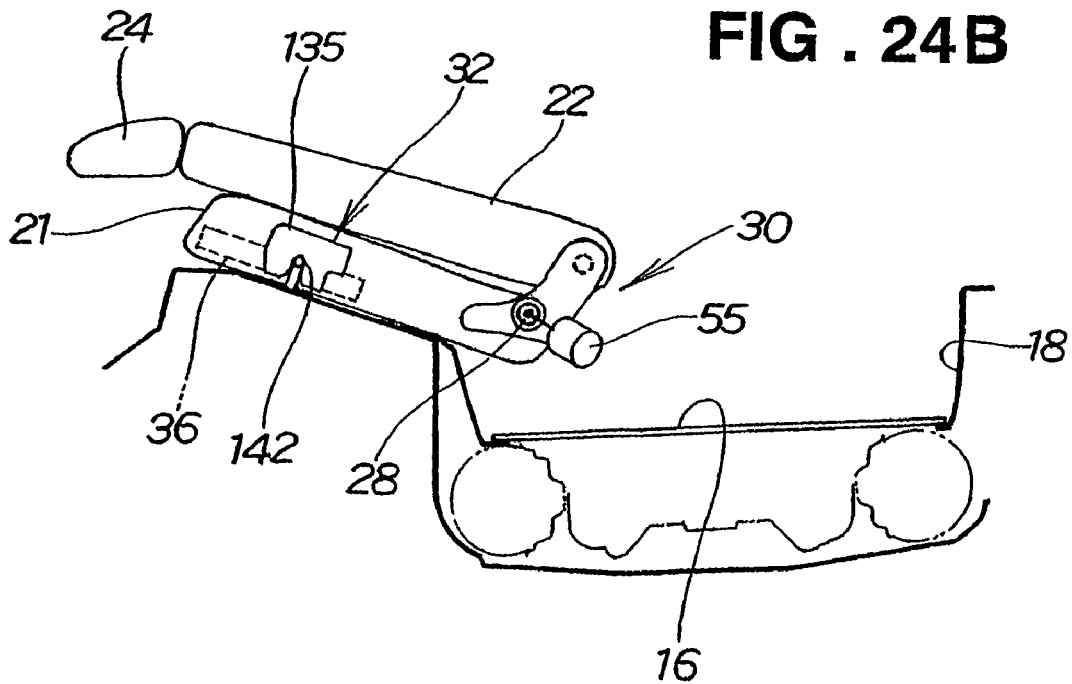

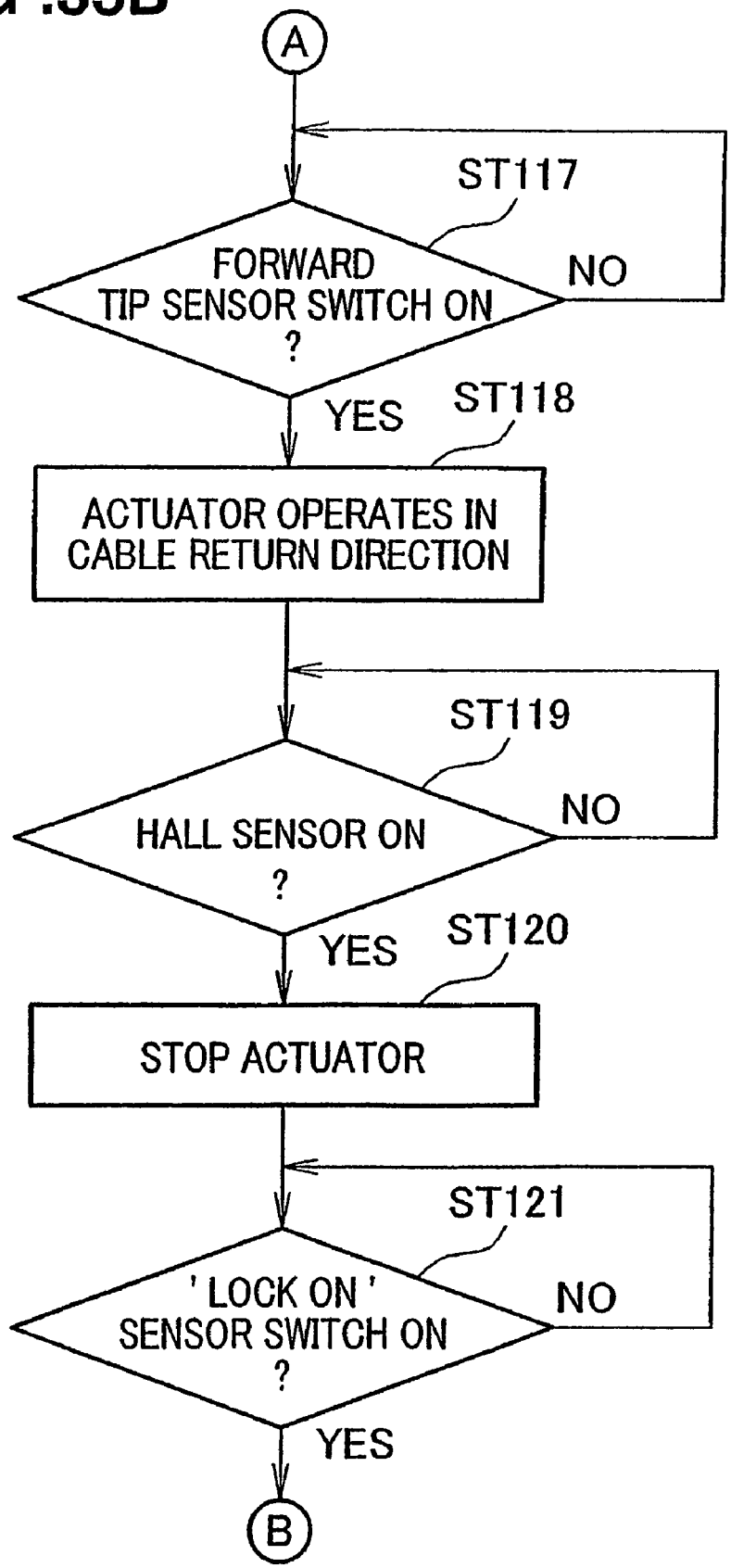

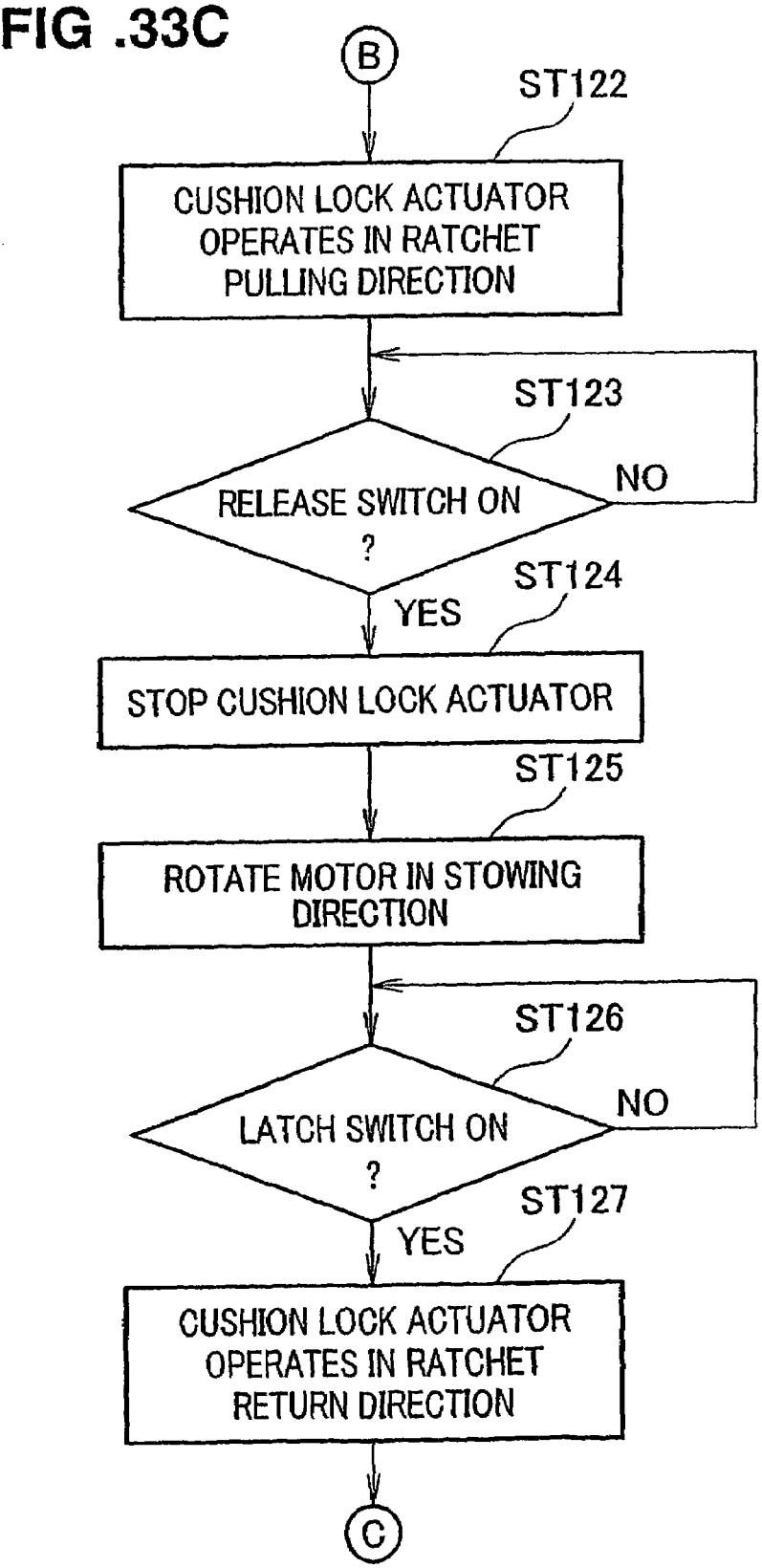

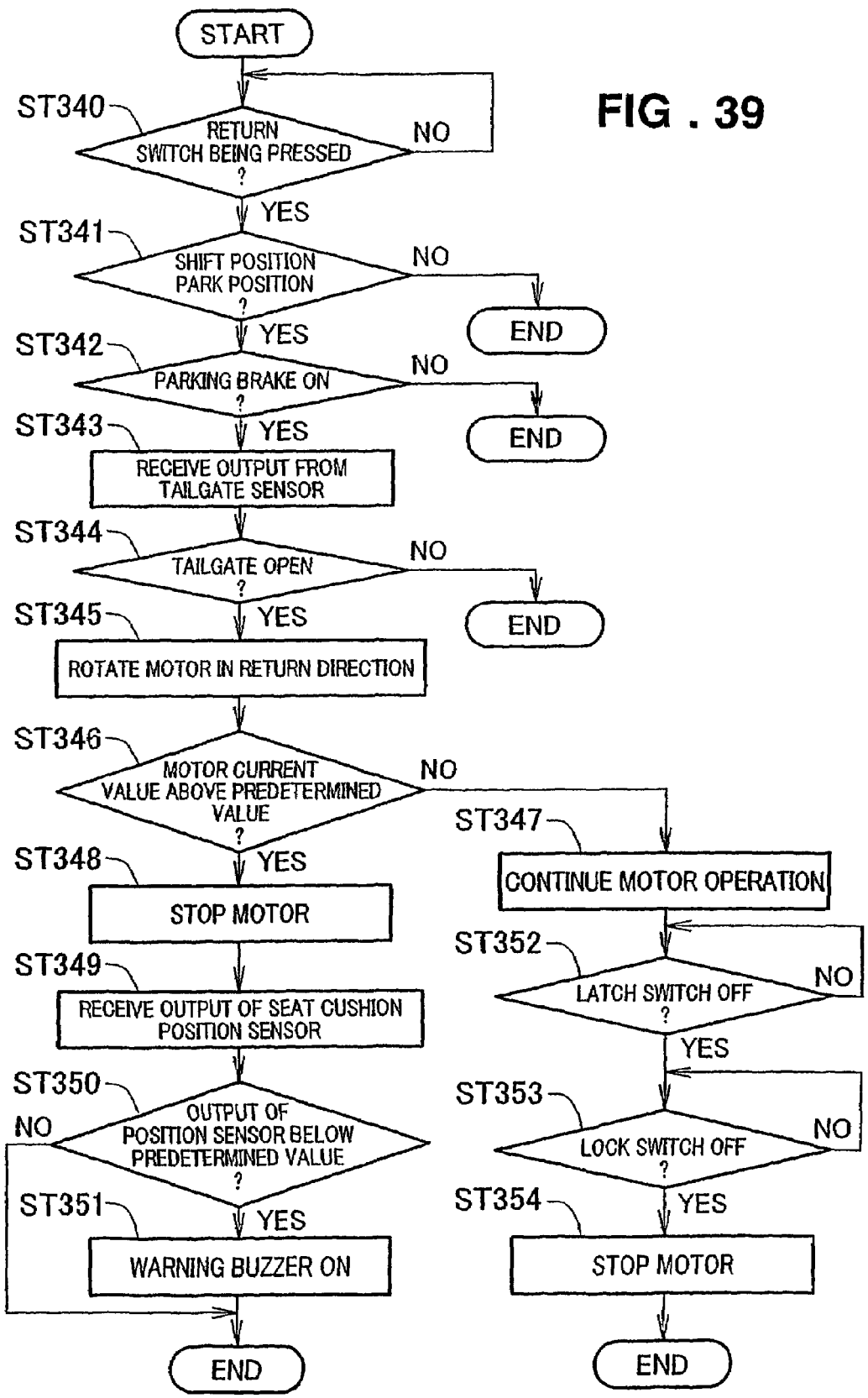

ELECTRIC STOWING SYSTEM FOR VEHICLE SEAT

TECHNICAL FIELD

This invention relates to an electric stowing system for a vehicle seat, for electrically stowing in a stowage recess formed in a floor, and returning, a rear seat disposed rearmost among a plurality of rear seats arrayed behind a front seat.

BACKGROUND ART

There are those vehicles which, so that they can carry 6 to 7 passengers, have behind a front seat a plurality of rear seats made up of a front-row rear seat, which is a first rear seat, and a back-row rear seat, which is a second rear seat. For example, as disclosed in JP-UM-A-5-40029, a stowing structure for a vehicle seat is known in which a back row seat is folded down to increase the space inside a passenger compartment. This stowing structure will now be described on the basis of FIG. 42 and FIG. 43A through FIG. 43C.

Referring to FIG. 42, a vehicle seat stowing structure 500 is constructed so that normally a second rear seat 501 is disposed at the back of a car as shown with solid lines so that a passenger 502 can be seated, but for example when a large item of luggage is to be loaded into the passenger compartment 503 the second rear seat 501 can be stowed in a floor recess 504 formed behind it.

This vehicle seat stowing structure 500 will be described on the basis of FIG. 43A through FIG. 43C, using as an example the case of stowing the seat in the floor recess 504.

In FIG. 43A, to stow the second rear seat 501 of the vehicle seat stowing structure 500 in the floor recess 504, first, the seat back 506 is tipped forward as shown with an arrow to fold it down against the seat cushion 507.

In FIG. 43B, a headrest 508 is removed from the seat back 506 folded down against the seat cushion 507 and stowed in a headrest stowage part 509 (see FIG. 43C) provided inside the passenger compartment 503. Then, the seat cushion 507 is swung rearward about a support shaft 510 along with the seat back 506 as shown with an arrow.

In FIG. 43C, the seat cushion 507 and the seat back 506 (the second rear seat 501) are stowed in the floor recess 504.

Here, the second rear seat 501 itself is relatively heavy, and for the second rear seat 501 to be swung rearward in the vehicle body and stowed in the floor recess 504 by hand a large manipulating force is necessary. Also, when the second rear seat 501 is stowed in the floor recess 504, it is necessary for the second rear seat 501 to be unlocked as it is swung by hand.

Because of this, stowing the second rear seat 501 in the floor recess 504 is relatively troublesome, and in this point there has been room for improvement.

As means for ameliorating this problem, it is desirable for the effort required of the operator to be reduced by for example stowing the second rear seat 501 in the floor recess 504 electrically.

However, for the second rear seat 501 to be stowed in the floor recess 504 electrically, it is necessary for the second rear seat 501 to be provided with a drive source, and to provide a control unit for controlling this drive source.

The control unit must for example receive a signal from an operating switch and transmit a drive signal to the drive source, and when receiving an attitude signal from the second rear seat transmit a suitable signal to the drive source on the basis of that signal. To supply a suitable signal of this kind to the drive source, the control unit may be relatively large. Consequently, it has been generally considered that the control unit should be mounted on the vehicle body side.

However, when the control unit is mounted on the vehicle body side, because it is distant from actuators mounted to the second rear seat, harnesses connecting actuators and sensors to the control unit become long, and the laying of the harnesses may become troublesome.

In addition, as a result of a harness being led out from the second rear seat, when the second rear seat is being stowed, the harness led out may be caught up by the second rear seat. Therefore, to realize electric stowing of the second rear seat, there is a need for the harnesses connecting actuators and sensors to the control part to be made short, and for the harnesses to be prevented from being caught up by the second rear seat.

Also, when stowing of a seat is made electric, because it is necessary for the seat back and the seat cushion to be folded together and swung within a small passenger compartment, if the process is just simply made electric, because luggage and the like will sometimes become sandwiched between the seat and the vehicle body, there is a risk of the electric stowing system breaking down.

Accordingly, there is a need for the effort of the seat stowing task to be reduced; for the harnesses to be made short; for the harnesses to be prevented from being caught up when the seat is being stowed; and for the sandwiching of luggage and the like to be prevented.

DISCLOSURE OF THE INVENTION

The present invention provides an electric stowing system for a vehicle seat for folding down a seat back against a seat cushion and swinging the seat cushion and the seat back together and stowing the seat in a floor recess positioned behind the seat, the system including: seat back forward-tipping means for automatically tipping the seat back forward to fold it against the seat cushion; swinging means for automatically swinging the forwardly tipped seat back and the seat cushion as one and stowing them in the floor recess; and a control unit for controlling the operation of the seat back forward-tipping means and the swinging means.

Because in the seat stowing system of this invention the seat back is tipped forward automatically like this, an unlocking actuator for unlocking the seat back can be made small, and the actuator can be incorporated into the seat. Also, because a large torque is needed to swing the folded seat, the swinging means for swinging the seat is mounted on the vehicle body side. Consequently, without sacrificing the size of the seat, it is possible to make the seat stowing operation electric, and the effort required of the passenger for the seat stowing operation can be reduced.

In the invention, preferably, when the seat stowed in the floor recess is being returned to its sitting position, at a position where the seat cushion has swung to a predetermined angle a reclining lock of the seat back forward-tipping means is unlocked so that the motor driving force is applied only to the seat cushion. After the seat cushion has been returned to a position where it has swung for example 50° with respect to the seat back, because the seat back is in the sitting position, an operation of pulling the seat back upright becomes unnecessary.

Also, preferably, the electric stowing system of this invention further includes a seat operating switch for ordering operation of the seat back forward-tipping means and the swinging means, and the seat operating switch is disposed behind the seat cushion. In this case, the switch can be operated easily from the tailgate of the vehicle. Even if luggage becomes sandwiched between the tailgate and the vehicle body opening, the seat does not malfunction.

Preferably, the control unit controls the seat cushion and the seat back to be operated automatically on the conditions that an automatic transmission of the vehicle is in a Park position, or a parking brake is operating, and a tailgate is open. In this case, a passenger can only perform the seat stowing operation when the tailgate is open.

Preferably, the seat back forward-tipping means is incorporated into the seat back or the seat cushion. In this case, the electric stowing system can be made compact.

Preferably, the control unit is incorporated into a central part of the seat cushion which is off of any sitting position. That is, the control unit can thereby be disposed in the proximity of the seat back forward-tipping means and the swinging means, and multiple harnesses connecting the seat back forward-tipping means and the swinging means to the control unit can be made short, and the harnesses can be laid without trouble. Also, by the control unit being incorporated into the seat cushion, it becomes possible for the harnesses also to be incorporated into the seat cushion. Therefore, it is not necessary for the harnesses to be led out from the seat cushion, and it will not happen that when the seat cushion is swung the harnesses are caught up by the seat cushion. Furthermore, because the control unit is incorporated into a central position off of the sitting positions of the seat cushion, passengers can sit on the seat cushion without sitting above the control unit, and there is no impairment of the sitting comfort of the passengers.

Also, preferably, the stowing system of this invention further includes a dome-shaped cover member for covering the upper face of the control unit, and the cover member is incorporated into the seat cushion. In this case, outside loads such as the weight of a passenger sitting on the seat cushion or the weight of luggage placed on the seat cushion are borne by the cover member and do not act on the control unit.

Preferably, buckles for fastening seat belts for passenger protection are disposed behind the cover member, so that the area behind the cover member is used effectively. Also, by buckles being disposed behind the cover member, passengers can be restricted from sitting on the central part where the cover member is disposed.

Also, preferably, the cover member has in its front end an opening through which passes at least one harness extending from the control unit. By this means, harnesses can be confined to the front part of the control unit, and the harnesses can be laid outside of the passenger sitting positions. Therefore, when passengers sit on the sitting positions, the weight of the passengers does not act on the harnesses.

Preferably, the electric stowing system of the invention further includes a seat operating switch for stowing in the floor recess the seat made up of the seat back and the seat cushion, and the seat operating switch is disposed behind the rearmost seat among the seats and in the proximity of the tailgate opening of the vehicle. In this case, when the seat operating switch is operated, because this is done when the tailgate is open, the switch can only be operated when the vehicle is stationary. Because the operator watches the movement of the electric seat from the tailgate while operating it, luggage can be prevented from being sandwiched between the seat and the vehicle body and damage to the system can be prevented.

Preferably, the seat operating switch only progresses the seat stowing operation while its ON state is maintained. In this case, because the stowing operation stops as soon as the operating switch is released, the stowing operation can be carried out without accidents.

Preferably, when the seat has stopped within the range through which the seat swings, a warning is provided for a predetermined time. By this means, the operator can be made aware certainly that the seat has stopped.

Preferably, the stowing system of the invention further includes a warning device for, when the seat cushion is not locked to the floor, warning that it is not locked, and this warning device is provided on the driver's side. This stops the driver from driving the vehicle when the seat cushion is not locked. This warning device is for example realized by lighting or flashing an indicator such as a display lamp provided on an instrument panel. By this means, the driver can be made aware without fail that the seat cushion is not locked.

Preferably, the warning is given when the seat is at a sittable angle to the floor. This allows a luggage compartment divided into two parts to be created by bringing the folded seat to the vertical. In this case, because the angle is not one such that a passenger can sit on the seat, a warning is unnecessary.

Preferably, the stowing system of the invention further includes a device for producing a warning sound when the seat back is tipped forward. In this case, the forwardly tipped state of the seat back can be made known to passengers with the warning sound. If when the seat cushion is not locked a warning is provided for example by lighting of a display lamp as mentioned above, abnormality of the seat back and abnormality of the seat cushion can be distinguished.

Also, in the stowing system of the invention, the swinging means has a drive motor and a warning is provided when the motor current value of the drive motor is above a predetermined value. Consequently, it is unnecessary for a current sensor to be disposed in the small seat, and simplification is possible.

Preferably, a coupling part of the drive motor has a slip clutch. In this case, for example when the seat is swinging, when an item of luggage is sandwiched between the seat and the floor and an excessive current arises in the drive motor, the excessive current through the drive motor is moderated by the slip clutch and damage is reduced.

Also, in an electric stowing system according to the invention, the seat back forward-tipping means has a reclining mechanism, having a spring for urging the seat back in the forward-tipping direction, which turns about a pivot shaft of the seat back, and unlocking means for unlocking the reclining mechanism. Consequently, when the seat back is to be tipped forward, by unlocking the reclining mechanism by operating the unlocking means, the seat back can be swiftly tipped forward under spring force, and the work needed from the passenger is reduced.

The reclining mechanism may have unlocking means for unlocking the reclining mechanism manually. In this case, when the seat back is pulled upright, the reclining mechanism can be unlocked by hand and the seat back set to a desired angle of recline.

Preferably, a one-way damper is provided between the seat cushion and the seat back so that the damper function acts with respect to the forward tipping direction of the seat back but the damper function does not act with respect to the return direction. In this case, when the seat back is tipping forward, by means of the damper effect a smooth and gentle forward tipping action can be realized. When the seat back is being returned, the damper function has no effect, and the seat back can be pulled up smoothly.

BRIEF DESCRIPTION OF THE DRAWINGS

FIG. 9A and FIG. 9B are views showing a fastener provided on the rear side of a rear seat so that the unlocking mechanism shown in FIG. 7 can be unlocked manually;

FIG. 11 is a flow chart of stowing a seat in a floor recess;

FIG. 21 is a flow chart of returning a seat stowed in a floor recess;

FIG. 22 is a view showing a return switch of a seat operating part being turned ON;

FIG. 24A and FIG. 24B are views showing a latch switch of cushion locking means OFF, and the state of the seat at that time;

FIG. 33A through FIG. 33D are flow charts showing the operation of a control unit in stowing a seat in a floor recess;

FIG. 39 is a flow chart showing the operation of a control unit when a seat is returned from a stowed state;

BEST MODE FOR CARRYING OUT THE INVENTION

Figure 1:
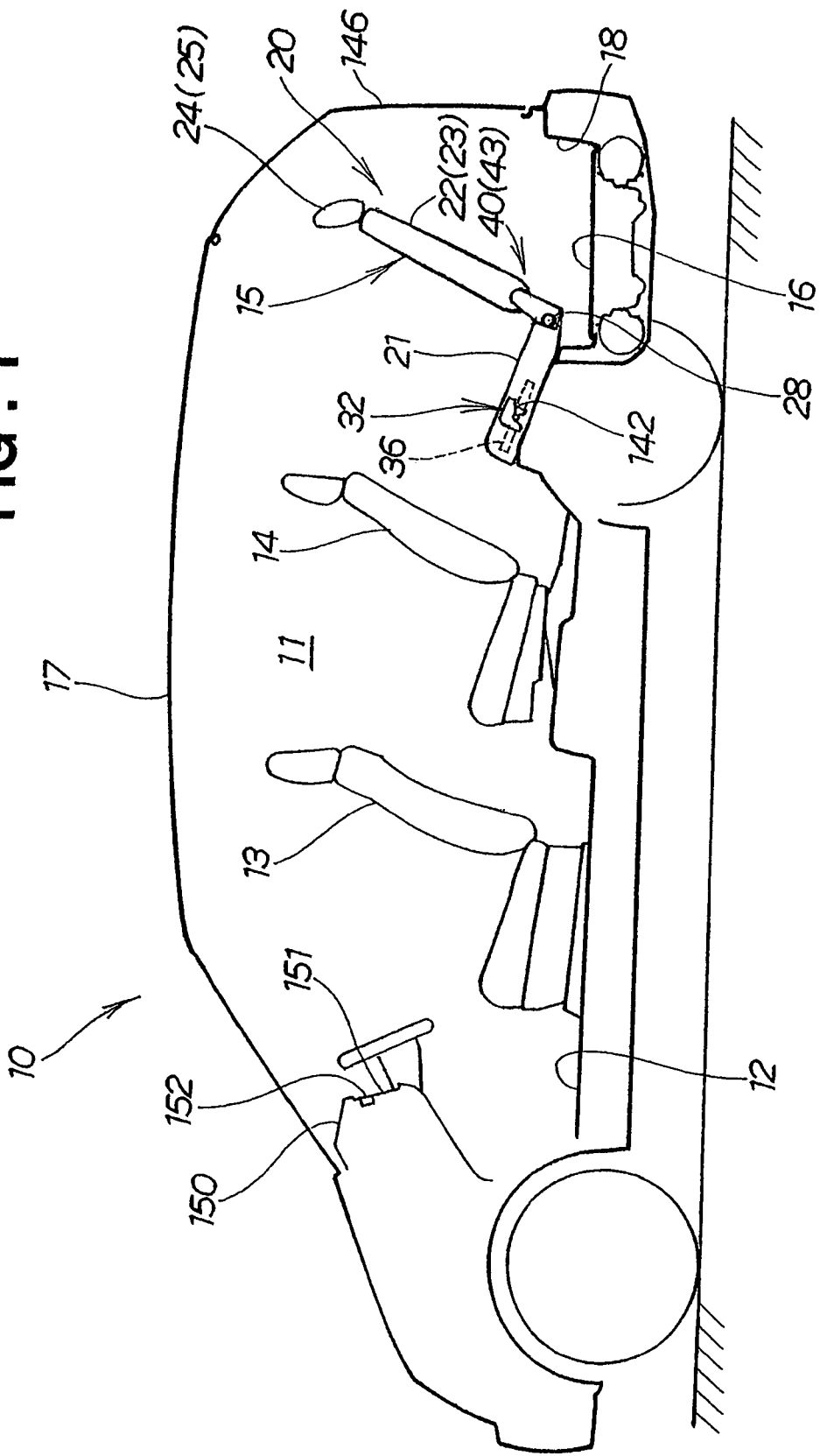
FIG. 1 is a schematic side view showing a vehicle equipped with an electric vehicle seat stowing system according to the invention.

A vehicle 10 shown in FIG. 1 has, on a floor 12 of a cabin 11, a driver's

Although in this first embodiment an example has been described wherein the control unit 36 is fixed with bolts, the control unit 36 can alternatively be mounted by other means.

Further, in this embodiment, an explanation is made wherein the exterior of the control unit 36 is a rectangular box, but the form of the control unit 36 is not limited to it and another form may be applicable.

Because the control unit 36 is incorporated into a central part 35 (see FIG. 2) of the seat cushion 21 which is outside of the seating positions 34, 34, passengers can sit on the seat cushion 21 without sitting on the control unit 36. Therefore, when passengers sit on the second rear seat 15, the control unit 36 does not impair the sitting comfort of the passengers.

A left back frame 41 of the left seat back 22 (see FIG. 2) is attached by a left reclining mechanism 40 to the left side of the rear end of the cushion frame 27, swingably in the front-rear direction of the vehicle body, and a right back frame 44 of the right seat back 23 (see FIG. 3) is attached by a right reclining mechanism 43 to the right side of the rear end of the cushion frame 27, swingably in the front-rear direction of the vehicle body.

Left unlocking means (unlocking means) 47 for unlocking a left lock mechanism (lock mechanism) 46 of the left reclining mechanism 40 is mounted on the left back frame 41 by a mounting bracket 48. Right unlocking means (unlocking means) 52 for unlocking a right lock mechanism (lock mechanism) 51 of the right reclining mechanism 43 is mounted on the right back frame 44 by a mounting bracket 53. The seat operating button 26 is mounted on the vehicle body behind the left seat back.

By transmitting rotation of a drive motor 55 through a speed-reducing gear set 56 to the left support shaft 28a, for example the swinging means 30 rotates the left support shaft 28a forward by reverse-rotating the drive motor 55 seat and a passenger seat as front seats 13; a first rear seat 14 as a front row behind the front seats 13; a second rear seat (a vehicle seat) 15 as a rearmost row behind the first rear seat; and an electric stowing system 20, according to the present invention, for changing the attitude of the second rear seat 15 and stowing it in a floor recess 16.

Figure 2:
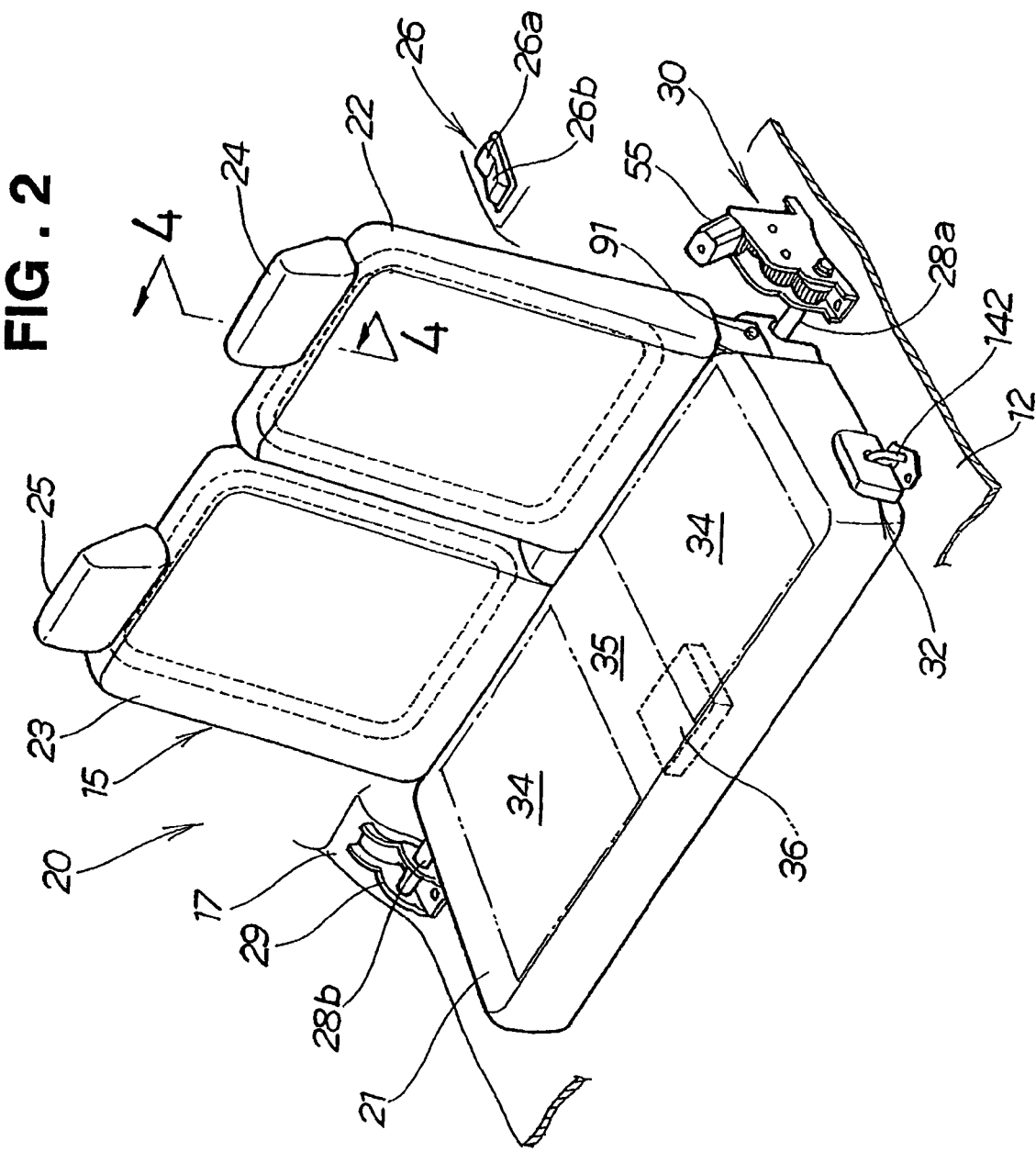
FIG. 2 is a perspective view illustrating a rearmost rear seat shown in FIG. 1.
Figure 3:
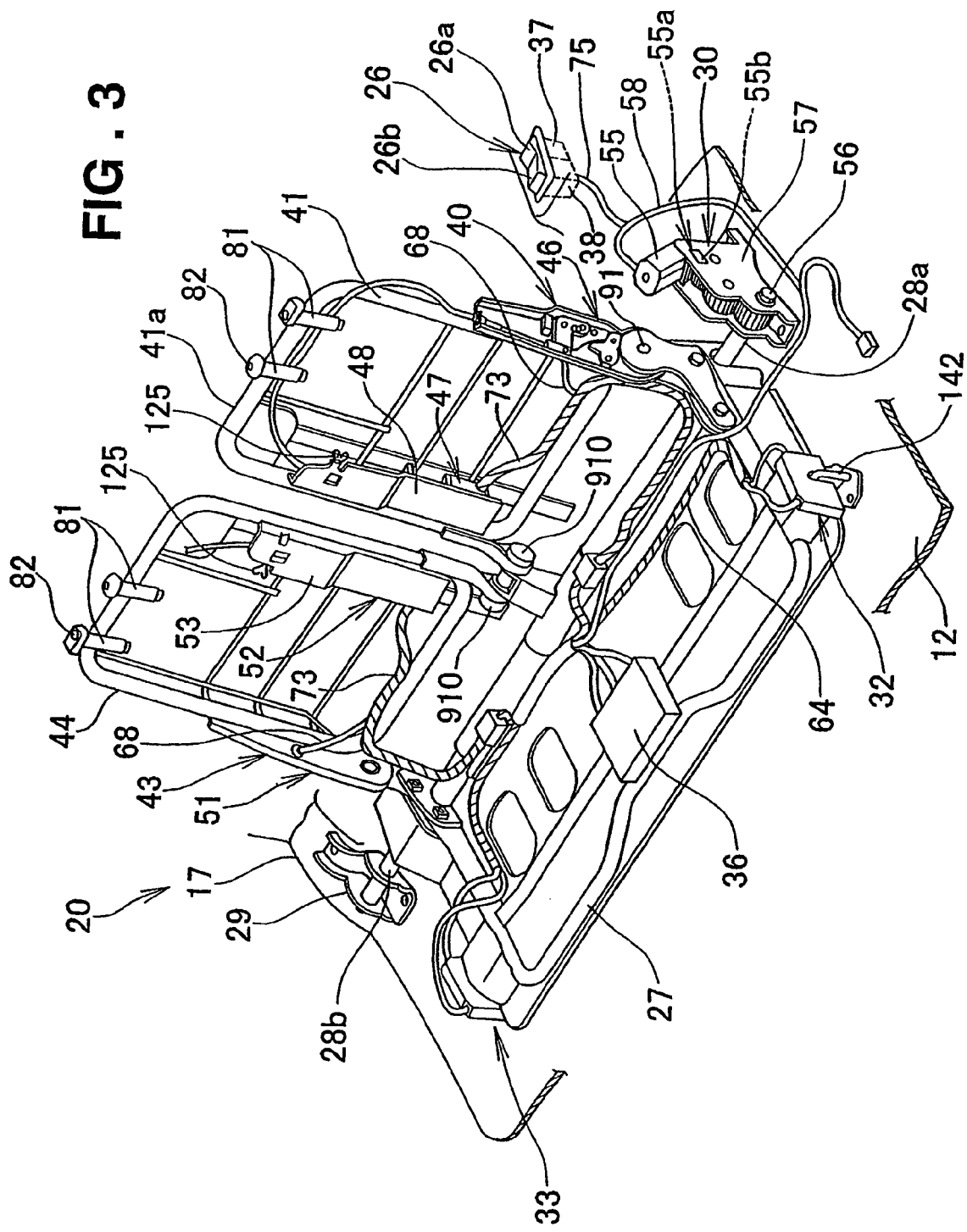
FIG. 3 is a perspective view showing an electric vehicle seat stowing system according to a first embodiment of the invention.

FIG. 2 and FIG. 3 show an electric vehicle seat stowing system 20 according to a first embodiment.

The electric vehicle seat stowing system 20 according to a first embodiment includes the second rear seat 15. The second rear seat 15 has a seat cushion 21 mounted on a floor 12, seat backs 22, 23 mounted tippably forward and rearward on the left and right on the rear of the seat cushion 21; a left headrest 24 mounted tippably forward and rearward on the top of the left seat back 22, and a right headrest 25 mounted tippably forward and rearward on the top of the right seat back 23.

A seat operating button 26 is disposed behind the second rear seat 15 and in a position away from the side face of the second rear seat 15.

Referring to FIG. 3, the electric vehicle seat stowing system 20 includes left and right support shafts 28a, 28b respectively attached to the left and right ends of a cushion frame 27 of the seat cushion 21 (see FIG. 2). The right support shaft 28b is rotatably attached to the vehicle body 17 by a mounting 29. The left support shaft 28a is attached to swinging means 30. This swinging means 30 is mounted on the vehicle body 17.

The cushion frame 27 has left and right cushion locking means 32, 33 at its front end. A control unit 36 is mounted for example with bolts to a central part 35 (see FIG. 2), outside of left and right seating positions 34, 34 of the cushion frame 27. This control unit 36 for example has its exterior formed as a rectangular box and is incorporated into the seat cushion 21 as shown in FIG. 2. and rotates the left support shaft 28a in reverse by forward-rotating the drive motor 55.

The drive motor 55 and the speed-reducing gear set 56 are mounted to the vehicle body 17 by a bracket 57.

The drive motor 55 is connected to the control unit 36 by a first harness 58. Because the swinging means 30 is mounted in the vicinity of the cushion frame 27, the swinging means 30 can be brought close to the control unit 36 and the length of the first harness 58 can be made short.

Figure 10:
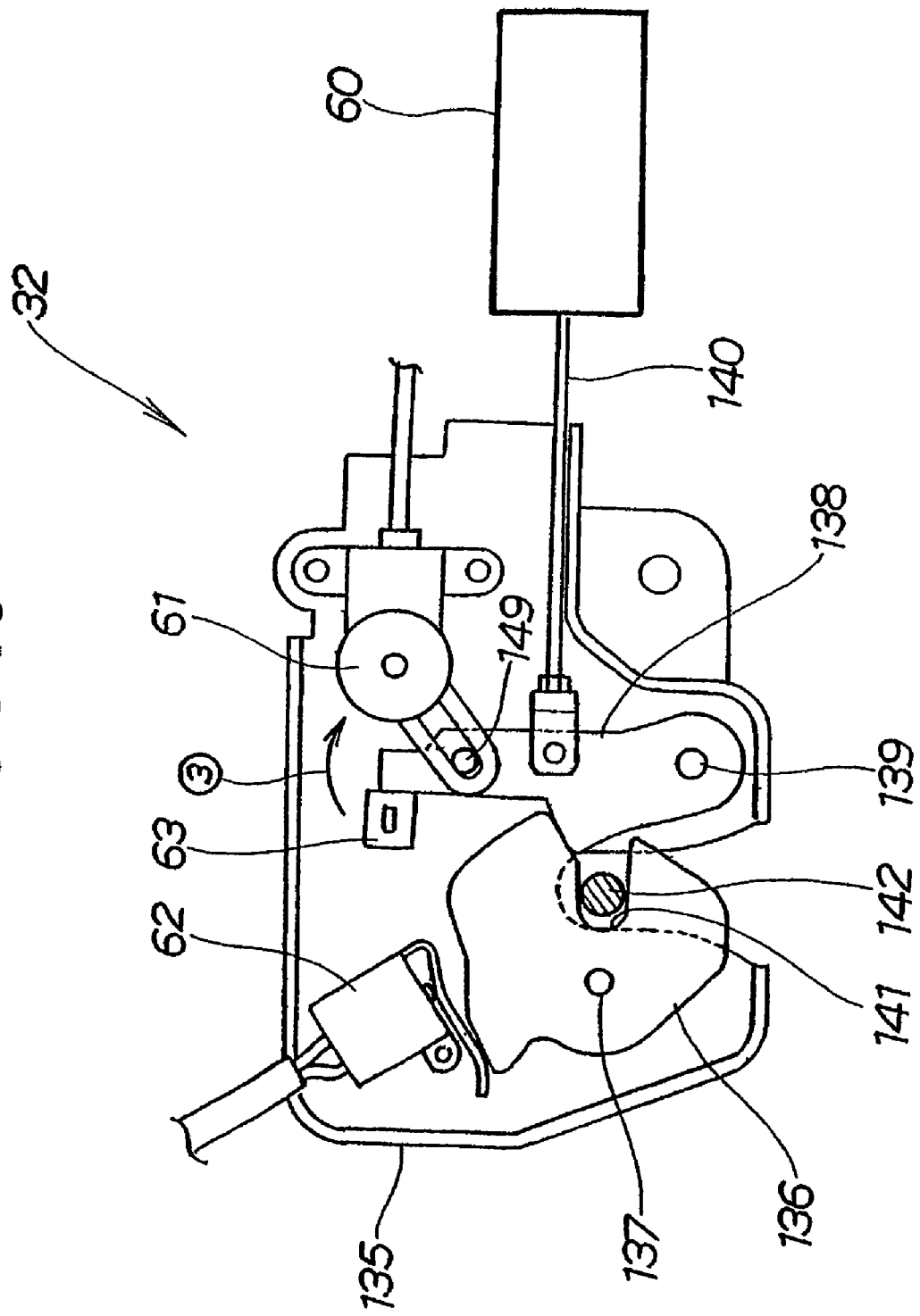
FIG. 10 is a detail view of cushion locking means shown in FIG. 3.

The left cushion locking means 32 has a cushion lock actuator 60, a release switch 61 and a latch switch 62, shown in FIG. 10.

The cushion lock actuator 60, the release switch 61 and the latch switch 62 are connected to the control unit 36 by a second harness 64.

Because the right cushion locking means 33 has the same construction as the left cushion locking means 32, a description thereof will be omitted.

Figure 5:
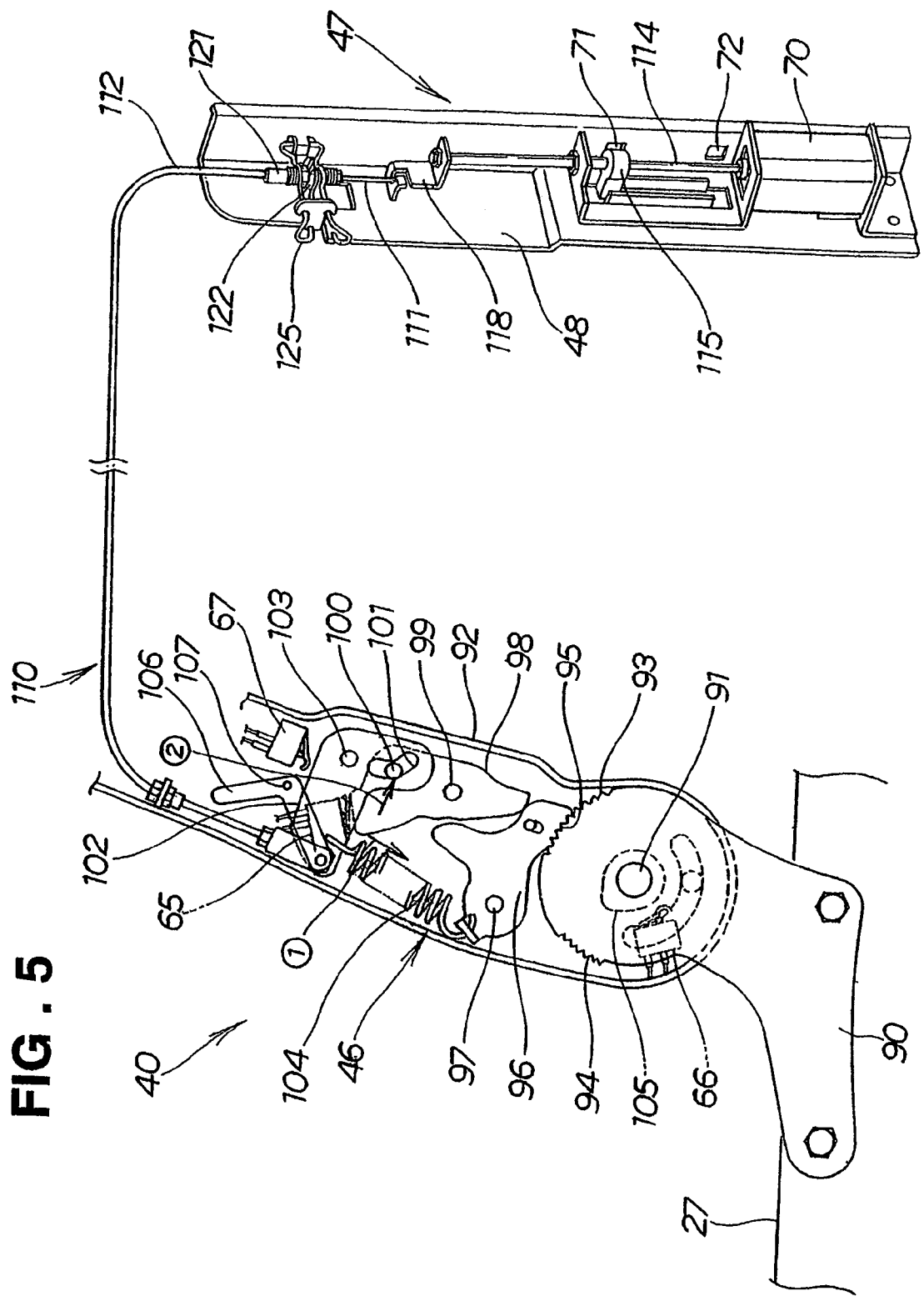
FIG. 5 is a view of a seat forward-tipping mechanism made up of a reclining mechanism and unlocking means.

The left lock mechanism 46 of the left reclining mechanism 40 has a lock ON sensing switch 65, a forward tip sensing switch 66 and a lock OFF sensing switch 67 as shown in FIG. 5.

The lock ON sensing switch 65, the forward tip sensing switch 66 and the lock OFF sensing switch 67 are connected to the control unit 36 by a third harness 68.

Because the right lock mechanism 51 has the same construction as the left lock mechanism 46, a description thereof will be omitted.

Figure 7:
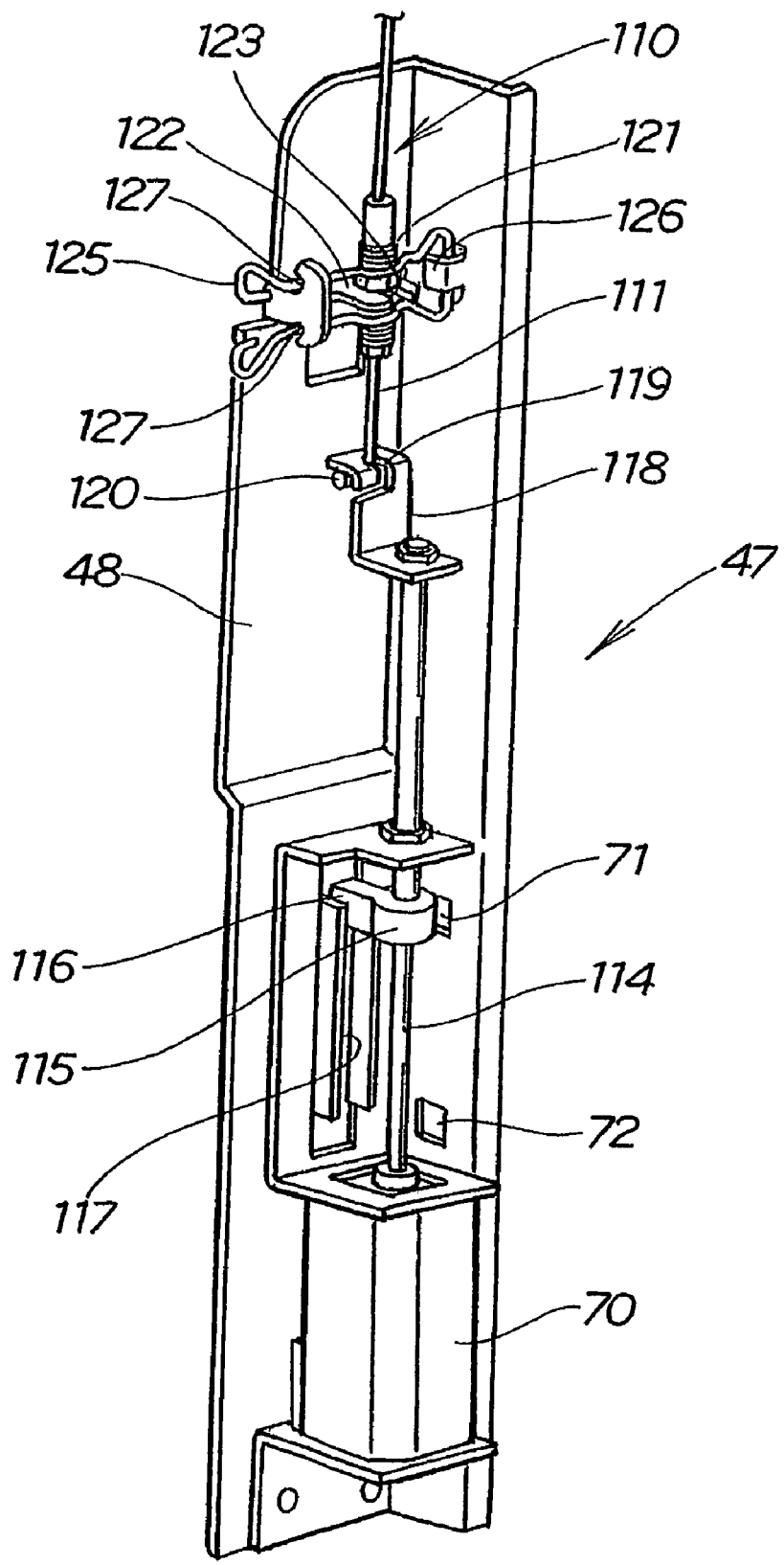
FIG. 7 is a perspective view of the unlocking means shown in FIG. 5.
Figure 8:
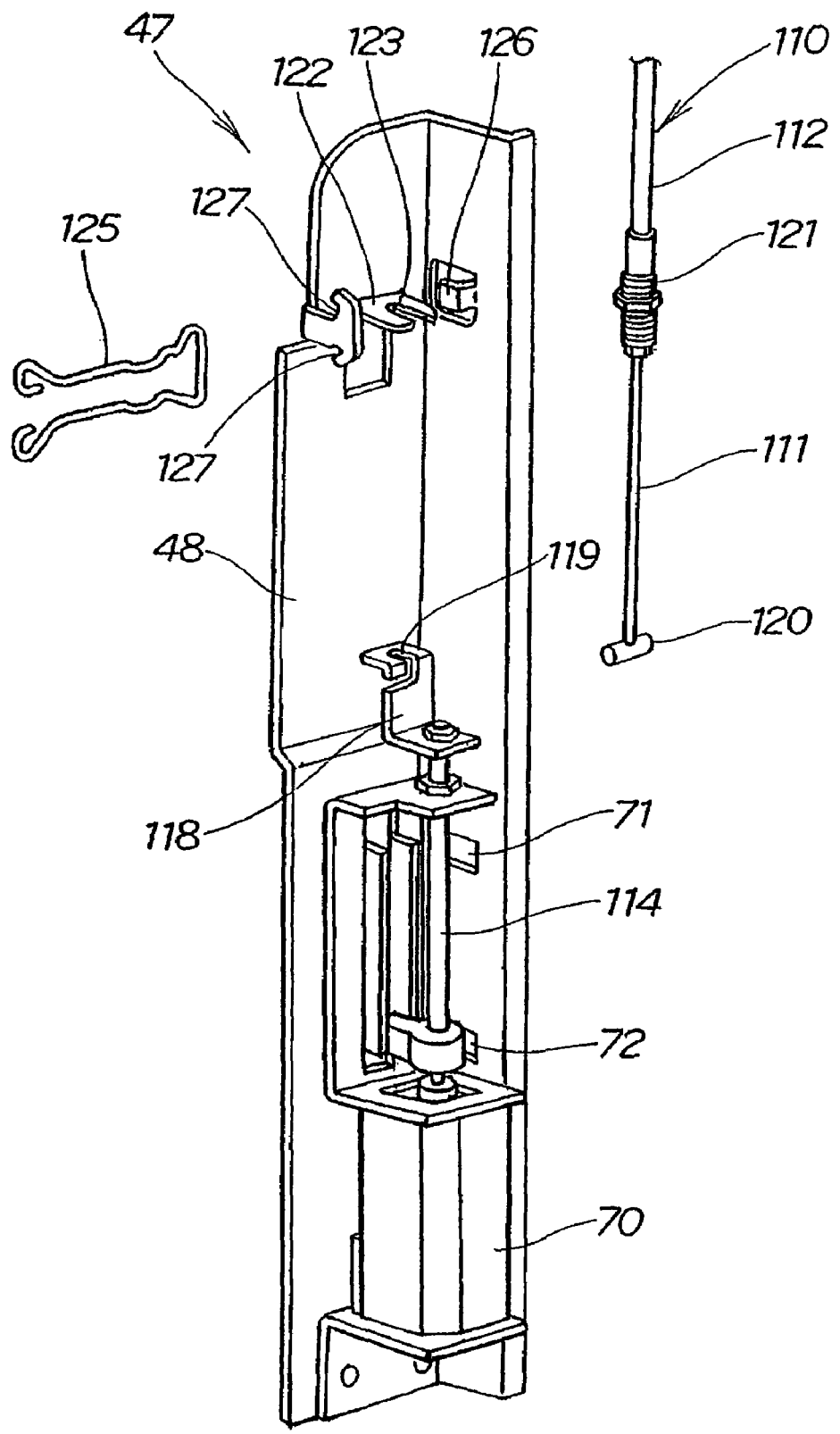
FIG. 8 is an exploded perspective view of the unlocking means shown in FIG. 7.

The left unlocking means 47 has an actuator 70 and upper and lower Hall sensors 71, 72 as shown in FIG. 5, FIG. 7 and FIG. 8.

Because the right unlocking means 52 has the same construction as the left unlocking means 47, a description thereof will be omitted.

The actuator 70 and the upper and lower Hall sensors 71, 72 are connected to the control unit 36 by a fourth harness 73.

A stowing switch 37 and a return switch 38 operated by the seat operating button 26 are connected to the control unit 36 by a fifth harness 75. The fifth harness 75 joins the first harness 58 part-way along its length.

Because the control unit 36 is incorporated into the central part 35 (see FIG. 2), outside of the seating positions 34, 34, of the seat cushion 21 like this, the control unit 36 can be mounted close to the swinging means 30, the left and right cushion locking means 32, 33, the left and right lock mechanisms 46, 51, and the left and right unlocking means 47, 52.

Consequently, the first through fourth harnesses 58, 64, 68 and 73 connecting the swinging means 30, the left and right cushion locking means 32, 33, the left and right lock mechanisms 46, 51 the left and right unlocking means 47, 52 and the control unit 36 can be made short. As a result, it is possible to install the first through fourth harnesses 58, 64, 68 and 73 without trouble.

Also, as a result of the control unit 36 being incorporated into the seat cushion 21, the first through fourth harnesses 58, 64, 68 and 73 can be incorporated into the seat cushion 21 and the left and right seat backs 22, 23. Therefore, it is not necessary for the first through fourth harnesses 58, 64, 68 and 73 to be led from the seat cushion 21 and the left and right seat backs 22, 23 to the outside. As a result, when the seat cushion 21 is swung, the first through fourth harnesses 58, 64, 68 and 73 are not caught by the seat cushion 21.

The seat operating button 26 has a stowing operation part 26a and a returning operation part 26b. Pushing the stowing operation part 26a turns the stowing switch 37 ON, and pushing the returning operation part 26b turns the return switch 38 ON.

Figure 4A:
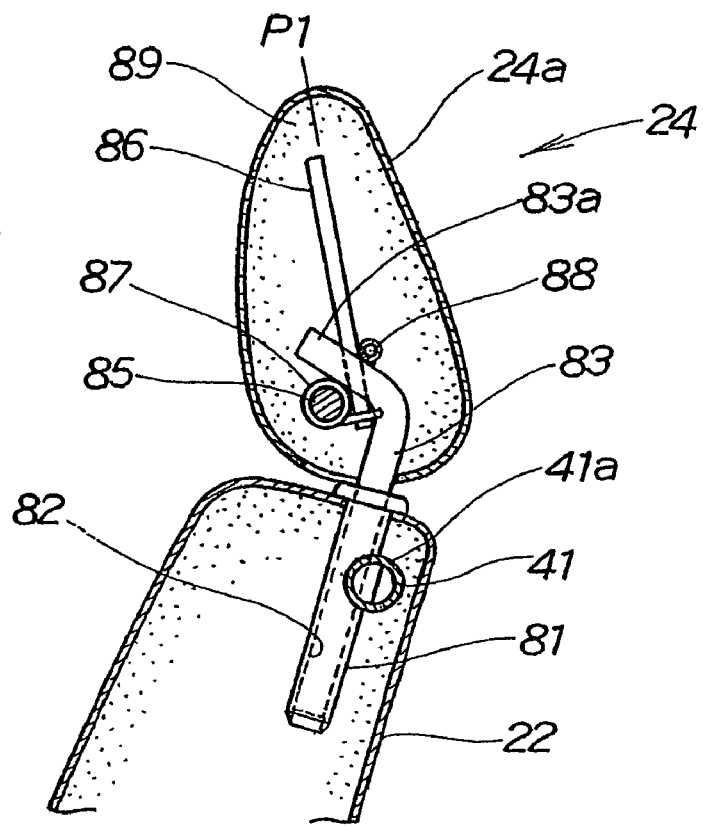
FIG. 4A is a sectional view on the line 4—4 in FIG. 2.
Figure 4B:
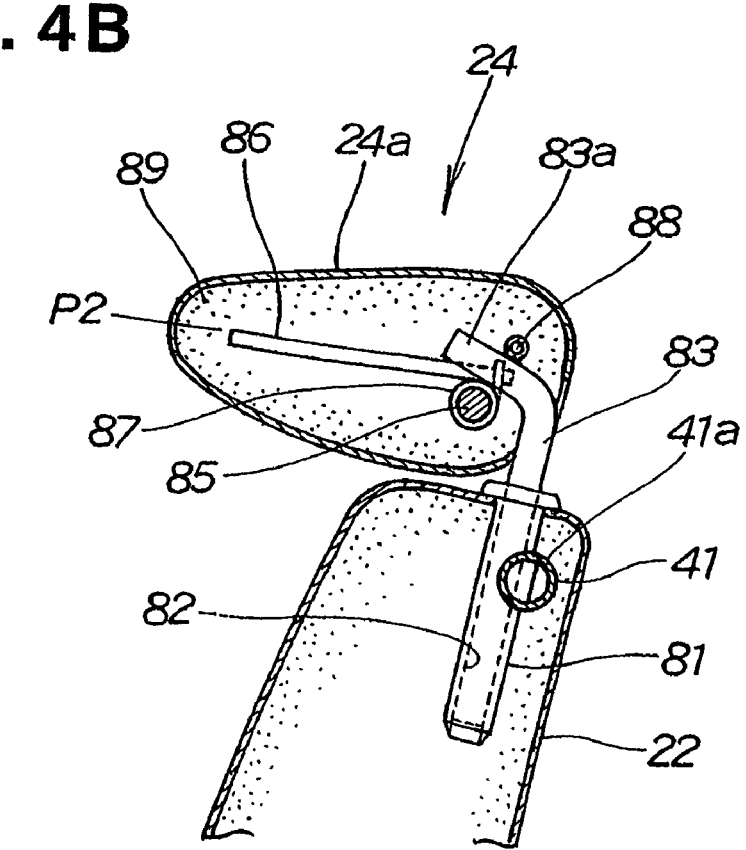
FIG. 4B is a sectional view showing a headrest tipped forward.

FIG. 4A and FIG. 4B show the left headrest 24. The left headrest 24 includes a headrest proper 89.

A pair of support members 81, 81 (see also FIG. 3) are disposed with a predetermined spacing in the top part 41a of the left back frame 41 in the left seat back 22. The support members 81, 81 have insertion holes 82, 82. Insertion rods 83, 83 are inserted into the insertion holes 82, 82. A pivot shaft 85 is rotatably attached by brackets (not shown) to bent-over parts 83a, 83a of the ends of these insertion rods 83, 83.

A support rod 86 is attached to the pivot shaft 85. A coil spring 87 for swinging the support rod 86 rearward is fitted on the pivot shaft 85. The support rod 86 is held in an in-use position P1 against the spring force of the coil spring 87 by a stopper 88. The stopper 88 is attached to the bent-over parts 83a, 83a. The headrest proper 89 is attached to the support rod 86.

As shown in FIG. 4B, when a predetermined load is applied to the rear face 24a of the left headrest 24, the left headrest 24 is folded against the spring force of the coil spring 87 about the pivot shaft 85 to a folded position P2, toward the front of the vehicle body.

Here, as the method of folding the left headrest 24, it is conceivable to adopt a construction whereby the left headrest 24 is folded as the left seat back 22 is tipped forward. However, to make a construction whereby the left headrest 24 is folded as the left seat back 22 is tipped forward, as members for transmitting the forward tipping movement of the seat back to the headrest, for example members such as an eccentric shaft offset from the pivot shaft 91 of the left seat back 22 (see FIG. 2, FIG. 3) and a wire or the like connecting this eccentric shaft to the headrest are necessary, and the construction becomes complicated. Consequently, the number of parts increases and the assembly labor increases, and it takes time for the left headrest 24 to be fitted.

With respect to this, the electric vehicle seat stowing system 20 of the present invention is constructed so that the rear face 24a of the left headrest 24 is abutted with the rear wall 18 (see FIG. 19A) of the floor recess 16 and a predetermined load is applied to the rear face 24a of the left headrest 24 to fold the left headrest 24. Therefore, because members such as a shaft offset from the pivot shaft 91 of the left seat back 22 and a wire are unnecessary, it becomes a simple construction. Consequently, by reducing the number of parts and reducing the assembly labor it is possible to make the fitting time short, and productivity can be raised.

The forward tipping mechanism of the left headrest 24 shown in FIG. 4A and FIG. 4B is merely one example, and there is no restriction to this. In short, all that is necessary is that the left headrest 24 be constructed to be forwardly tippable by a predetermined load being applied to the rear face 24a of the left headrest 24 and that the left headrest 24 be constructed to be returnable to its in-use position when the load on the rear face 24a is removed.

Because the right headrest 25 is of the same construction as the left headrest 24, a description thereof will be omitted.

FIG. 5 shows a seat back forward tipping mechanism of an electric stowing system for a vehicle seat according to the invention. This seat back forward tipping mechanism has a reclining mechanism 40 and unlocking means 47.

The left reclining mechanism 40 has the lock mechanism 46, the pivot shaft 91, a one-way damper 910, the forward tip sensing switch 66, the lock ON sensing switch 65 and the lock OFF sensing switch 67.

A spiral spring 49 (see FIG. 13B) for urging the seat back 22 to tip forward is provided on the pivot shaft 91.

The left and right one-way dampers 910 shown in FIG. 3 are dampers whose damper functions work when the seat backs 22, 23 are tipping forward and realize gentle forward tipping of the seat backs 22, 23, but whose damper functions do not work when the seat backs 22, 23 are returning to an upright state from their forwardly tipped state.

As these one-way dampers 910, for example the damper disclosed in JP-UM-A-6-80039 is used. This damper is shown in FIG. 6.

Figure 6:
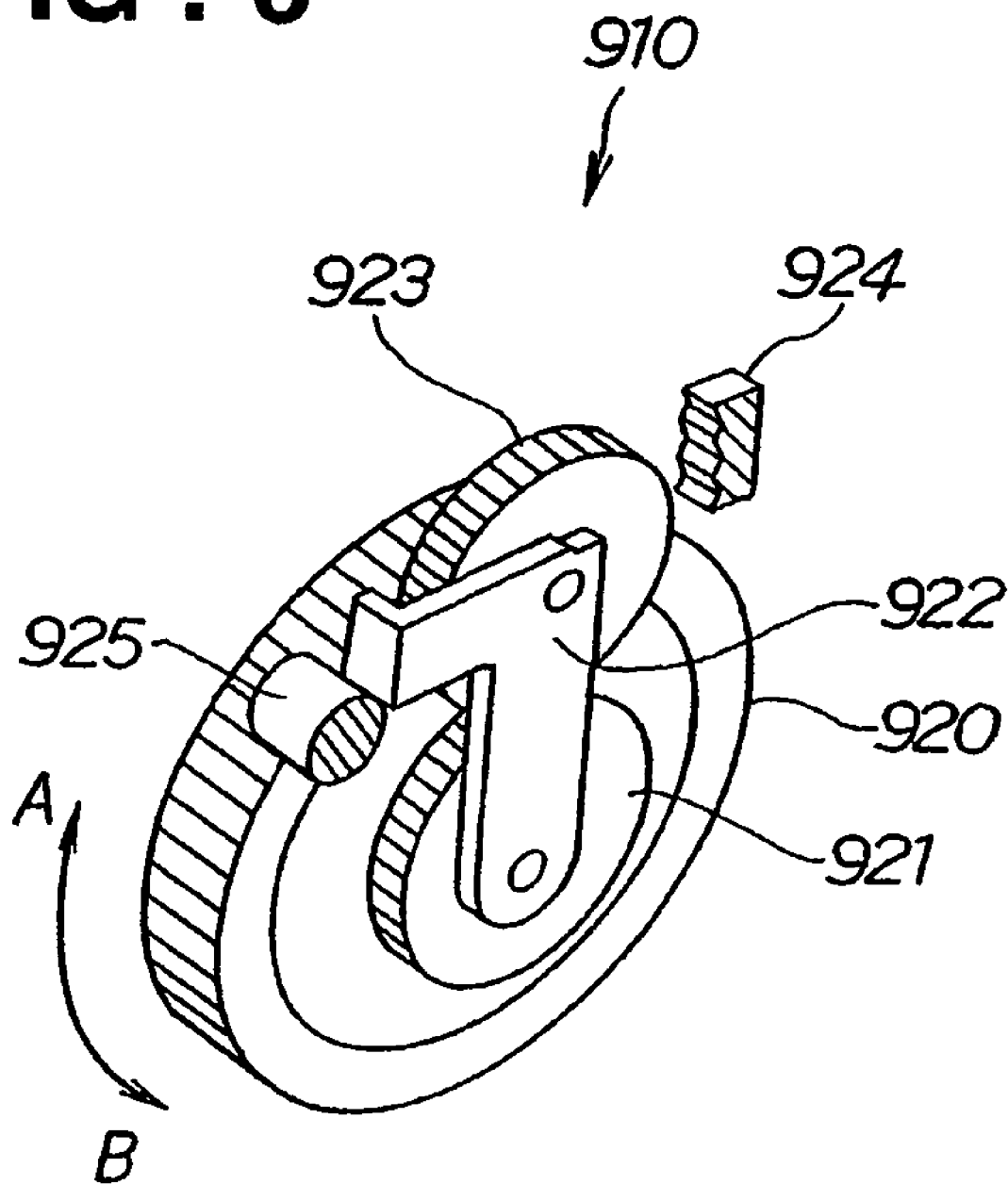
FIG. 6 is a perspective view of a damper mechanism shown in FIG. 3.

Referring to FIG. 6, the one-way damper 910 is made up of a damper having a first rotating body 920, a second rotating body 921 consisting of a gear, and a damper member interposed between the first and second rotating bodies 920, 921; an arm 922 which rotates along with rotation of the second rotating body 921; a friction plate, interposed between the second rotating body 921 and the lower end of the arm 922, for transmitting rotation of the second rotating body 921 to the arm 922; a gear 923 rotatably attached to the upper end of the arm 922 and meshing with the second rotating body 921; a first stopper 924 having a gear part; and a second stopper 925.

When the first rotating body 920 rotates in the arrow A direction, the second rotating body 921 is also rotated in the arrow A direction by the damper member, and under the action of the friction plate the arm 922 also rotates in the arrow A direction. When this happens, because the gear 923 meshes with the first stopper 924, the rotation of the gear 923 is stopped, and the rotation of the second rotating body 921 meshing with the gear 923 is also stopped. Consequently, a damper function acts with respect to rotation of the first rotating body 920 in the arrow A direction, and the rotation is made gentle.

When the first rotating body 920 rotates in the arrow B direction, the second rotating body 921 and the arm 922 also rotate in the arrow B direction, but the rotation of the arm 922 is stopped by the second stopper 925. Because the gear 923 is free to rotate, the rotation of the second rotating body 921 is not stopped. Therefore, no damper function acts on the first rotating body 920 with respect to the arrow B direction.

The left lock mechanism 46 fixes the left seat back 22 in a forwardly tipped position or an upright position. A base 90 is fixed with bolts to the cushion frame 27. A plate 92 is attached to the base 90 by the pivot shaft 91, swingably in the front-rear direction of the vehicle body.

The base 90 has first and second locking gears 93, 94 at its upper end. A lock gear 95 capable of meshing with the first and second gears 93, 94 is formed on a lower swing lever 96. The lower swing lever 96 is swingably attached to the plate 92 by a lower pin 97. An intermediate swing lever 98 for pressing the end of the lower swing lever 96 is swingably attached to the plate 92 by an intermediate pin 99. The intermediate swing lever 98 has an operating pin 100. This operating pin 100 fits in a dogleg-shaped guide hole 101 formed in an upper swing lever 102. The upper swing lever 102 is swingably attached to the plate 92 by an upper pin 103.

When the upper swing lever 102 swings about the upper pin 103, the intermediate swing lever 98 is swung about the intermediate pin 99 by the guide hole 101 and the operating pin 100. A tension spring 104 is fitted between the lower swing lever 96 and the upper swing lever 102.

By the upper swing lever 102 being urged about the upper pin 103 as shown by the arrow [1] under the spring force of the tension spring 104, the operating pin 100 in the guide hole 101 is pressed by the upper swing lever 102 as shown by the arrow [2]. As a result, the end of the lower swing lever 96 is pushed downward by the end of the intermediate swing lever 98, and the lock gear 95 of the lower swing lever 96 is caused to mesh with the first gear 93. Consequently, the plate 92 is held in a predetermined position.

The left lock mechanism 46 has the lock OFF sensing switch 67, which senses the movement of the upper swing lever 102; the forward tip sensing switch 66, which is operated by a cam 105 provided on the pivot shaft 91; and a lock ON sensing switch 65, which senses the movement of the intermediate swing lever 98. The upper swing lever 102 and the left unlocking means 47 are connected by a connecting cable 110. Also, one end of an unlocking lever 106 for releasing the locked state of the base 90 and the lower swing lever manually is attached to the upper swing lever 102. The unlocking lever 106 is approximately L-shaped and rotates about a pin 107 provided on the plate 92.

FIG. 7 and FIG. 8 show the left unlocking means 47 shown in FIG. 5.

The left unlocking means 47 includes the actuator 70 provided on the mounting bracket 48 attached to the left back frame 41 (see FIG. 3). A rising/falling shaft 114 projects from the actuator 70, and a magnet 115 is attached to the rising/falling shaft 114. An extension part 116 of the magnet 115 is fitted in a guide 117. The upper and lower Hall sensors 71, 72 are attached to parts of the mounting bracket 48 corresponding to the upper and lower ends of the rising/falling shaft 114.

A connecting member 118 bent in a crank shape is attached to the end of the rising/falling shaft 114. The connecting member 118 has an engaging groove 119. A stopper arm 120 provided on the end of an inner cable 111 of the connecting cable 110 is fitted in and engaged with the engaging groove 119.

An anchoring part 121 of an outer cable 121 (see FIG. 8) of the connecting cable 110 is fitted in an anchoring groove 123 of a support part 122 formed on the top of the mounting bracket 48 as shown in FIG. 8. The distal end of a lock pin 125 is hooked on a hook piece 126 of the mounting bracket 48 and the base ends of the lock pin 125 are engaged with engaging slots 127, 127, whereby the anchoring part 121 of the connecting cable 110 is prevented from coming out of the anchoring slot 123.

As shown in FIG. 5, by the actuator 70 of the left unlocking means 47 being operated or by the unlocking lever 106 being turned manually, the rising/falling shaft 114 is lowered, and the upper swing lever 102 is lifted upward by the inner cable 111. Consequently, the upper swing lever 102 is turned clockwise against the spring force of the tension spring 104. As a result, the lock gear 95 of the lower swing lever 96 moves away from the first gear 93, and the plate 92 tips forward about the pivot shaft 91. At this time, the urging force of the spiral spring 49 (see FIG. 13B) provided on the pivot shaft 91 causes the left seat back 22 to tip forward, but the damper function of the one-way damper 910 makes it tip forward gently.

During operation of the left unlocking means 47, for example the actuator 70 may fail. In this case, first, the base ends of the lock pin 125 are disengaged from the engaging slots 127, 127 of the mounting bracket 48 and then the distal end of the lock pin 125 is disengaged from the hook piece 126 of the mounting bracket 48, and the lock pin 125 is thereby removed from the mounting bracket 48. Then, the anchoring part 121 of the connecting cable 110 is removed from the anchoring slot 123 of the support part 122, and the inner cable 111 is removed from the engaging slot 119 of the connecting member 118. As a result, the inner cable 111 is disconnected from the actuator 70, and under the spring force of the tension spring 104 shown in FIG. 5 the lock gear 95 of the lower swing lever 96 meshes with the first gear 93 and the second gear 94 and fixes the plate 92.

Thus, even if the actuator 70 fails, because the plate 92 can be fixed, the left seat back 22 can be held.

As shown in FIG. 9A, covers 22a, 23a covering the rear sides of the left and right seat backs 22, 23 have slide fasteners 131, 131 in positions 130, 130 corresponding to the left and right unlocking means 47, 52.

The left and right slide fasteners 131, 131 are the same, and hereinafter the left slide fastener 131 will be described, and a description of the right slide fastener 131 will be omitted.

As shown in FIG. 9B, a seat pad 133 is provided on the inner side of the cover 22a. This seat pad 133 has an opening 132 for maintenance access. The opening 132 is opened and closed by opening and closing the left slide fastener 131. Accordingly, opening the left slide fastener 131 reveals the access opening 132 and exposes the left unlocking means 47. Closing the slide fastener 131 covers the left unlocking means 47 with the seat pad 133.

As a result of the left slide fastener 131 and the access opening 132 being provided like this, even when the actuator 70 fails, it is possible to disconnect the inner cable 111 of the connecting cable 110 from the actuator 70 easily by opening the left slide fastener 131 and the access opening 132 and removing the lock pin 125 from the mounting bracket 48. Also, the left slide fastener 131 and the access opening 132 can be opened to carry out maintenance of the actuator 70 and so on through the access opening 132.

FIG. 10 shows the left cushion locking means 32 shown in FIG. 3.

The left cushion locking means 32 is attached to the cushion frame 27 shown in FIG. 3 by a bracket 135. A latch 136 is pivotally attached to the bracket 135 by a latch pin 137. A ratchet 138 is pivotally attached to a bracket by a ratchet pin 139, and faces the latch 136 so as to engage and disengage therewith. The cushion lock actuator 60 is connected to the ratchet 138 by an operating rod 140.

Operation of the cushion lock actuator 60 causes the ratchet 138 to swing as shown by the arrow [3] about the ratchet pin 139 and unlock the latch 136. Consequently, by the bracket 135 being lifted up together with the seat cushion 21 (see FIG. 2), the latch 136 is turned about the latch pin 137 and an engaging slot 141 formed in the latch 136 is disengaged from a striker 142. The striker 142 is a member fixed to the floor 12 (see FIG. 2, FIG. 3) of the vehicle body 17.

The left cushion locking means 32 has the release switch 61, which senses the movement of the ratchet 138; the latch switch 62, which senses the movement of the latch 136; and a lock switch 63.

The release switch 61 turns ON when the ratchet 138 has been pulled by the cushion lock actuator 60 and turns OFF when the ratchet 138 has returned.

The latch switch 62 turns ON when the latch 136 has turned and turns OFF when the latch 136 has been pushed up by the striker 142.

The lock switch 63 turns OFF when the ratchet 138 has returned to its initial position.

Next, the operation of the electric vehicle seat stowing system 20 will be described, on the basis of FIG. 11 through FIG. 25B. When the operation of the electric vehicle seat stowing system 20 is implemented, the left and right seat backs 22, 23 and the left and right headrests 24, 25 and so on operate in the same way, and here, to facilitate understanding, only the left seat back 22 and the left headrest 24 and so on will be discussed, and a description for the right seat back 23 and the right headrest 25 will be omitted.

First, stowing operation of an electric stowing system 20 for a vehicle seat according to the invention will be described, on the basis of FIG. 11 through FIG. 20B.

FIG. 11 shows a flow chart illustrating the stowing operation of an electric vehicle seat stowing system (first embodiment) according to the invention.

Figure 12A:
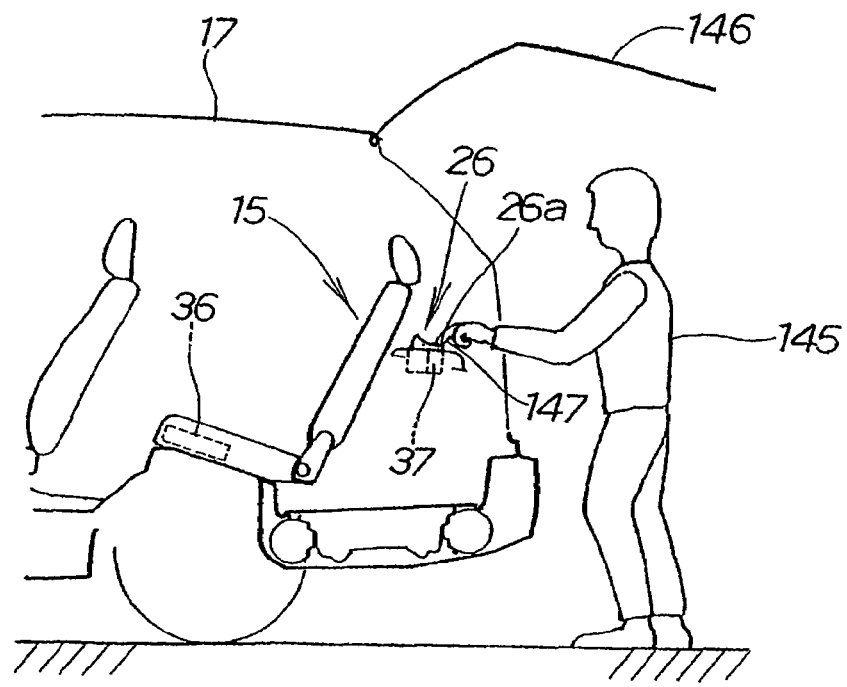
FIG. 12A and FIG. 12B are views illustrating actions in stowing a seat.

Step (hereinafter abbreviated to ST) 01: As shown in FIG. 12A, a tailgate 146 is opened, and the seat operating button 26 is pushed to turn the stowing switch 37 ON.

ST02: The lock mechanisms are unlocked, and the seat backs are tipped forward by spring force.

ST03: After the seat backs are locked in their forwardly tipped positions, the seat cushion locks are released.

ST04: The seat cushion is swung toward the rear of the vehicle body.

ST05: The second rear seat (the seat cushion and the right and left seat backs) is stowed in the floor recess.

The contents of ST01 through ST05 will now be explained in detail.

As shown in FIG. 12A, a user 145 opens a tailgate 146 provided at the rear of the vehicle body 17 upward. The opening of the tailgate 146 turns ON a tailgate OPEN switch (not shown). Then, the stowing operation part 26a of the seat operating button 26 provided behind the second rear seat 15 is pushed with a finger 147 to turn the stowing switch 37 ON.

Figure 12B:
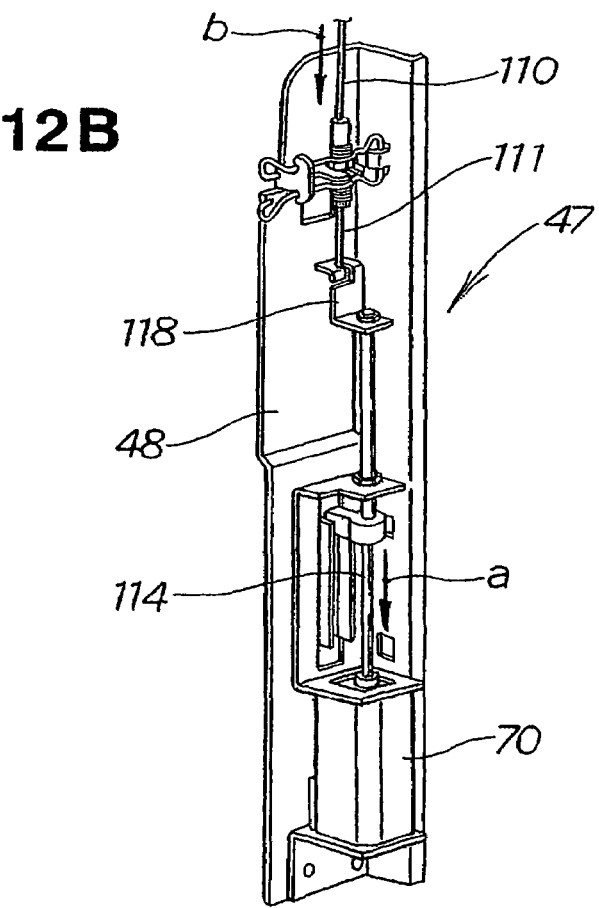

After the control unit 36 detects that the tailgate OPEN switch is ON, the actuator 70 of the left unlocking means 47 shown in FIG. 12B is operated. The operation of the actuator 70 moves the rising/falling shaft 114 downward as shown by the arrow a. By moving downward, the rising/falling shaft 114 pulls the inner cable 111 of the connecting cable 110 with the connecting member 118 as shown by the arrow b.

Figure 13A:
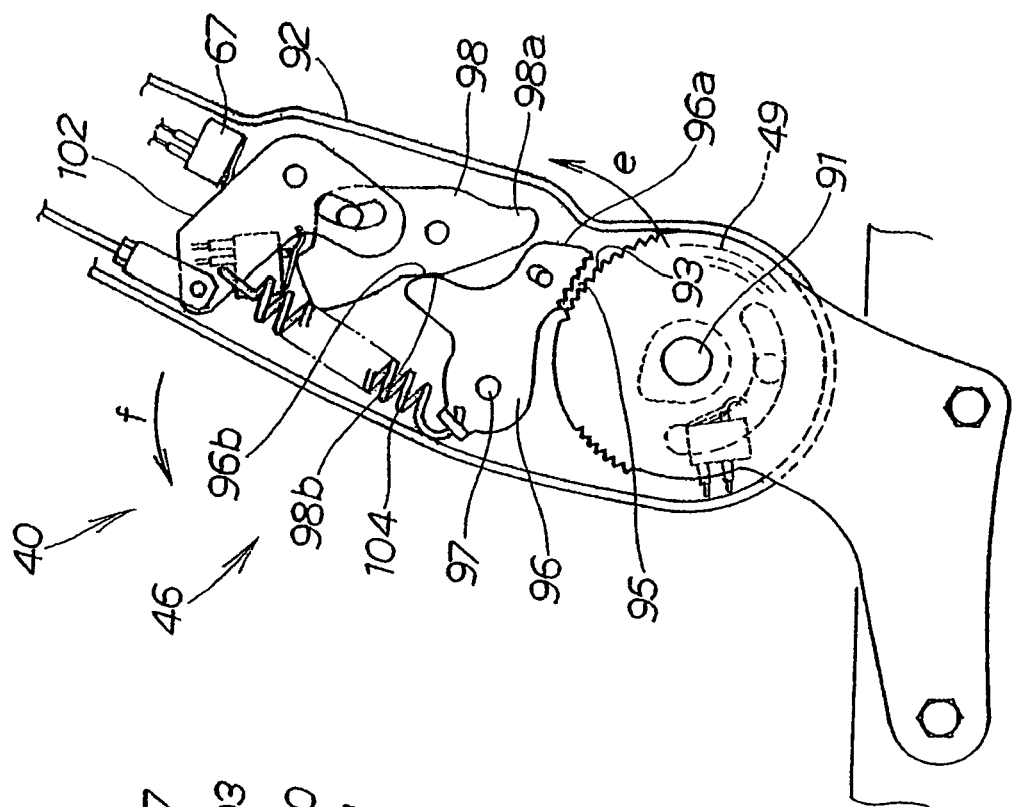
FIG. 13A and FIG. 13B are views showing a locked state and an unlocked state of a reclining mechanism.

In FIG. 13A, when the inner cable 111 of the connecting cable 110 is pulled as shown by the arrow b, the upper swing lever 102 turns clockwise about the upper pin 103 as shown by the arrow c. As a result, the operating pin 100 in the guide hole 101 is subjected to a force which moves it to the left in the figure. The intermediate swing lever 98 turns counterclockwise about the intermediate pin 99 as shown by the arrow d.

Figure 13B:
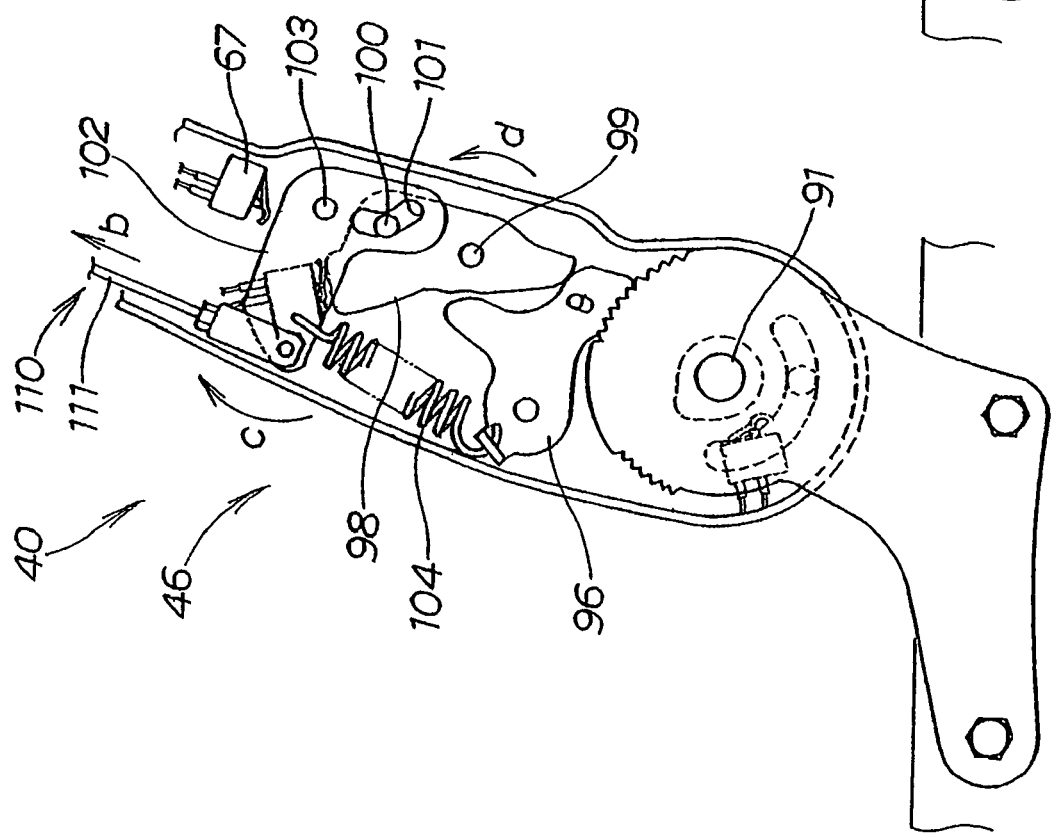

As shown in FIG. 13B, the turning of the intermediate swing lever 98 causes the end 98a of the intermediate swing lever 98 to leave the end 96a of the lower swing lever 96. Then, an intermediate cam face 98b of the intermediate swing lever 98 pushes on a projecting arm 96b of the lower swing lever 96. As a result of the projecting arm 96b of the lower swing lever 96 being pushed, the lower swing lever 96 turns counterclockwise about the lower pin 97 as shown by the arrow e, and the lock gear 95 of the lower swing lever 96 is lifted up.

This unmeshes the lock gear 95 and the first gear 93 and unlocks the left lock mechanism 46. When the left lock mechanism 46 is unlocked like this, under the spring force of the spiral spring 49 provided on the left reclining mechanism 40, the plate 92 tips forward toward the front of the vehicle body about the pivot shaft 91 as shown by the arrow f. At this time, as mentioned above, a damper function of the one-way damper 910 shown in FIG. 6 works, and the plate 92 tips forward gently. Then, the lock OFF sensing switch 67 is turned ON by the upper swing lever 102.

Figure 14:
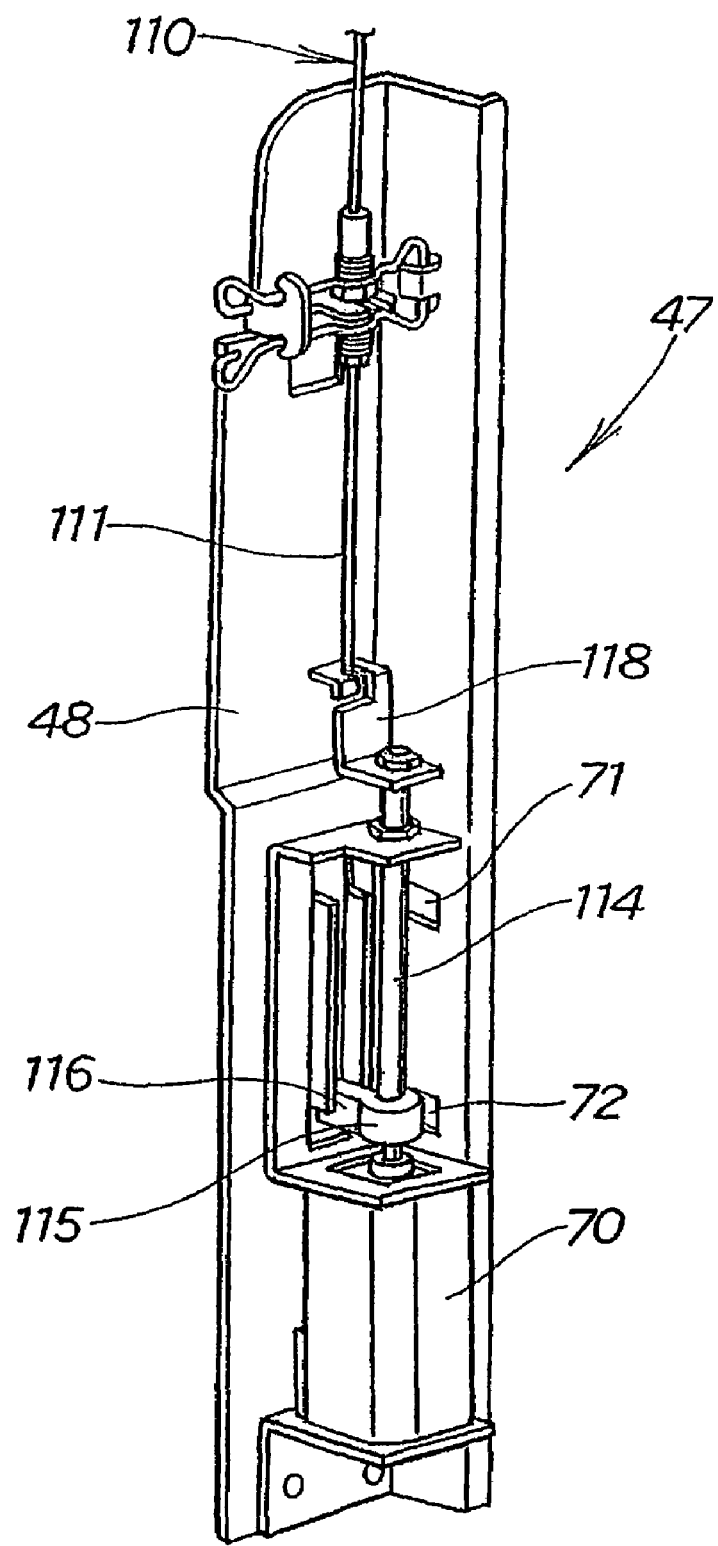
FIG. 14 is a view showing an actuator of unlocking means having operated in an unlocking direction.

When the lock OFF sensing switch 67 is turned ON by the upper swing lever 102 as shown in FIG. 13B, an ON signal of the lock OFF sensing switch 67 is inputted to the control unit 36 (see FIG. 3), and the actuator 70 of the left unlocking means 47 shown in FIG. 14 stops. As a result, the inner cable 111 of the connecting cable 110 is kept pulled down.

For example when a problem has arisen in the lock OFF sensing switch 67, when the magnet 115 reaches the lower Hall sensor 72 as shown in FIG. 14, the lower Hall sensor 72 senses the magnet 115, and on the basis of a detection signal from the lower Hall sensor 72 the control unit 36 controls the actuator 70 to stop. By this means the rising/falling shaft 114 is prevented from descending too far and the actuator 70 is protected.

Figure 15A:
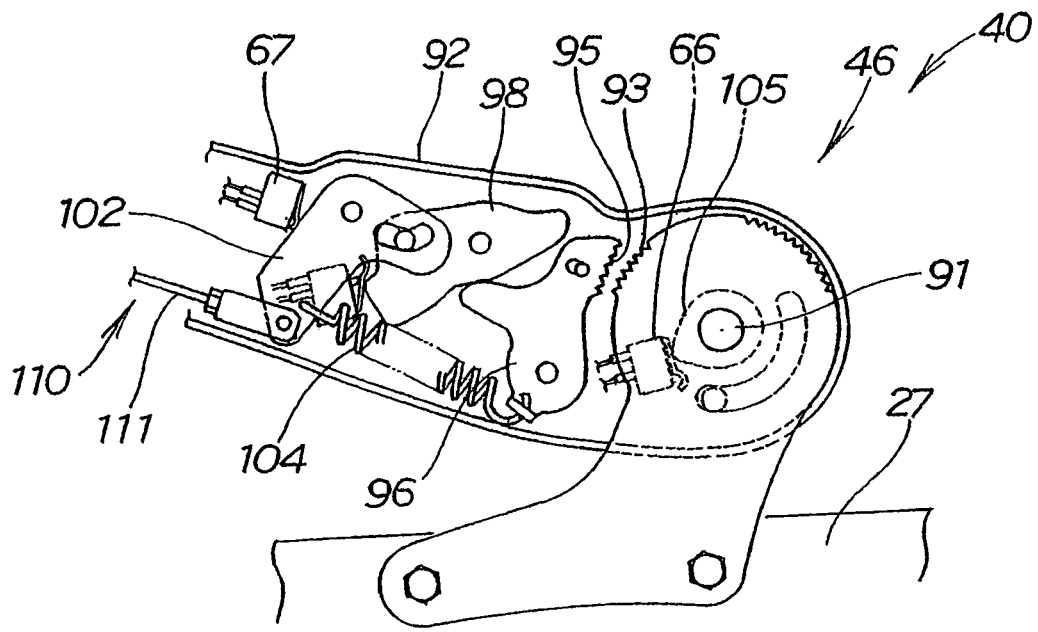
FIG. 15A and FIG. 15B are views showing an unlocked reclining mechanism and unlocking means.

As shown in FIG. 15A, when the plate 92 has finished tipping forward, the forward tip sensing switch 66 is pressed by the cam 105 and turns ON. An ON signal from the forward tip sensing switch 66 is inputted to the control unit 36 (see FIG. 3). The control unit 36 drives the actuator 70 of the left unlocking means 47 shown in FIG. 15B. The rising/falling shaft 114 moves upward as shown by the arrow g.

When the rising/falling shaft 114 has risen to a predetermined position and the magnet 115 has reached the position of the upper Hall sensor 71, the upper Hall sensor 71 senses the magnet 115. On the basis of a detection signal from the upper Hall sensor 71 the control unit 36 stops the actuator 70. This removes the downward tension applied to the inner cable 111 of the connecting cable 110.

Figure 15B:
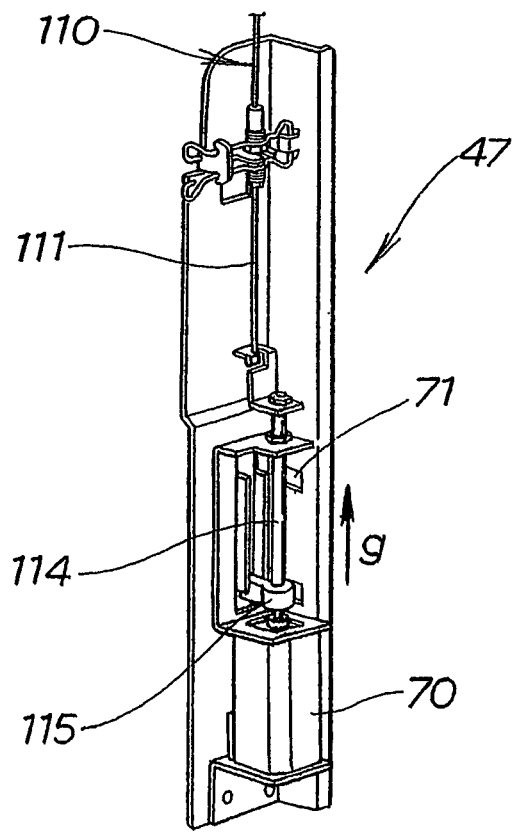
Figure 16A:
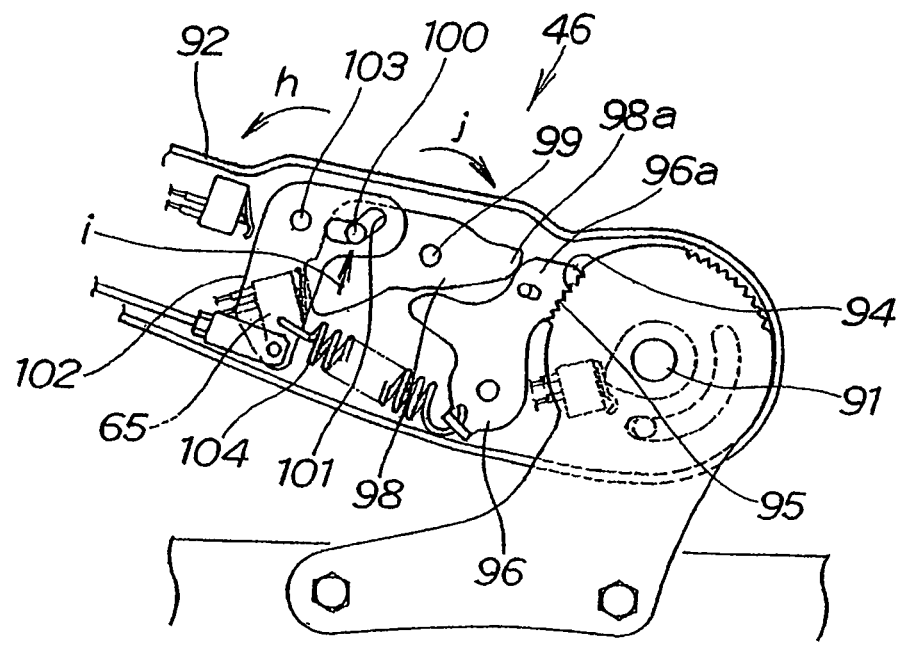
FIG. 16A is a view showing the reclining mechanism locked with the seat back tipped forward.

As a result of the downward tension on the inner cable 111 of the connecting cable 110 shown in FIG. 15B being removed, the spring force of the tension spring 104 shown in FIG. 16A causes the upper swing lever 102 to turn counterclockwise about the upper pin 103 as shown by the arrow h. Consequently, the operating pin 100 in the guide hole 101 is pressed by the upper swing lever 102 as shown by the arrow i. This causes the intermediate swing lever 98 to turn clockwise about the intermediate pin 99 as shown by the arrow j. The end 98a of the intermediate swing lever 98 pushes the end 96a of the lower swing lever 96 downward.

The end 96a of the lower swing lever 96 being pushed downward causes the lock gear 95 of the lower swing lever 96 to mesh with the first gear 93. Consequently, the left lock mechanism 46 becomes locked and the plate 92 is held in its forwardly tipped position.

Figure 16B:
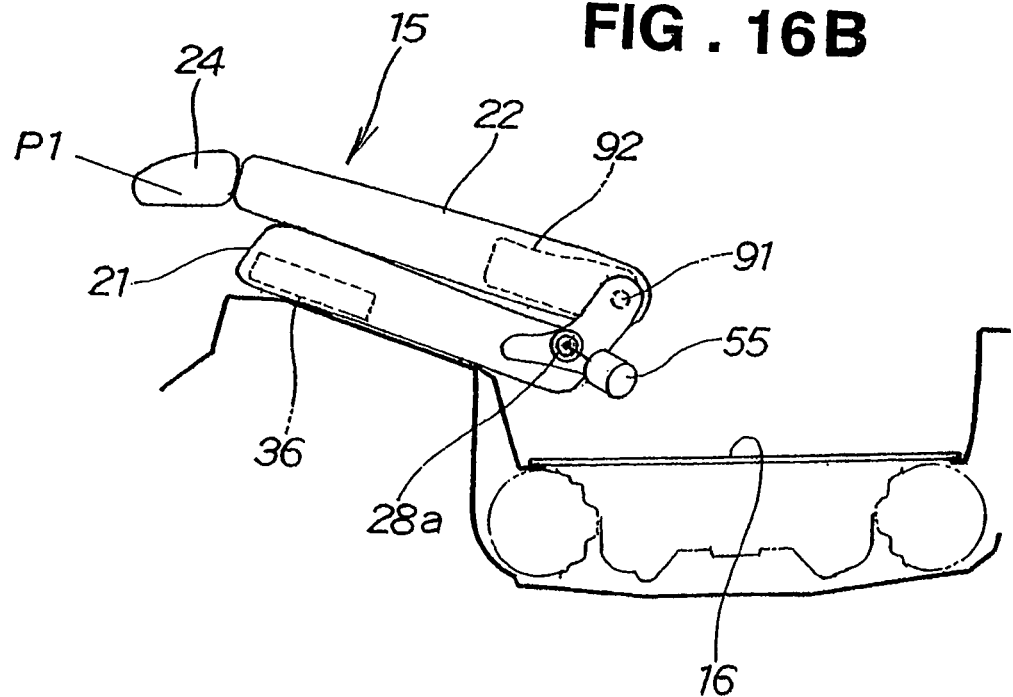
FIG. 16B is a view showing the seat back tipped forward.

As shown in FIG. 16B, the left seat back 22 tips forward together with the plate 92 and moves to a position P1, and the left lock mechanism 46 shown in FIG. 16A becomes locked. The left seat back 22 is locked in the forwardly tipped position P1.

In FIG. 16A, as a result of the intermediate swing lever 98 turning about the intermediate pin 99 as shown by the arrow j, the lock ON sensing switch 65 turns ON.

Figure 17A:
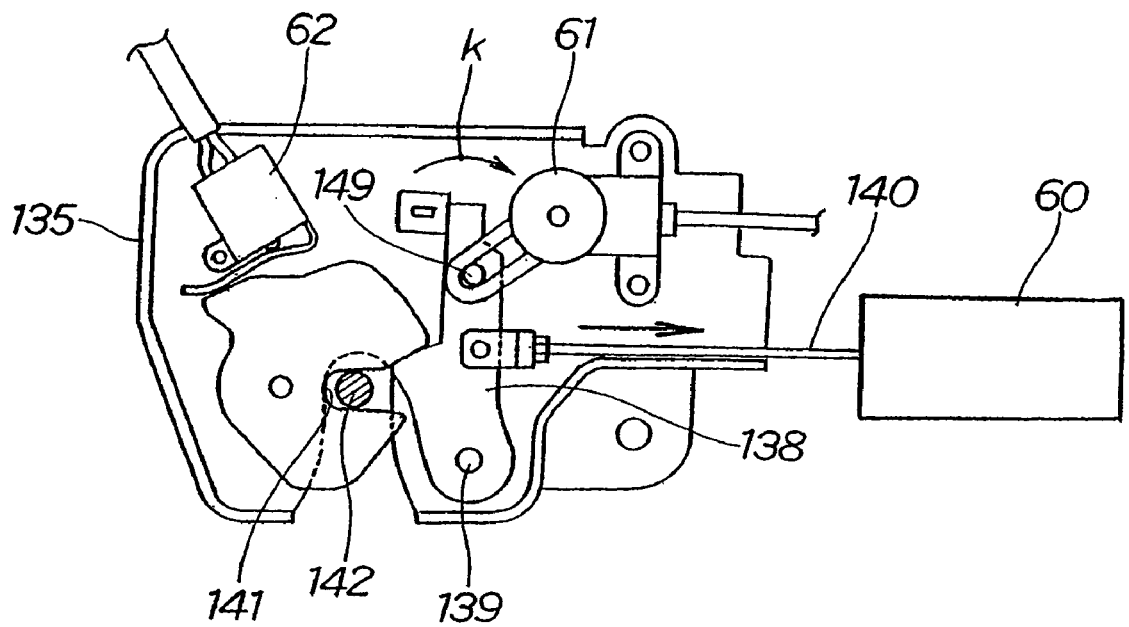
FIG. 17A and FIG. 17B are views showing a ratchet and a latch of cushion locking means in engaged and disengaged states.

Referring to FIG. 17A, when the control unit 36 (see FIG. 3) receives an ON signal from the lock ON sensing switch 65 shown in FIG. 16A, the cushion lock actuator 60 operates and the operating rod 140 retracts as shown with an arrow. Consequently, the ratchet 138 swings about the ratchet pin 139 as shown by the arrow k.

Figure 17B:
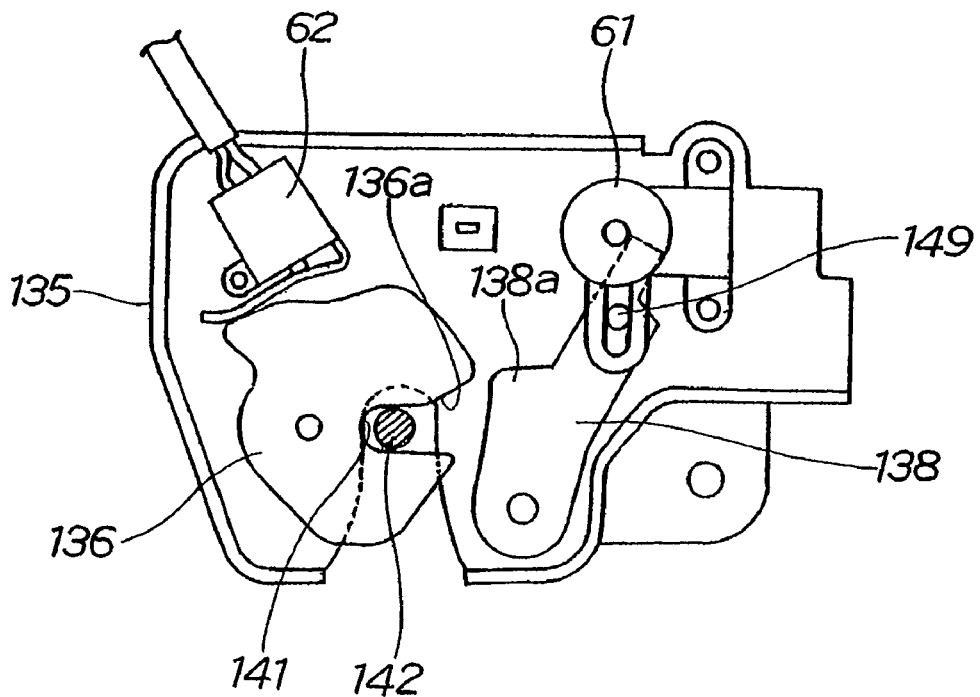

In FIG. 17B, the turning of the ratchet 138 causes its lock part 138a to disengage from a lock claw 136a of the latch 136, and the latch 136 is unlocked. At the same time, the release switch 61 is turned ON by a pin 149.

Figure 18A:
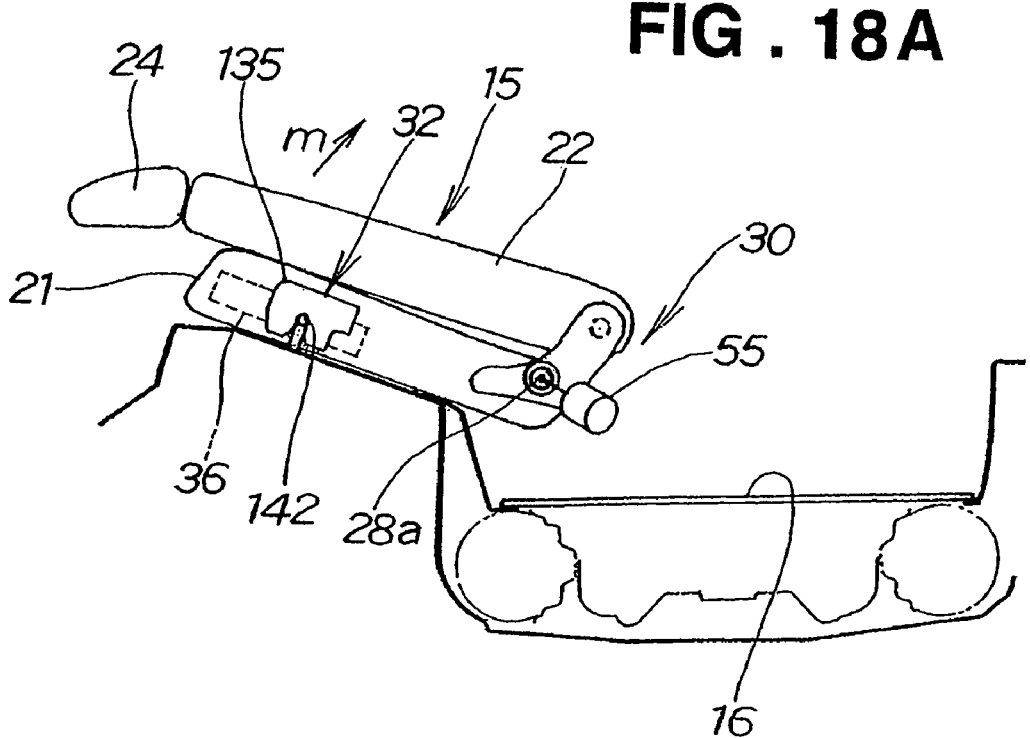
FIG. 18A, FIG. 18B, FIG. 19A and FIG. 19B are views showing cushion locking means and a striker engaged and disengaged.

Referring to FIG. 18A, when the control unit 36 receives an ON signal from the release switch 61 shown in FIG. 17B, the control unit 36 stops the cushion lock actuator 60 shown in FIG. 17A and drives the drive motor 55 of the swinging means 30. The drive of the drive motor 55 causes the left support shaft 28a to rotate forward, and with the left seat back 22 locked in its forwardly tipped position the seat cushion 21 is swung toward the rear of the vehicle body together with the left seat back 22 as shown by the arrow m.

Figure 18B:
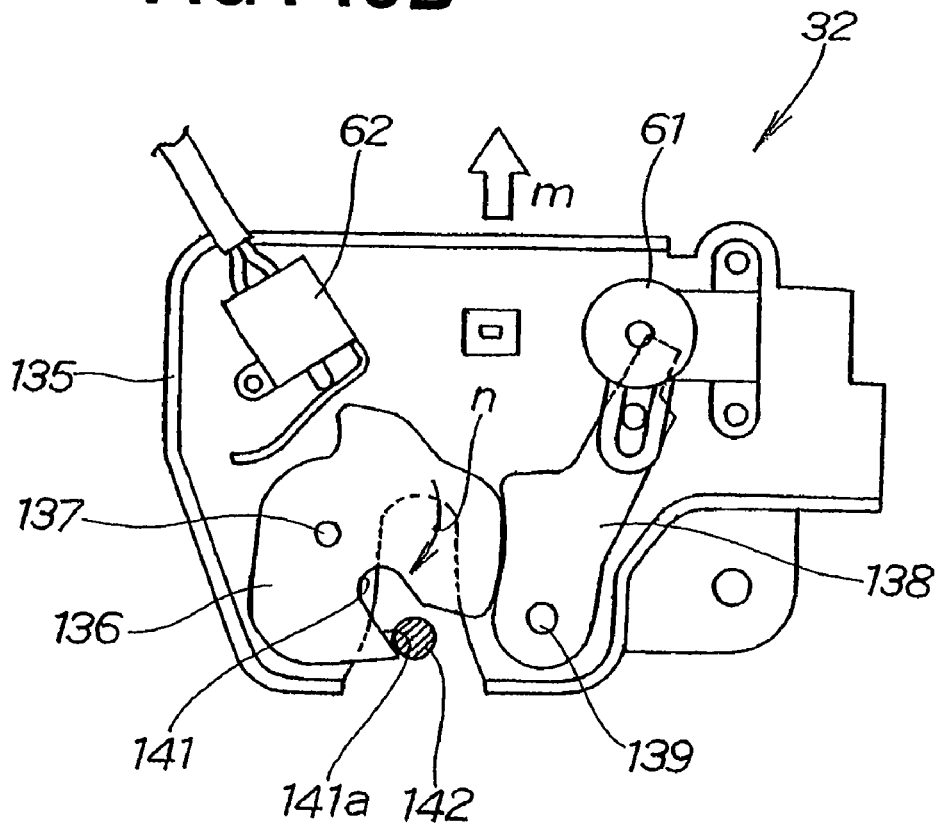

In FIG. 18B, the bracket 135 of the left cushion locking means 32 rising as shown by the arrow m integrally with the seat cushion 21 shown in FIG. 18A causes the latch 136 provided on the bracket 135 to rise.

Because the striker 142 is disposed inside the engaging slot 141 of the latch 136, the latch 136 rising causes a lower side 141a of the engaging slot 141 to interfere with the striker 142 and the latch 136 turns about the latch pin 137 as shown by the arrow n.

Figure 19A:
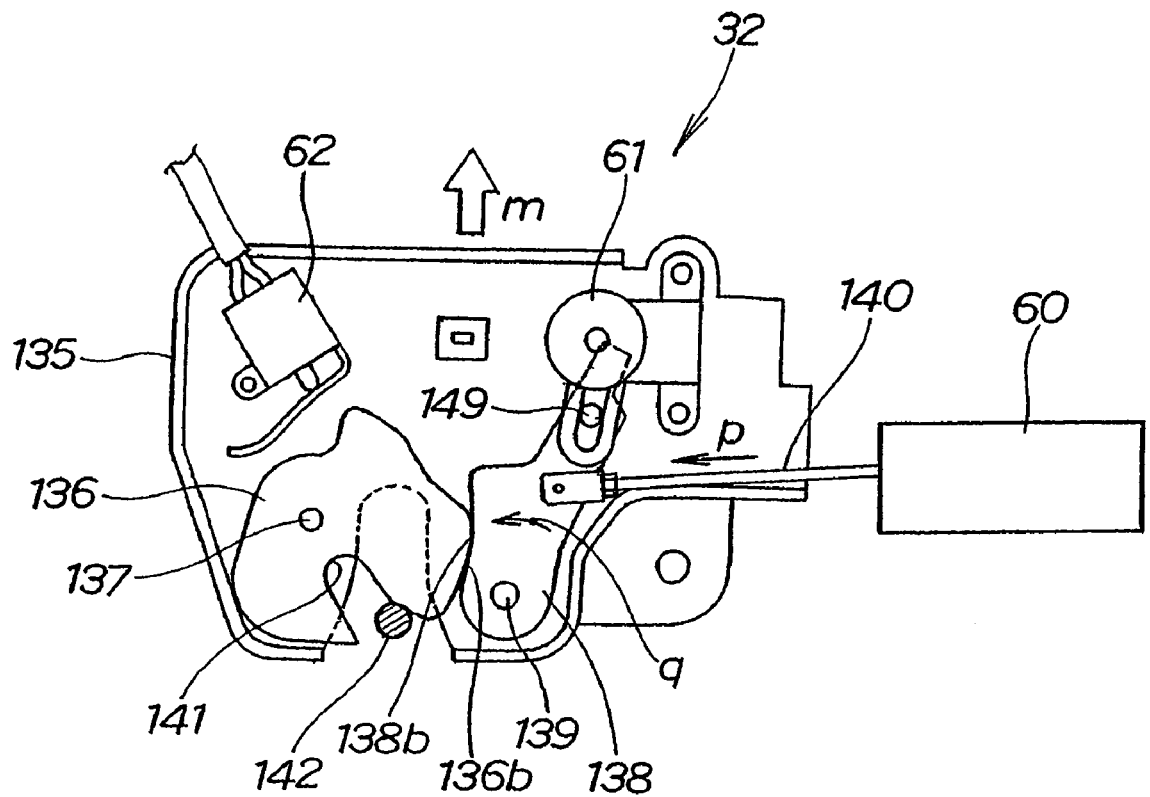

In FIG. 19A, the latch switch 62 is turned ON, the striker 142 comes out of the engaging slot 141 of the latch 136, and the left cushion locking means 32 is unlocked.

When the control unit 36 (see FIG. 3) detects that the latch switch 62 is ON, the control unit 36 operates the cushion lock actuator 60 to move the operating rod 140 forward as shown by the arrow p.

The ratchet 138 swings about the ratchet pin 139 as shown by the arrow q and presses a cam face 138b of the ratchet 138 against a cam face 136b of the latch 136. Consequently, the latch 136 is held in a position such that the striker 142 is out of the engaging slot 141.

Figure 19B:
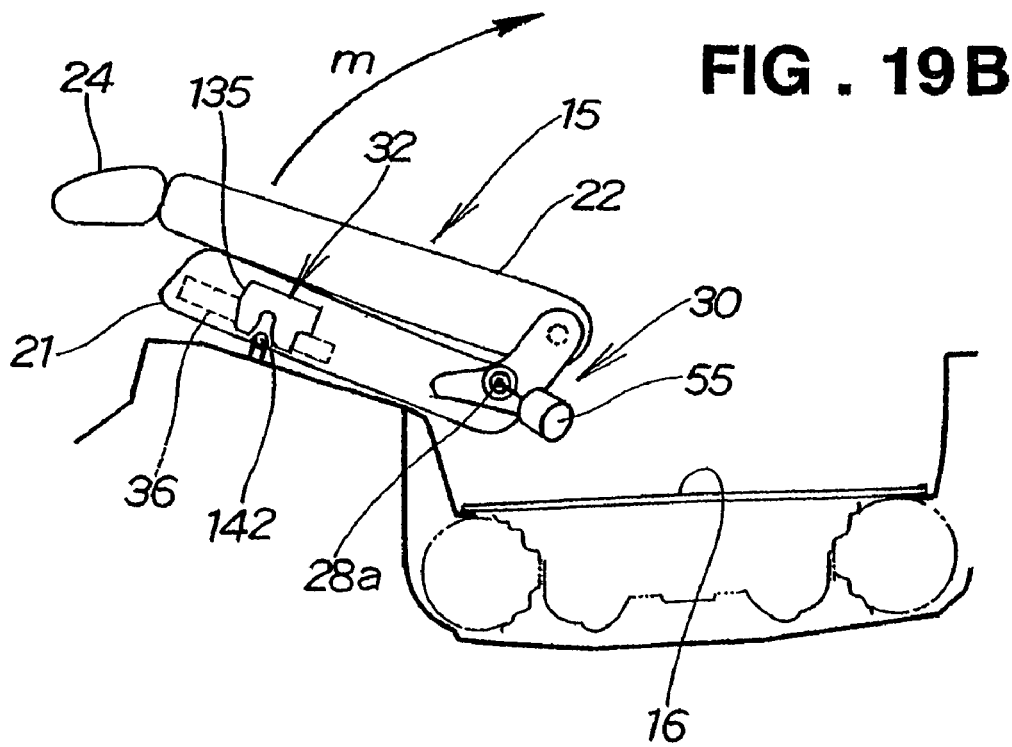

In FIG. 19B, as a result of the left cushion locking means 32 being unlocked, the seat cushion 21 becomes swingable further about the left support shaft 28a as shown by the arrow m toward the rear of the vehicle body. At this time, the control unit 36 detects the motor current of the drive motor 55 and determines whether or not the detected value is above a threshold value.

For example, when the seat cushion 21 interferes with an obstruction (not shown) and the motor current exceeds the threshold value, the drive motor 55 is stopped.

When the seat cushion 21 does not interfere with an obstruction, because the motor current value does not rise above the threshold value, the seat cushion 21 swings further toward the rear of the vehicle body as shown by the arrow m.

Here, as a result of the control unit 36 being incorporated into the seat cushion 21, the first through fourth harnesses 58, 64, 68 and 73 (see FIG. 3) can be incorporated into the seat cushion 21 and the seat backs 22, 23. Consequently, when the seat cushion 21 is made to swing, the first through fourth harnesses 58, 64, 68 and 73 are not caught by the seat cushion 21.

Next, on the basis of FIG. 20A and FIG. 20B, the operation of ST05 shown in FIG. 11 will be explained.

Figure 20A:
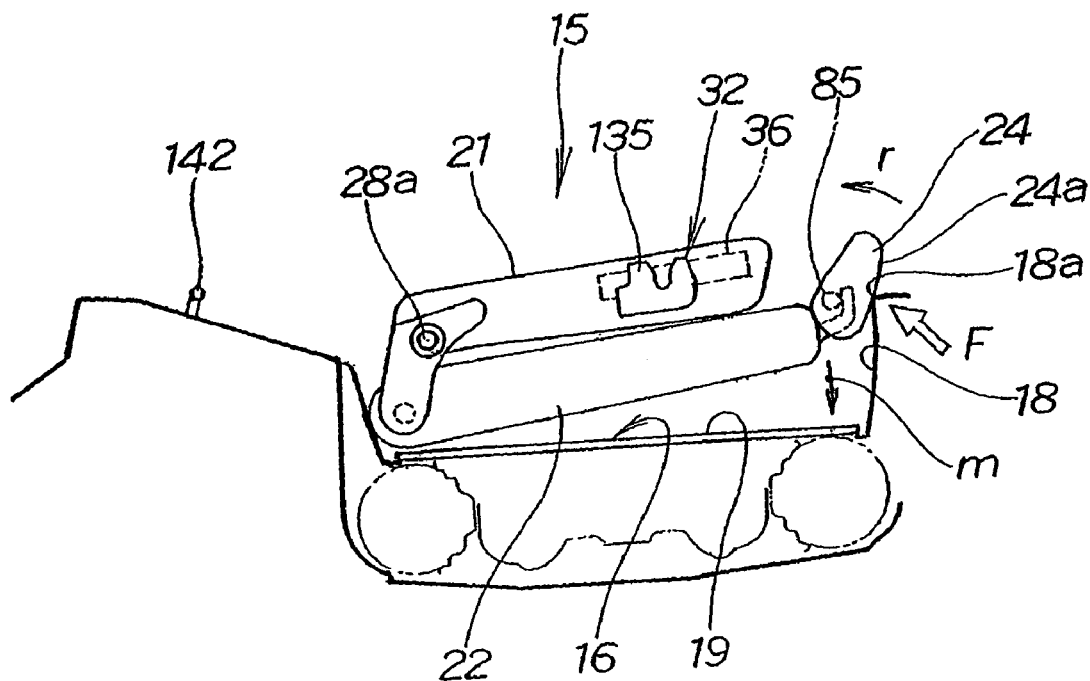
FIG. 20A and FIG. 20B are views showing a seat being stowed in a floor recess and having been completely stowed.

As shown in FIG. 20A, when the seat cushion 21 swings toward the rear of the vehicle body and stows in the floor recess 16, the rear face 24a of the left headrest 24 abuts with the upper end 18a of the rear wall 18 of the floor recess 16. Because a predetermined load F acts on the rear face 24a of the left headrest 24, the left headrest 24 is folded about the pivot shaft 85 as shown by the arrow r against the spring force of the coil spring 87 (see FIG. 4). In this state, the seat cushion 21 swings toward the rear of the vehicle body as shown by the arrow m.

Figure 20B:
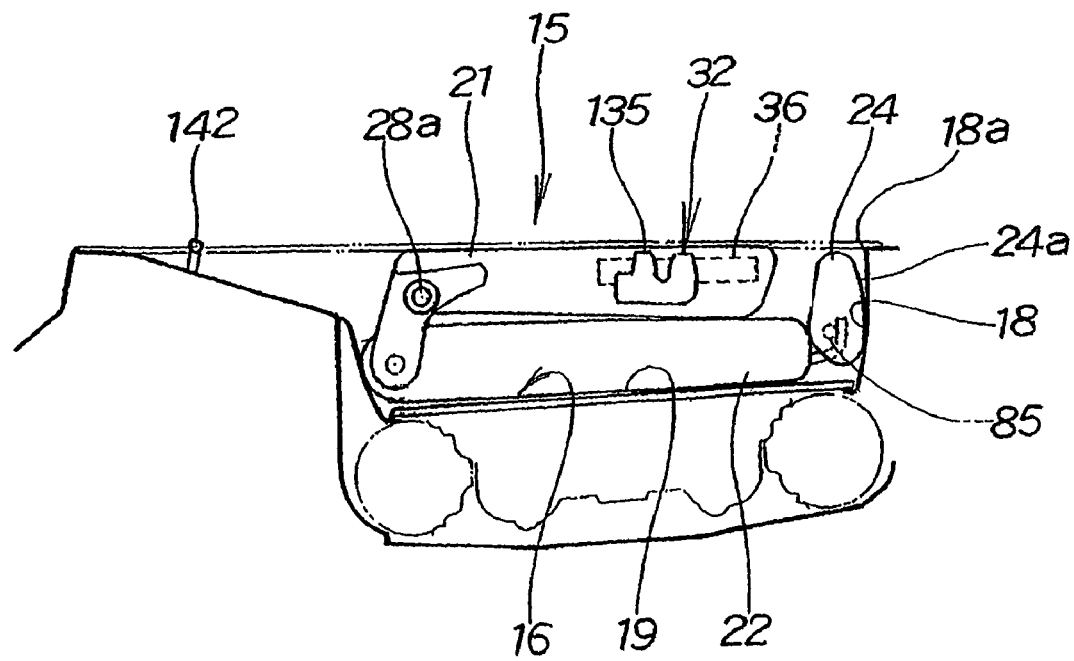

As shown in FIG. 20B, the seat cushion 21 abuts with the bottom face 19 of the floor recess 16. The motor current value of the drive motor 55 (see FIG. 3) rises above the threshold value and the drive motor 55 stops. As a result, the seat cushion 21 and the left seat back 22 (the second rear seat 15) are stowed in the floor recess 16 and the stowing process ends.

In stowing the seat cushion 21 and the left seat back 22 (the second rear seat 15) in the floor recess 16 like this, because it is not necessary for the left headrest 24 to be removed from the left seat back 22, the second rear seat 15 can be stowed in the floor recess 16 easily, without trouble.

Also, as shown in FIG. 20A, by the rear face 24a of the left headrest 24 abutting with the upper end 18a of the rear wall 18 forming the floor recess 16, the left headrest 24 swings about the pivot shaft 85 as shown by the arrow r and is folded against the spring force of the coil spring 87 (see FIG. 4). Because consequently members such as a shaft offset from the pivot shaft 91 (see FIG. 3) of the left seat back 22 and a wire can be made unnecessary, the construction can be made simple.

Next, the returning operation of the electric vehicle seat stowing system 20 will be described, on the basis of FIG. 21 through FIG. 25B.

FIG. 21 is a flow chart illustrating the returning operation of the second rear seat 15.

ST10: The tailgate is opened, and the seat operating button is pushed to turn the return switch ON.

ST11: The seat cushion is swung forward in the vehicle body.

ST12: The seat cushion is locked in its returned position.

ST13: The seat back is pulled upright by hand.

The contents of ST10 through ST13 will now be described in detail, on the basis of FIG. 22 through FIG. 25B.

Figure 22:
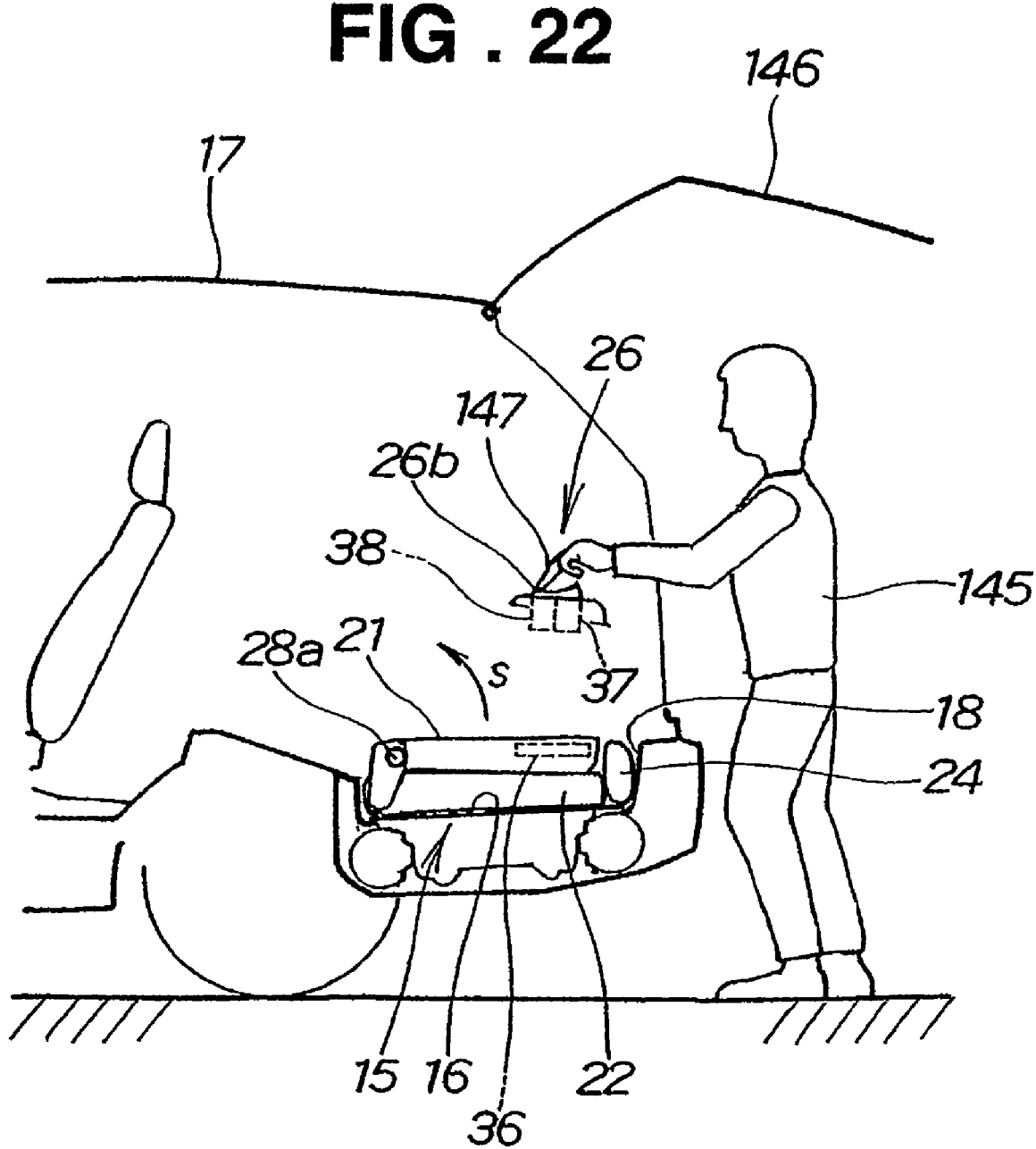

FIG. 22 is an illustration of ST10 of FIG. 21.

The user 145 opens the tailgate 146 at the back of the vehicle body 17 upward. Opening the tailgate 146 turns the tailgate OPEN switch (not shown) ON. After that, the returning operation part 26b of the seat operating button 26 mounted behind the second rear seat 15 is pressed with a finger 147 to turn ON the return switch 38.

After receiving the ON signal from the tailgate OPEN switch, the control unit 36 drives the drive motor 55 (see FIG. 2, FIG. 3) of the swinging means 30. The drive of the drive motor 55 swings the seat cushion 21 about the left support shaft 28a integrally with the left seat back 22 as shown by the arrow s and so takes it out from inside the floor recess 16.

As the seat cushion 21 and the left seat back 22 are taken out integrally from the floor recess 16, the left headrest 24 ceases to make contact with the rear wall 18 of the floor recess 16 and is returned to its ready position (see FIG. 23A) by the spring force of the coil spring 87. Therefore, in the taking out of the seat cushion 21 and the left seat back 22 (the second rear seat 15) from inside the floor recess 16, the trouble of returning the left headrest 24 to its ready position by hand can be eliminated.

Figure 23A:
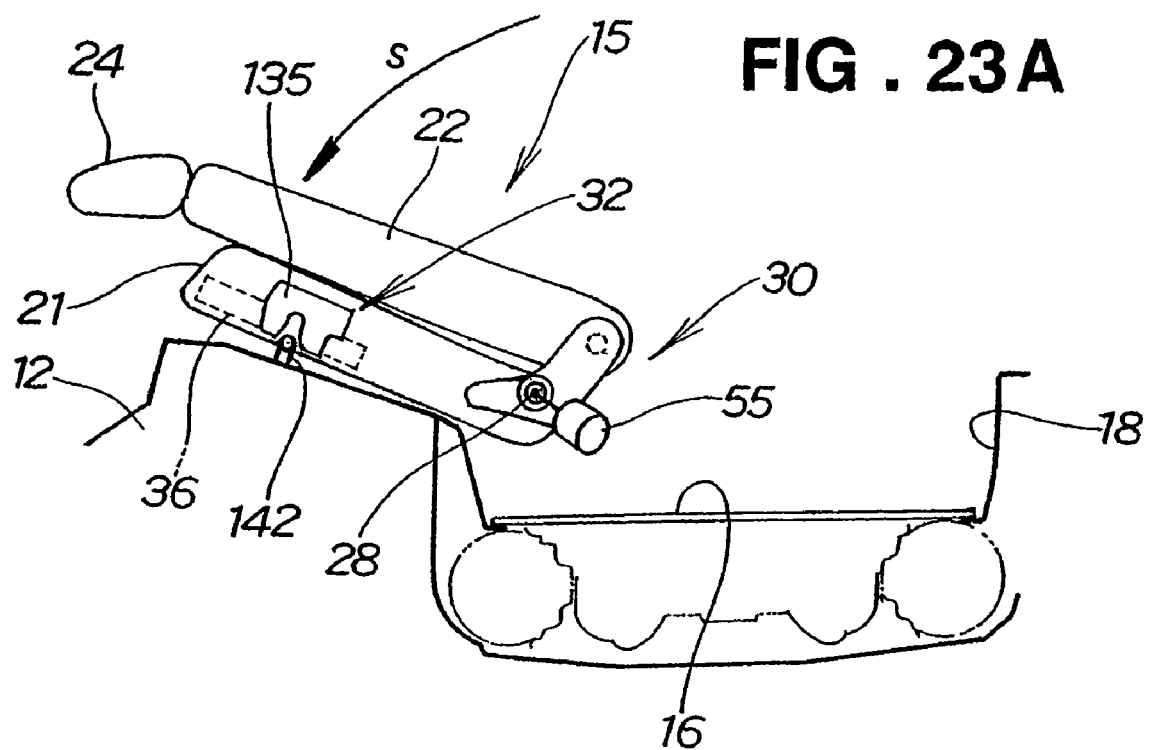
FIG. 23A and FIG. 23B are a view showing a seat rotated about its pivot shaft in a returning operation and a view showing cushion locking means engaging with a striker.

Then, as shown in FIG. 23A, as a result of the seat cushion 21 swinging as shown by the arrow s toward the front of the vehicle body, the rear side of the seat cushion 21 comes close to the floor 12.

Here, because the control unit 36 is incorporated into the seat cushion 21, the first through fourth harnesses 58, 64, 68 and 73 (see FIG. 3) are incorporated into the seat cushion 21 and the left and right seat backs 22, 23. Consequently, when the seat cushion 21 is swung, the first through fourth harnesses 58, 64, 68 and 73 are not caught by the seat cushion 21.

Figure 23B:
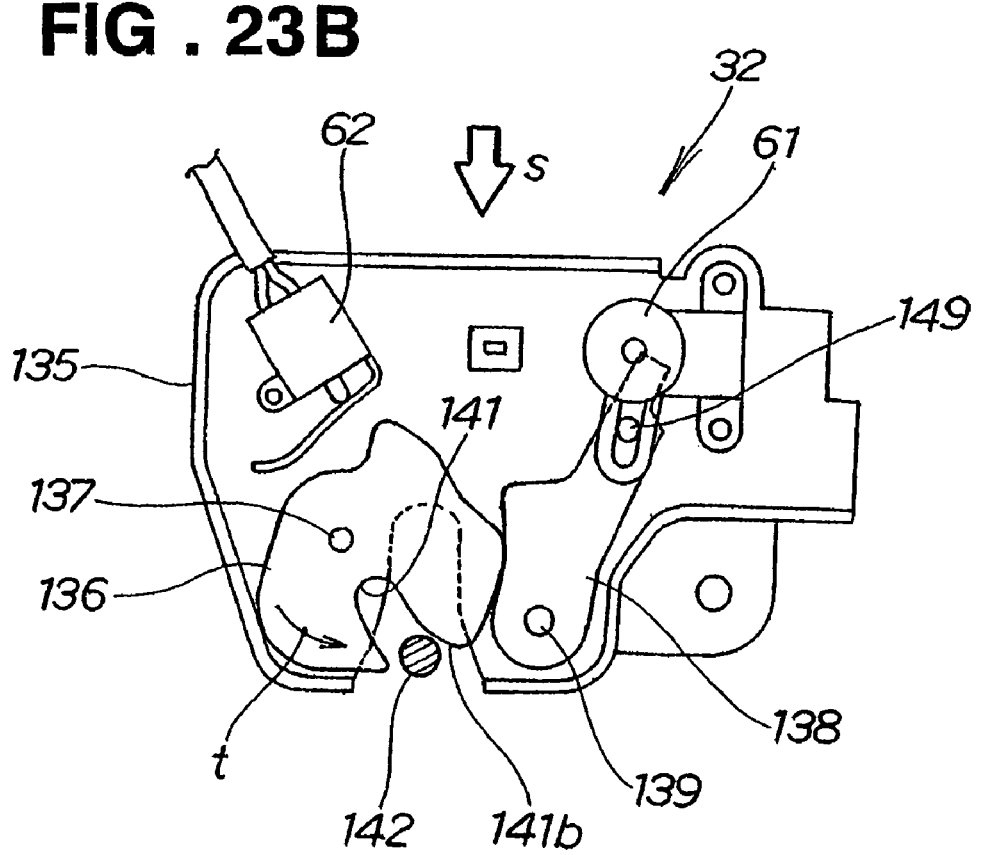

As shown in FIG. 23B, the upper side 141b of the engaging slot 141 of the latch 136 abuts with the striker 142. In this state, the bracket 135 and the latch 136 of the left cushion locking means 32 descend integrally with the seat cushion 21 (see FIG. 23A) as shown by the arrow s, the upper side 141b of the engaging slot 141 pushes the striker 142, and the latch 136 turns about the latch pin 137 as shown by the arrow t.

As shown in FIG. 24A, the latch 136 returns to its locked position, and the latch switch 62 turns OFF. The control unit 36 shown in FIG. 24B receives an OFF signal from the latch switch 62 and stops the drive motor 55 (see FIG. 2, FIG. 3) of the swinging means 30. Also, when the control unit 36 receives the OFF signal from the latch switch 62, it drives the actuator 70 of the left unlocking means 47 (see FIG. 5). As explained with reference to FIG. 12B through FIG. 13B, the driving of the actuator 70 unlocks the left lock mechanism 46 (see FIG. 5).

Then, as shown in FIG. 24B, the seat cushion 21 is locked in its ready position by the left cushion locking means 32.

Figure 25A:
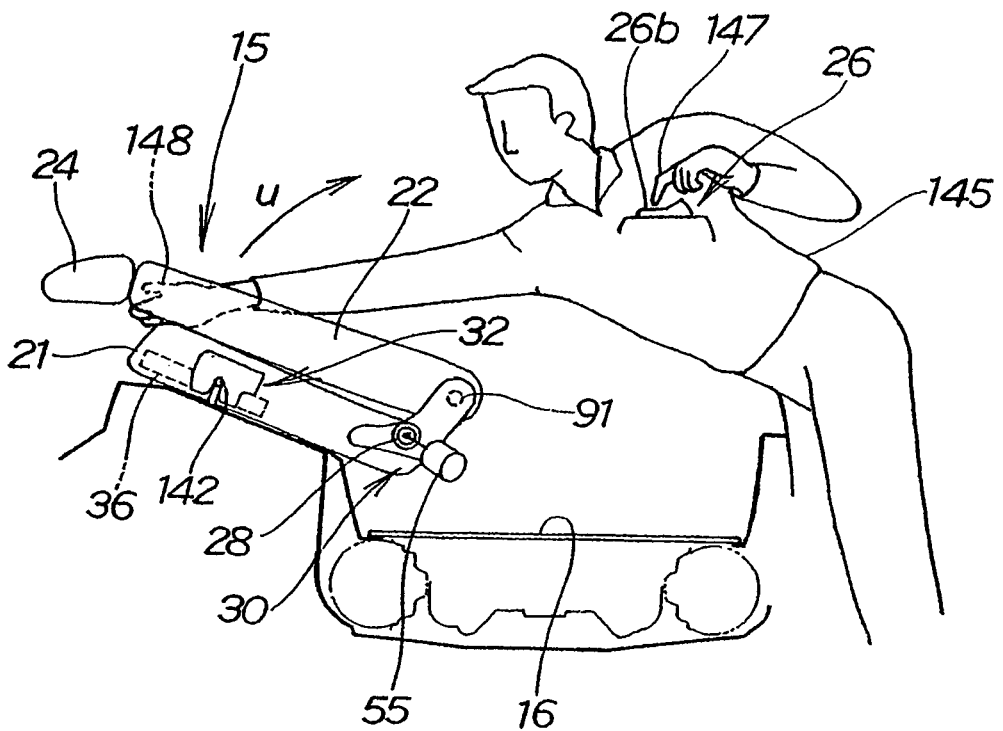
FIG. 25A and FIG. 25B are views showing the seat back being returned to its original position.
Figure 25B:
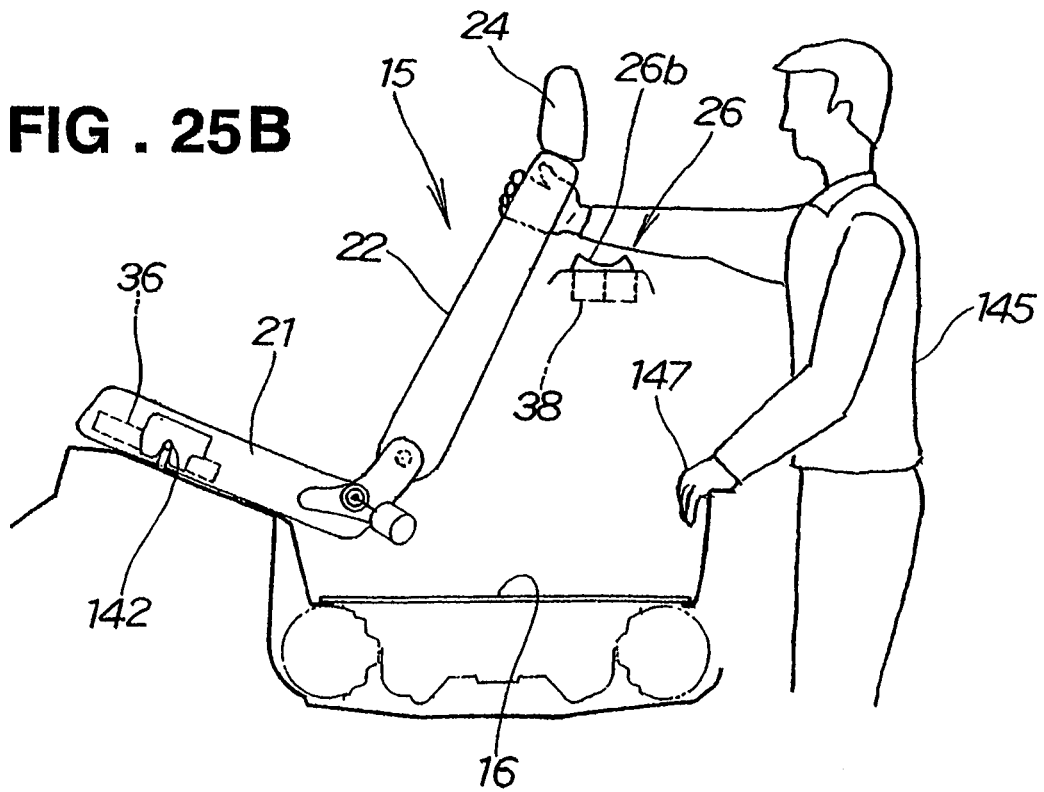

FIG. 25A and FIG. 25B show the seat back 22 being pulled upright by hand as described in ST13 of FIG. 21.

As shown in FIG. 25A, the user 145 places a hand 148 on the left seat back 22 and swings the left seat back 22 about the pivot shaft 91 toward the rear of the vehicle body as shown by the arrow u against the spring force of a torsion spring (not shown).

As shown in FIG. 25B, when the left seat back 22 has been swung to the desired position, the finger 147 is removed from the returning operation part 26b of the seat operating button 26. When the return switch 38 turns OFF, the control unit 36 drives the actuator 70 of the left unlocking means 47 (see FIG. 5).

In the same way as described with reference to FIG. 15A through FIG. 16A, the driving of the actuator 70 returns the left lock mechanism 46 (see FIG. 5) to its locked state. As a result, the left seat back 22 is held in the desired position, and the return operation of the second seat 15 is ended.

Thus, with the electric vehicle seat stowing system 20, the second rear seat 15 can be stowed in the floor recess 16 and can be returned from the floor recess 16 to its ready position by electric power.

Here, in FIG. 1, when the second rear seat 15 is being taken out of the floor recess 16, it is conceivable for example that the left seat back 22 might be lifted upright without the seat cushion 21 being locked by the left cushion locking means 32. At this time, the latch switch 62 shown in FIG. 24A is being kept ON.

In this state, when the ignition switch (not shown) of the vehicle 10 is turned ON, the control unit 36 receives an ON signal from the latch switch 62 and for example lights a warning lamp 152 provided in an instrument cluster 151 on an instrument panel 150. Thus the driver can be made aware that the seat cushion 21 has not been locked by the left cushion locking means 32.

Next, on the basis of FIG. 26 through FIG. 29, an electric vehicle seat stowing system 160 according to a second embodiment will be described. In the electric vehicle seat stowing system 160 of this second embodiment, parts the same as parts in the electric vehicle seat stowing system 20 of the first embodiment have been given the same reference numerals and will not be described again.

Figure 26:
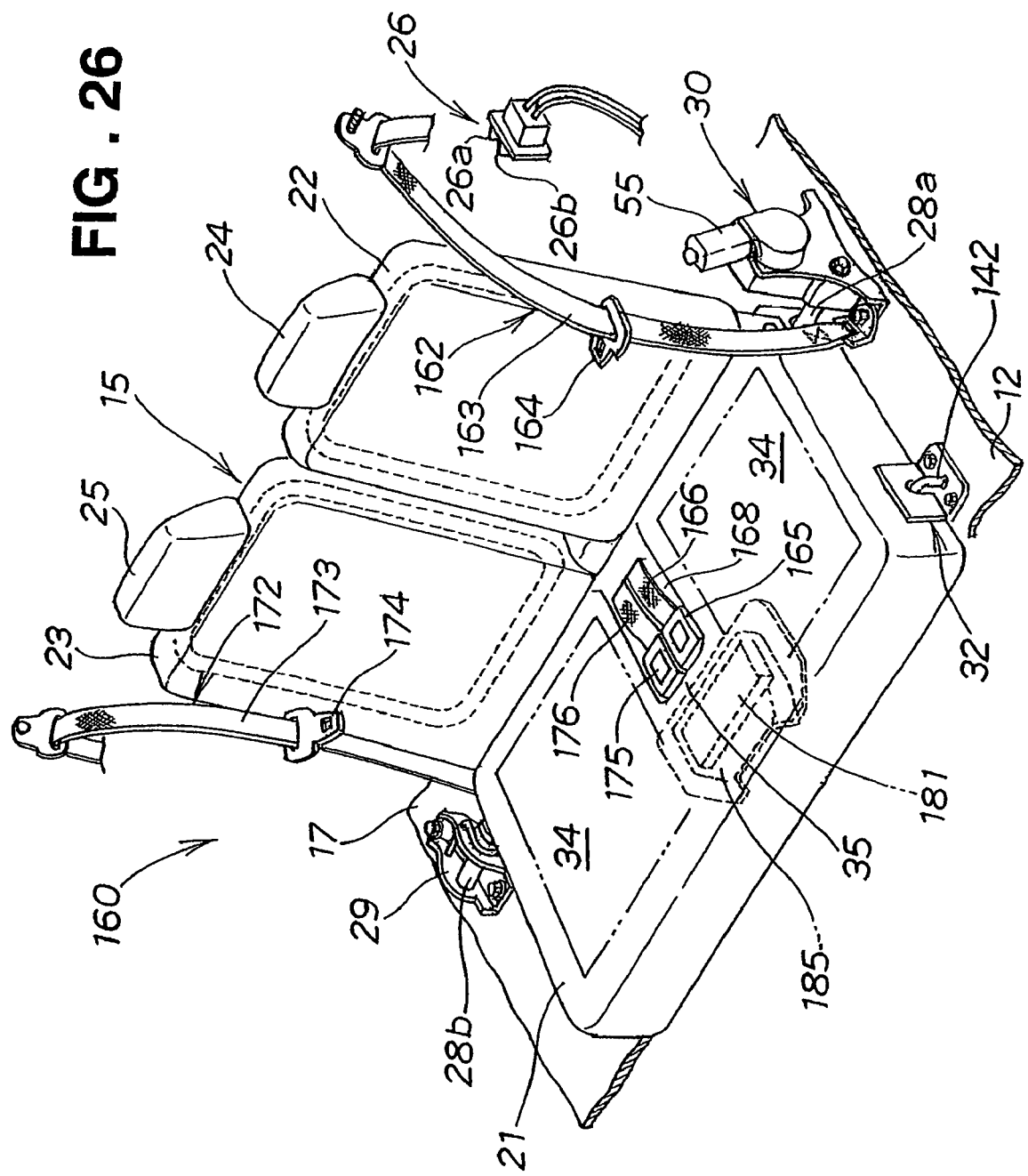
FIG. 26 is a perspective view of an electric vehicle seat stowing system according to a second embodiment, wherein a control unit is provided with a cover member.

Referring to FIG. 26, the electric vehicle seat stowing system 160 of the second embodiment has a second rear seat 15. The second rear seat 15 has a seat cushion 21 mounted on a floor 12; left and right seat backs 22, 23 mounted tippably forward and rearward on the rear of the seat cushion 21; a left headrest 24 mounted tippably forward and rearward on the top of the left seat back 22; and a right headrest 25 mounted tippably forward and rearward on the top of the right seat back 23.

A left side seat belt (seat belt) 162 is installed in a second rear seat 15 left side vehicle body panel (not shown). A left tongue 164 is movably fitted to a webbing 163 of the left side seat belt 162.

A left buckle 165 for clasping this left tongue 164 is connected by a belt 166 to a rear pipe 27b (see FIG. 29) of a cushion frame 27. This left buckle 165 is disposed in a roughly central rear recess 168 of the seat cushion 21.

Also, a right side seat belt (seat belt) 172 is installed in a second rear seat 15 right side vehicle body panel (not shown). A right tongue 174 is movably fitted to a webbing 173 of this right side seat belt 172.

A right buckle 175 for clasping this right tongue 174 is connected by a belt 176 to the rear pipe 27b (see FIG. 29) of the cushion frame 27. This right buckle 175 is disposed in the roughly central rear recess 168 of the seat cushion 21.

A seat operating button 26 is provided in a position behind the second rear seat 15 and away from the left side face of the second rear seat 15. The seat operating button 26 is mounted on a wall face of a vehicle body panel (not shown).

Figure 27:
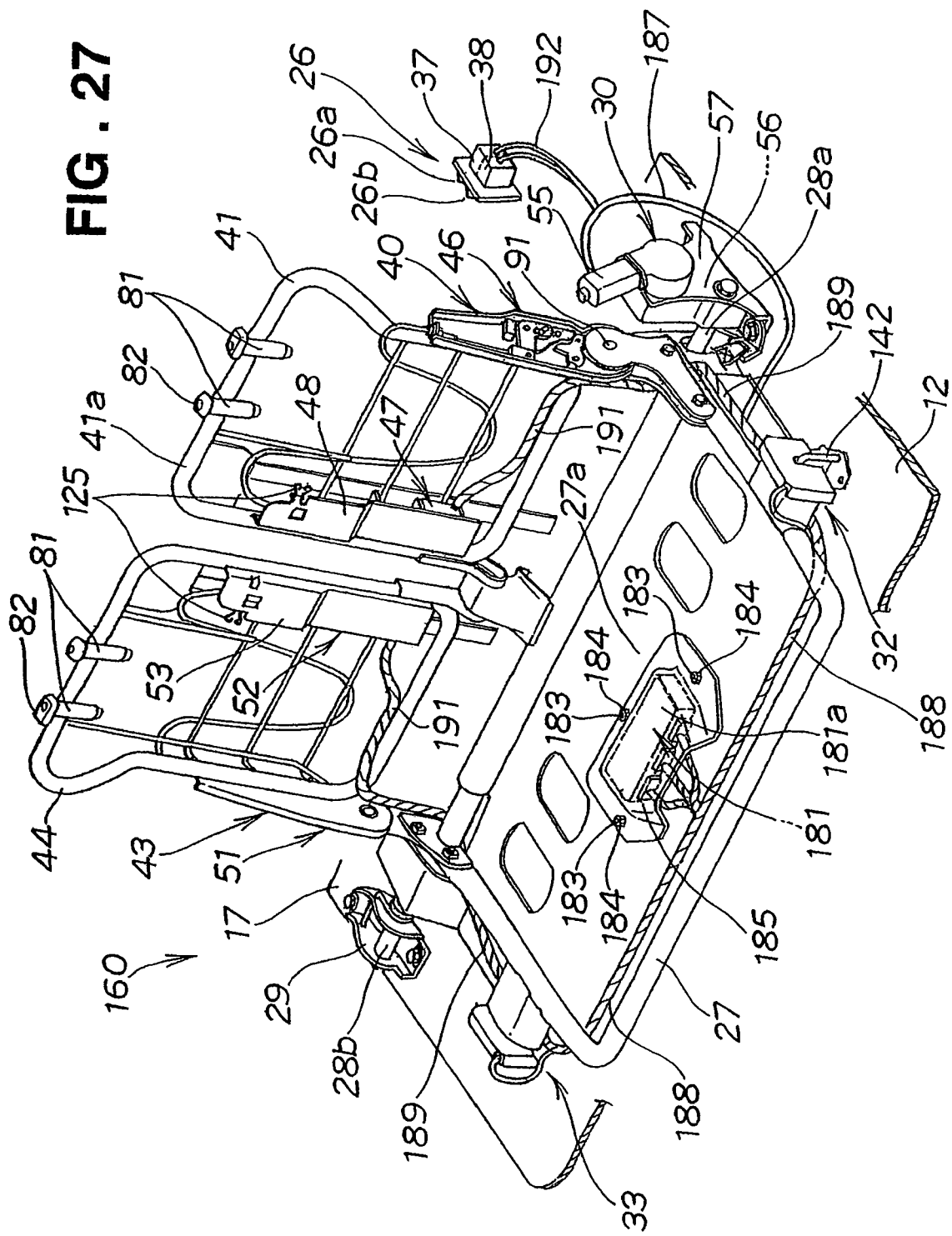
FIG. 27 is a perspective view showing the rear seat of FIG. 26 with its cover removed.

FIG. 27 shows an electric vehicle seat stowing system according to the second embodiment.

Left and right support shafts 28a, 28b are attached to the left and right rear ends of the cushion frame 27 of the seat cushion 21 (see FIG. 26). The right support shaft 28b is rotatably mounted to the vehicle body 17 by a mounting 29.

The left support shaft 28a is attached to swinging means 30. This swinging means 30 is mounted on the vehicle body 17.

Left and right cushion locking means 32, 33 are mounted on the left and right front ends of the cushion frame 27. A control unit 181 is disposed on a central part 35 (see FIG. 26) of the cushion frame 27, outside of left and right seating positions 34, 34.

Figure 28:
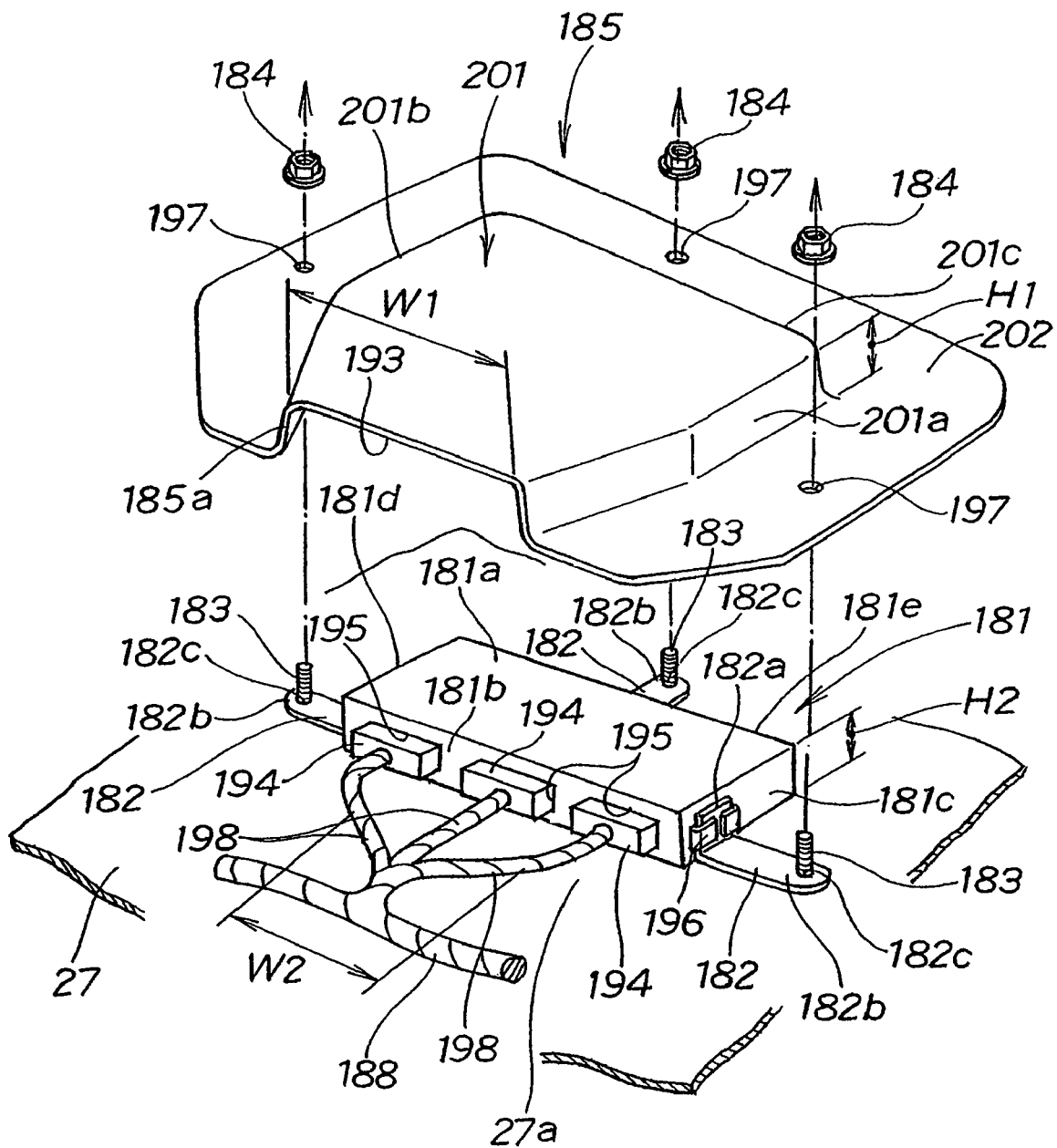
FIG. 28 is an exploded perspective view showing the cover member and control unit shown in FIG. 27.

Specifically, as shown in FIG. 28, three leg parts 182 extending horizontally from the control unit 181 are attached to the upper face center 27a of the cushion frame 27 by connecting members such as bolts 183 and nuts 184.

The upper face 181a of the control unit 181 is covered on its upper side by a dome-shaped cover member 185, whereby the control unit 181 is protected. This dome-shaped cover member 185 is incorporated into the central part 35 (see FIG. 26) of the seat cushion 21. The cover member 185 is also fixed with the bolts 183 and nuts 184.

Because the control unit 181 is incorporated into the central part 35 (see FIG. 26), outside of the left and right seating positions 34, 34, of the seat cushion 21, passengers can sit on parts of the seat cushion 21 which are away from the control unit 181 (that is, the left and right seating positions 34, 34). As a result, when passengers sit on the second rear seat 15, the control unit 181 does not impair the seating comfort of the passengers.

A left back frame 41 of the left seat back 22 (see FIG. 26) is mounted by a left reclining mechanism 40 to the left side of the rear of the cushion frame 27, swingably in the front-rear direction of the vehicle body. A right back frame 44 of the right seat back 23 (see FIG. 2) is mounted by a right reclining mechanism 43 to the right side of the rear of the cushion frame 27, swingably in the front-rear direction of the vehicle body.

A left unlocking mechanism 47 for unlocking a left lock mechanism 46 of the left reclining mechanism 40 is mounted on the left back frame 41 by a mounting bracket 48.

A right unlocking mechanism 52 for unlocking a right lock mechanism 51 of the right reclining mechanism 43 is mounted on the right back frame 44 by a mounting bracket 53.

The seat operating button 26 is mounted on a wall face of a vehicle body panel (not shown) behind and to the left of the left seat back 22 (see FIG. 26).

By transmitting rotation of a drive motor 55 through a speed-reducing gear set 56 (see also FIG. 3) to the left support shaft 28a, for example the swinging means 30 rotates the left support shaft 28a forward by reverse-rotating the drive motor 55 and rotates the left support shaft 28a in reverse by forward-rotating the drive motor 55. The drive motor 55 and the speed-reducing gear set 56 are mounted to the vehicle body 17 by a bracket 57. The drive motor 55 is connected to the control unit 181 by a first harness 187.

The left cushion locking means 32 has a cushion lock actuator 60, a release switch 61, a latch switch 62 and a lock switch 63, shown in FIG. 10. The cushion lock actuator 60, the release switch 61, the latch switch 62 and the lock switch 63 are connected to the control unit 181 by a second harness 188.

The left lock mechanism 46 of the left reclining mechanism 40 includes a lock ON sensing switch 65, a forward tip sensing switch 66 and a lock OFF sensing switch 67, shown in FIG. 5. The lock ON sensing switch 65, the forward tip sensing switch 66 and the lock OFF sensing switch 67 are connected to the control unit 181 by a third harness 189.

The left unlocking mechanism 47 includes an actuator 70 and upper and lower Hall sensors 71, 72, as shown in FIG.

5, FIG. 7 and FIG. 8. The actuator 70 and the upper and lower Hall sensors 71, 72 are connected to the control unit 181 by a fourth harness 191.

A stowing switch 37 and a return switch 38 operated by the seat operating button 26 are connected to the control unit 181 by a fifth harness 192. The fifth harness 192 is connected to the control unit 181 along with the first harness 187, which it joins part-way along its length.

The seat operating button 26 has a stowing operation part 26a and a returning operation part 26b. Pushing the stowing operation part 26a turns the stowing switch 37 ON. Pushing the returning operation part 26b turns the return switch 38 ON.

The first through fifth harnesses 187, 188, 189, 191, 192 are connected to the control unit 181 via an opening 193 (see FIG. 28) provided in the front end 185a of the cover member 185.

FIG. 28 shows the relationship between the control unit 181 and the cover member 185 shown in FIG. 27.

The control unit 181 for example has its exterior shaped like a rectangular box. Three connection parts 195 for connecting three connectors 194 to are provided on the front wall 181b of the control unit 181. Insertion parts 196 are provided on the left and right side walls 181c, 181d and the rear wall 181e of the control unit 181 (only the insertion part 196 on the left side part 181c is shown in the figure).

By base end parts 182a (that is, parts bent to the vertical) of the three leg parts 182 mentioned above being inserted into these insertion parts 196, the leg parts 182 are attached to the left and right side walls 181c, 181d and the rear wall 181e.

Each of the leg parts 182 has a mounting hole 182c formed in its distal end 182b. The bolts 183 are passed through the mounting holes 182c and the bolts 183 are made to project from the mounting holes 182c.

The projecting bolts 183 are passed through mounting holes 197 formed in the cover member 185, and the nuts 184 are screwed onto the bolts 183 projecting from the mounting holes 197. By this means, the control unit 181 and the cover member 185 are mounted to the upper face center 27a of the cushion frame 27, and the upper face 181a of the control unit 181 is covered with the cover member 185.

The cover member 185 has a cover part 201 formed in its middle and protruding upward. The opening 193 is formed in the front end of the cover part 201, that is, in the front end 185a of the cover member 185. The cover member 185 has a mounting plate 202 formed along the lower ends of left and right side walls 201a, 201b and the lower end of a rear wall 201c of the cover part 201.

The height H1 of the left and right side walls 201a, 201b and the rear wall 201c of the cover part 201 is set to be slightly greater than the height H2 of the control unit 181. By this means, the control unit 181 can be covered with the cover part 201.

Also, for example the width W1 of the opening 193 of the cover part 201 is set to be slightly greater than the width W2 at an intermediate position of the harnesses 198 extending from the three connectors 194. As a result, the three harnesses 198 extending from the three connectors 194 can pass through the opening 193.

Figure 29:
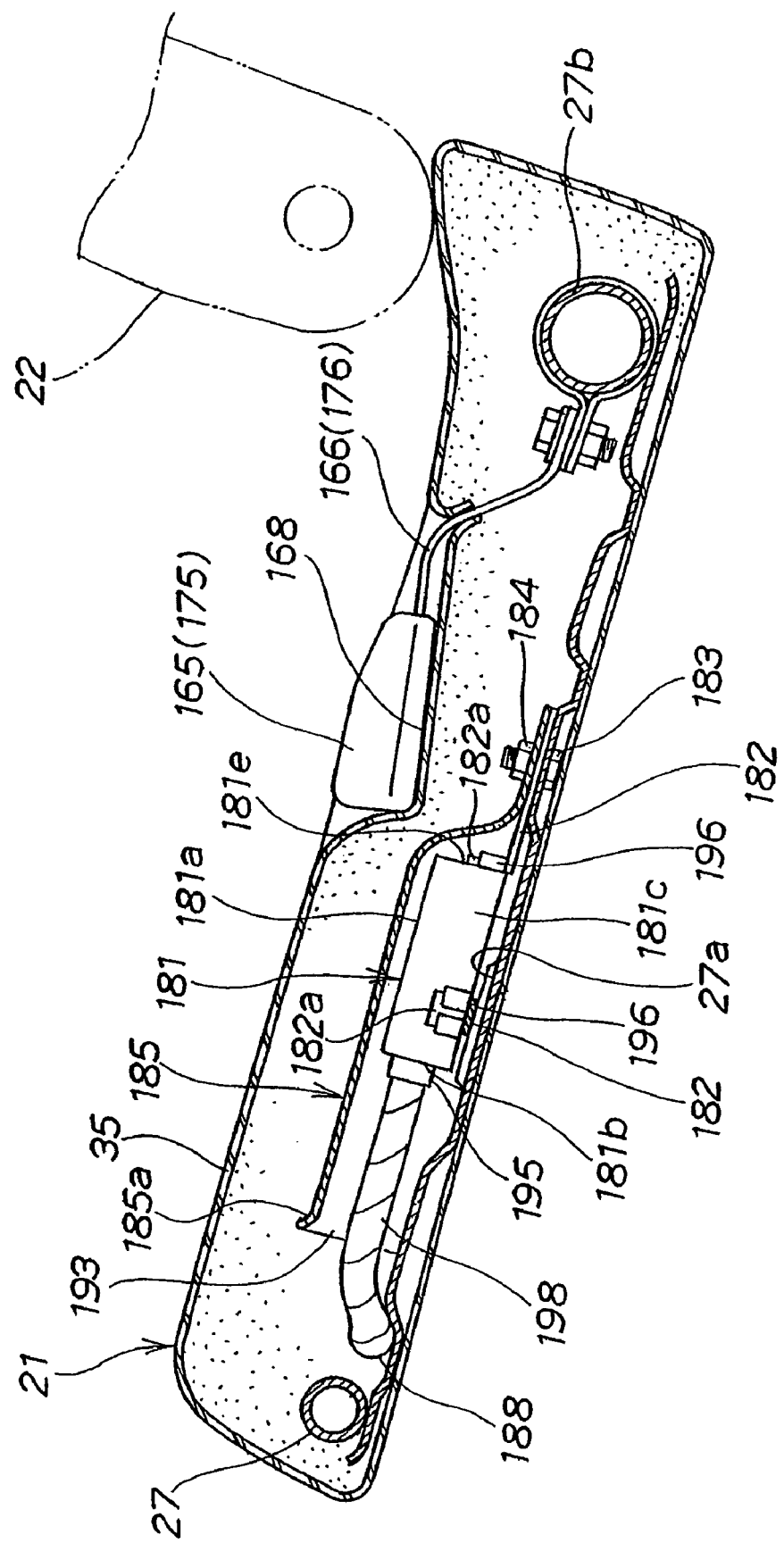
FIG. 29 is a sectional view of a seat cushion of the second embodiment shown in FIG. 26.

FIG. 29 is a sectional view of the seat cushion 21 shown in FIG. 26.

The upper face 181a of the control unit 181 and the harnesses 198 in part are surrounded by the dome-shaped cover member 185, and this cover member 185 is incorporated into the central part 35 (see also FIG. 26) of the seat cushion 21.

As a result of the upper face 181a of the control unit 181 being surrounded by the cover member 185, outside loads such as the weight of the passengers when passengers are sitting on the seat cushion 21 and the weight of the luggage when luggage is placed on the seat cushion 21 can be borne by the cover member 185. By this means it is possible to prevent the weight of passengers or the weight of luggage from acting on the control unit 181, and the control unit 181 can be protected from outside loads.

Also, as a result of the cover member 185 being incorporated into the seat cushion 21, even when a passenger sits on the seat cushion 21, the cover member 185 does not impair the sitting comfort of the passenger.

Although as explained above the cover member 185 is constructed to withstand outside loads such as the weight of passengers and luggage, it is preferable for passengers not to be seated above the cover member 185.

By the opening 193 being formed in the front end 185a of the cover member 185, the multiple harnesses 198 (see FIG. 28) for connection to the control unit 181 can be brought together at the front wall 181b of the control unit 181. Consequently, it is not necessary for any harness to extend toward the rear of the vehicle body through the rear wall 181e of the control unit 181.

As a result, space for forming the central rear recess 168 (see also FIG. 26) behind the dome-shaped cover member 185 can be secured, and the left and right seat belt buckles 165, 175 (see FIG. 26) can be stowed in this central rear recess 168.

By the left and right seat belt buckles 165, 175 being stowed in the central rear recess 168 behind the dome-shaped cover member 185 like this, the area behind the cover member 185 can be used effectively.

Also, by the left and right buckles 165, 175 being stowed in the central rear recess 168 behind the cover member 185, passengers can be prevented from sitting on the central part 35 containing the dome-shaped cover member 185. By this means it is possible to surely prevent the cover member 185 from deforming under an outside load such as the weight of passengers, and the control unit 181 can be surely protected from outside loads.

Here, if the multiple harnesses 198 (see FIG. 28) for connection to the control unit 181 were to be connected for example to the left and right side walls 181c, 181d of the control unit 181, the harnesses 198 would be laid underneath the left and right seating positions 34, 34 (see FIG. 26).

However, by the harnesses 198 being brought together at the front wall 181b of the control unit 181, the multiple harnesses 198 can be laid away from the left and right seating positions 34, 34 (see FIG. 26). Consequently, the load of the passengers can be prevented from acting on the harnesses 198 when passengers sit in the left and right seating positions 34, 34.

Although in the first and second embodiments examples were described wherein an electric vehicle seat stowing system 20 was applied to a second rear seat 15 of a vehicle capable of carrying 6 to 7 people, there is no restriction to this, and it can also be applied to a rear seat of a vehicle capable of carrying 4 to 5 people.

Also, although in the first and second embodiments examples were described wherein the left and right unlocking means 47, 52 were incorporated respectively into the left and right seat backs 22, 23, there is no restriction to this, and the left and right unlocking means 47, 52 can alternatively be incorporated into the seat cushion 21. In this case, fasteners 131, 131 are provided in the parts of the seat cushion 21 corresponding to the left and right unlocking means 47, 52, and access holes 132, 132 are provided on the inner sides of the fasteners 131, 131. Consequently, the connecting cable 110 can be easily disconnected from the actuator 70 by opening the fasteners 131, 131 and the access holes 132, 132.

Also, although in the first embodiment an example was described wherein the fasteners 131, 131 and the access holes 132, 132 were provided in the rear sides of the left and right seat backs 22, 23, there is no restriction to this, and they may alternatively be provided in other places such as in the front sides or the side faces of the left and right seat backs 22, 23.

Also, although in the second embodiment an example was described wherein, as the cover member 185, as shown in FIG. 28, a cover part 201 is formed centrally, an opening 193 is formed in the front end of the cover part 201, and a mounting plate 202 is formed along the lower ends of left and right side walls 201a, 201b and the lower end of a rear wall 201c of the cover part 201, the shape of the cover member 185 is not restricted to this. In short, any construction with which the top of the control unit 181 can be covered and the multiple harnesses 198 can be taken out from the control unit 181 to the front can be used.

Next, the operation of the control unit 36, 181 will be described, on the basis of FIG. 30 through FIG. 41.

Figure 30:
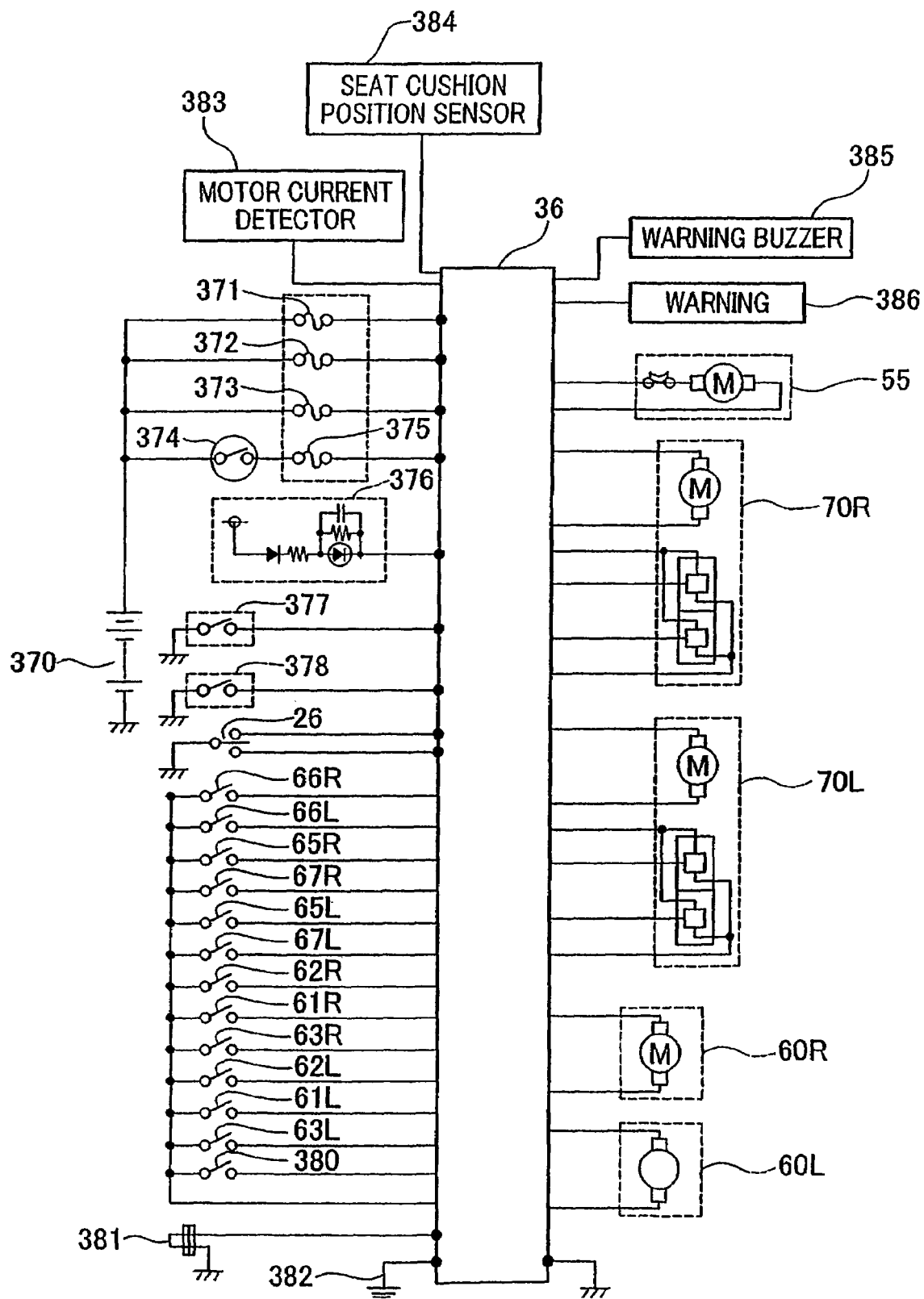
FIG. 30 is an electrical circuit diagram of an electric stowing system according to the invention.

FIG. 30 shows an electrical circuit diagram of an electric vehicle seat stowing system.

Referring to FIG. 30, a battery 370 is connected to a control unit 36 by fuses 371, 372 and 373 and an ignition switch 374 and a fuse 375.

A warning lamp 376, an AT shift position switch 377, a tailgate switch 378 and a seat operating button 26, which is command means for starting seat operation, are connected to the control unit 36.

Left and right forward tip sensing switches 66R, 66L, a right lock ON sensing switch 65R, a right lock OFF sensing switch 67R, a left lock ON sensing switch 65L, a left lock OFF sensing switch 67L, a right latch switch 62R, a right release switch 61R, a right lock switch 63R, a left latch switch 62L, a left release switch 61L, a left lock switch 63L, and a seat floating sensing switch 380 are connected to the control unit 36.

A short coupler 381 and a ground line 382 are connected to the control unit 36.

Through an output interface, the drive motor 55 of the swinging means 30, the left and right unlocking means 47, 52, a left actuator 70L and a right actuator 70R, a right cushion lock actuator 60R and a left cushion lock actuator 60L are connected to the control unit 36.

As shown in FIG. 3, when the stowing operation part 26a of the seat operating button 26 is operated and the stowing switch 37 is thereby turned ON, a seat stowing operation starts, and when the returning operation part 26b is operated and the return switch 38 is thereby turned ON a seat returning operation starts.

A motor current detector 383 for detecting the motor current of the drive motor 55 of the swinging means 30 and a seat cushion position sensor 384 for detecting the angle of the seat cushion 21 from the floor 12 are connected to the control unit 36.

Also, a warning buzzer 385 and a warning 386 are connected to the control unit 36. The warning 386 includes an indicator such as a display lamp 152 provided in the instrument duster 151 of the instrument panel 150 shown in FIG. 1, and for example makes the display lamp 152 flash. The seat operating button 26 is disposed behind the seat.

As shown in FIG. 3, for example a slip clutch 55b is provided in a coupling part 55a coupling the drive motor 55 and the speed-reducing gear set 56 of the swinging means 30, so that the mechanism can be operated manually without the involvement of the control unit 36.

Using these switches and sensors, the control unit 36 operates in accordance with the flow chart shown in FIG. 33A through FIG. 33D and FIG. 39.

Figure 31A:
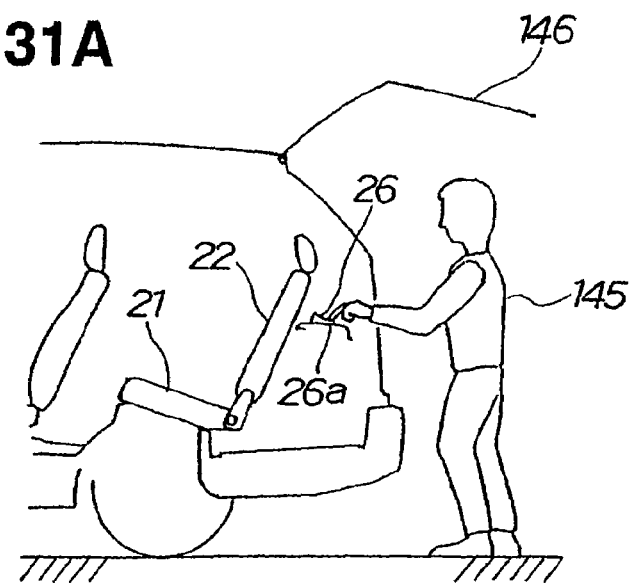
FIG. 31A, FIG. 31B and FIG. 31C are views showing actions of tipping forward a seat back and stowing a seat in a floor recess.
Figure 31B:
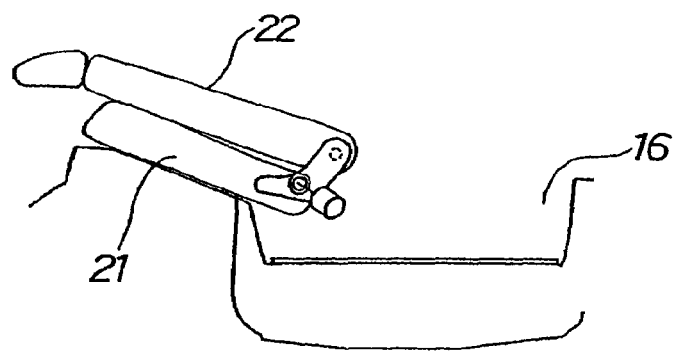
Figure 31C:
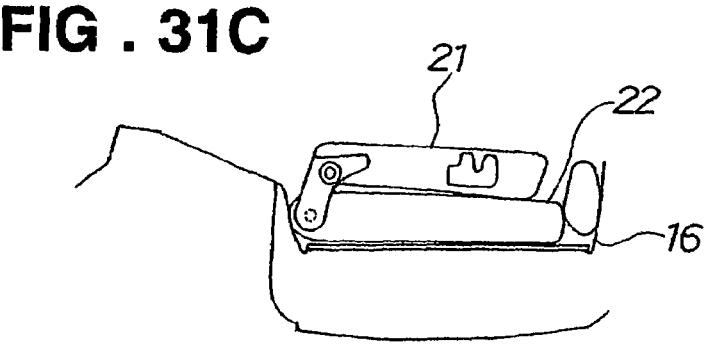
Figure 32A:
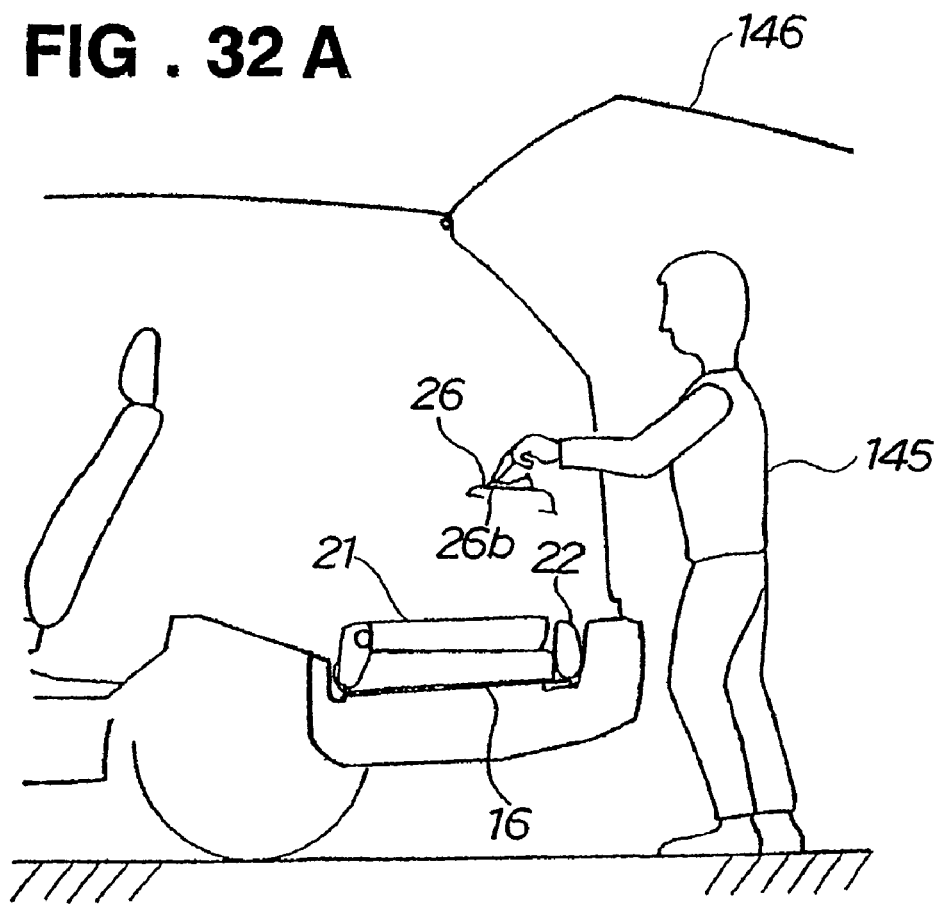
FIG. 32A and FIG. 32B are views showing actions of returning a seat stowed in a floor recess.
Figure 32B:
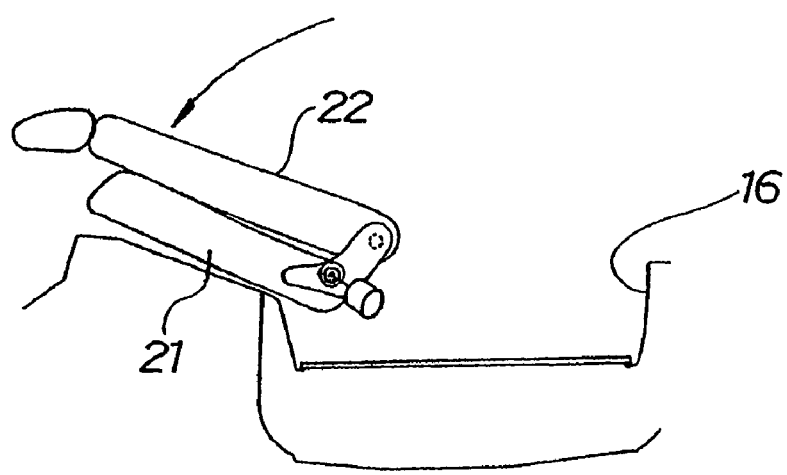
Figure 33A:
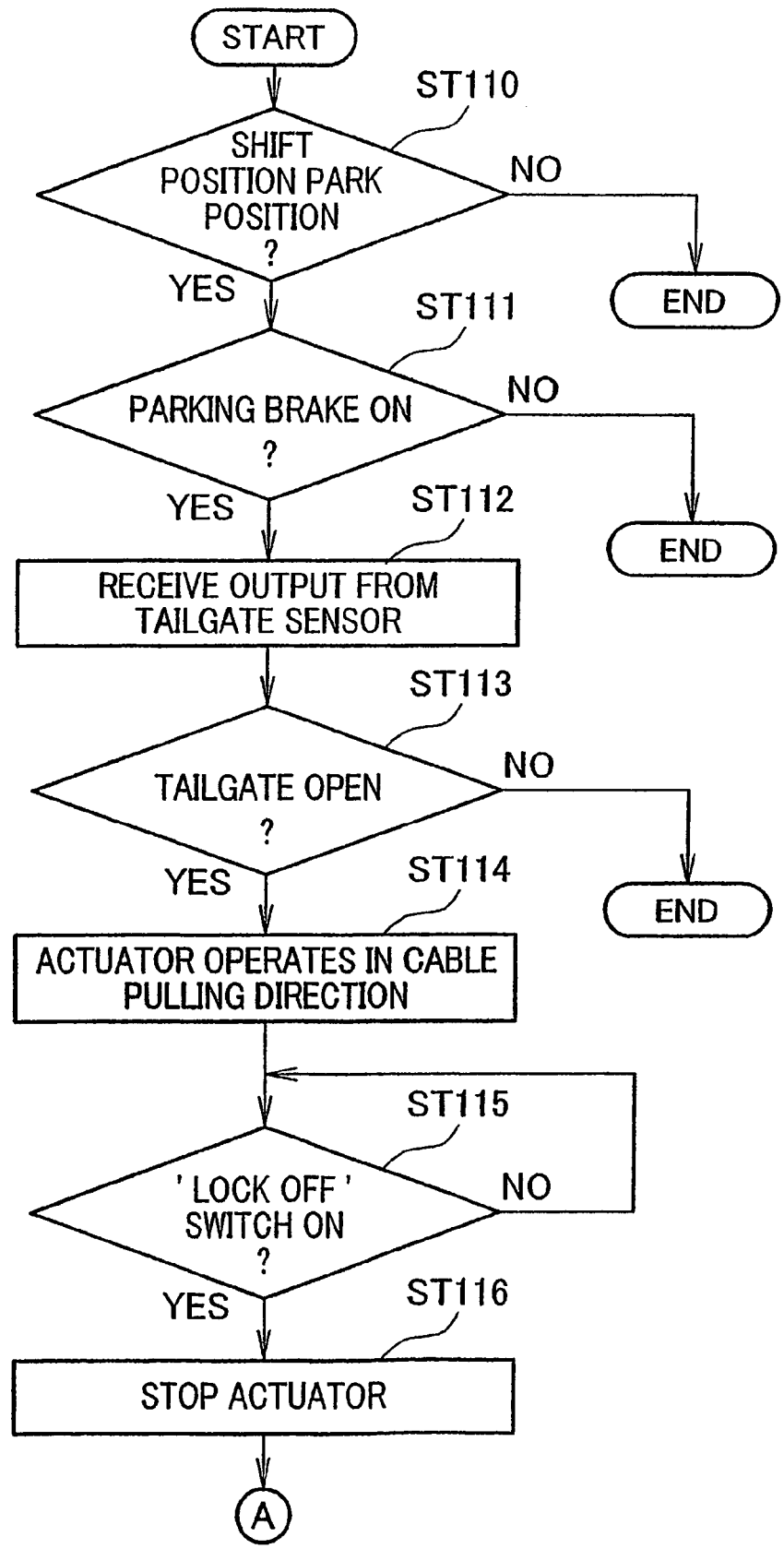
Figure 33D:
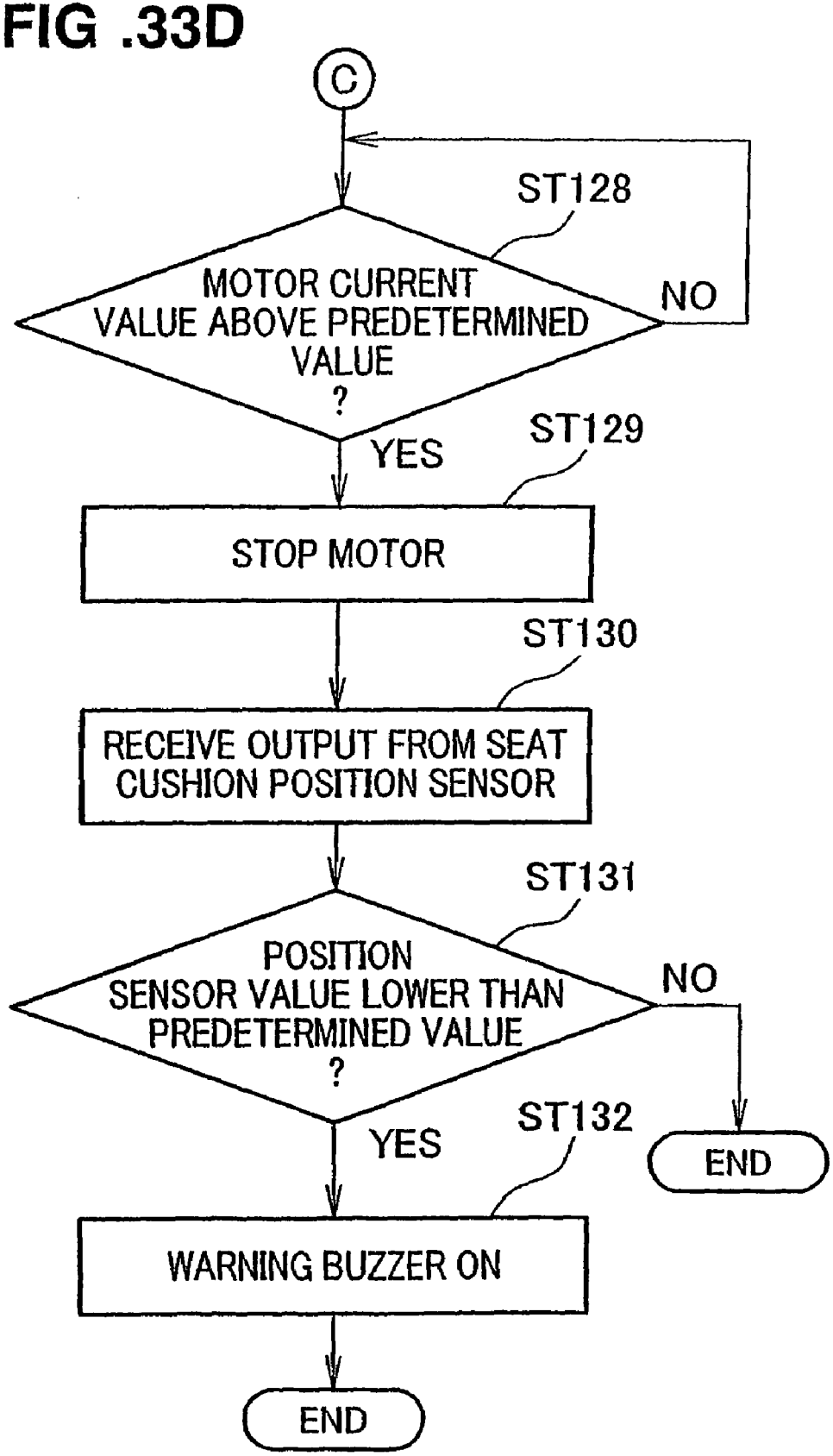

FIG. 31A, FIG. 31B and FIG. 31C show the basic operation of stowing a rear seat, and FIG. 32A and FIG. 32B show the basic operation of returning a stowed rear seat.

In the rear seat stowing operation, first, as shown in FIG. 31A the tailgate 146 is opened, and the user 145 tips the seat back 22 forward as shown in FIG. 31B by continuously pushing the stowing operation part 26a of the seat operating button 26.

After that, the forwardly tipped left seat back 22 and the seat cushion 21 are rotated together as shown in FIG. 31C and stowed in the floor recess 16, which is a stowing space. This series of operations is carried out by electric power.

Next, the operation of returning a seat stowed in the floor recess 16 will be described, on the basis of FIG. 32A and FIG. 32B.

First, as shown in FIG. 32A the tailgate 146 is opened, and the user 145 pushes the returning operation part 26b of the seat operating switch 26 continuously. From the stowed state wherein the left seat back 22 and the seat cushion 21 are stowed in the floor recess 16, which is a stowing space, the left seat back 22 and the seat cushion 21 rotate together and come out of the floor recess 16, and as shown in FIG. 32B the forwardly tipped left seat back 22 and seat cushion 21 return to their predetermined position on the floor 12. This series of operations is carried out under electrical power. After that, the left seat back 22 is returned by hand.

When during the operation of rotating the seat the user releases the switch, at that moment the rotating operation stops. Also, when an excessive load arises on the seat during the seat rotation operation, at that moment the rotating operation stops. When the excessive load is removed and the switch is operated again, the rotating operation resumes. When the seat rotation operation has stopped like this, by the buzzer and by the display lamp 152 on the instrument panel 150 being lit, the user is warned that the cushion is not locked.

Next, the operation of the control unit 36 when the rear seat 15 is stowed in the floor recess 16 will be described, on the basis of the flow chart shown in FIG. 33A through FIG. 33D. The program starts when the stowing operation part 26a of the seat operating button 26 shown in FIG. 3 is pushed with a finger to turn the stowing switch 37 ON.

ST110: First, it is determined whether or not the shift position of the AT is the Park position. When the shift position is not the Park position, execution of the program is ended. When the shift position is the Park position, processing proceeds to ST111.

ST111: It is determined whether or not the parking brake has been operated. When the parking brake has not been operated, execution of the program is ended. When the parking brake has been operated, processing proceeds to ST112.

ST112: The output from the tailgate sensor 378 is detected.

ST113: It is determined whether or not the tailgate 146 is open. When the tailgate 146 is not open, execution of the program is ended. When the tailgate 146 is open, processing proceeds to ST114.

Figure 34A:
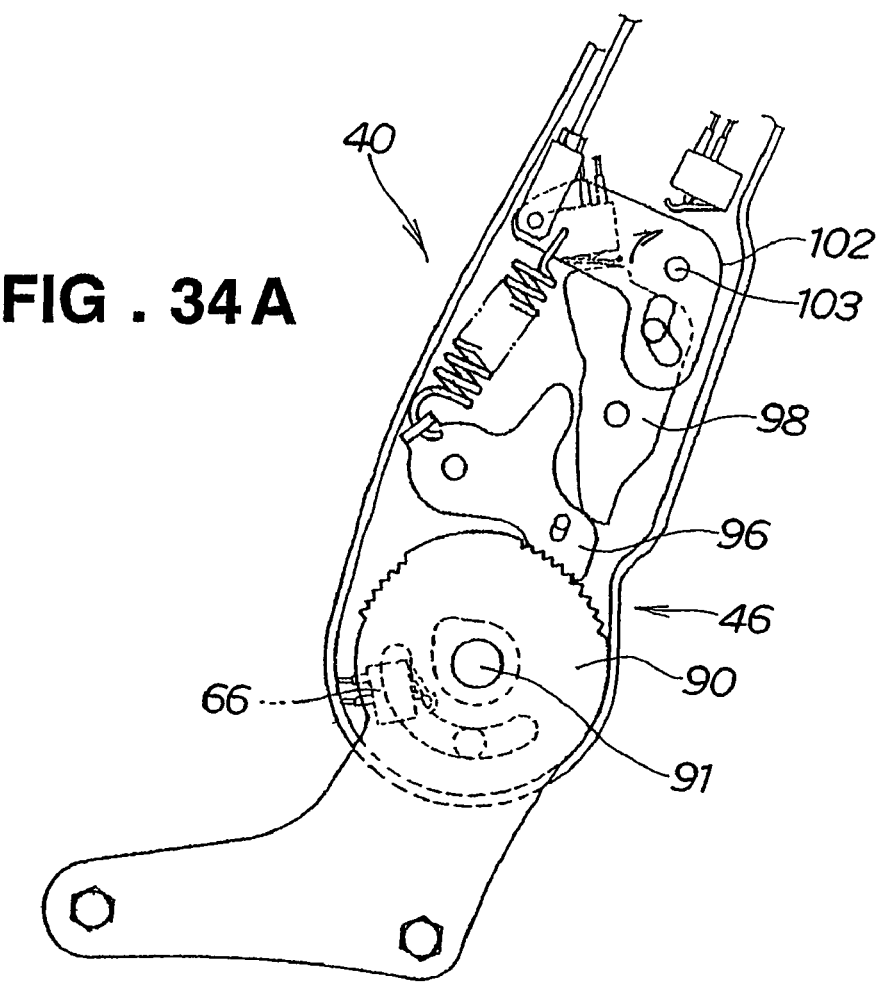
FIG. 34A and FIG. 34B are views showing actions of a reclining mechanism of when a seat back is tipped forward.
Figure 34B:
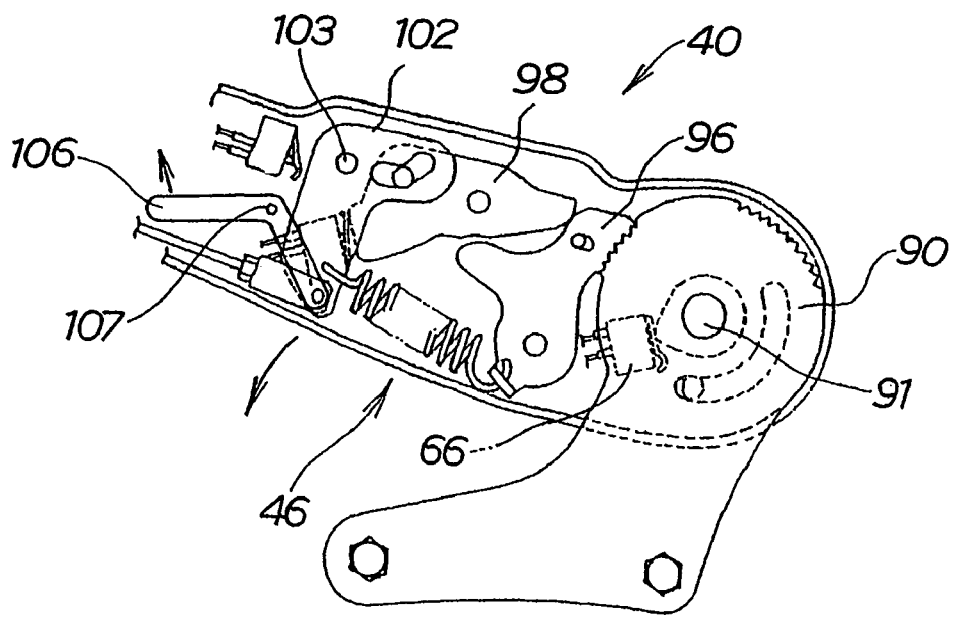

ST114: The actuator 70 of the unlocking means 47 is controlled to operate in its cable-pulling direction. This operation of the actuator 70 pulls the connecting cable 110. FIG. 34A shows the reclining mechanism 40 at this time, wherein one end of the upper swing lever 102 is pulled and the upper swing lever 102 pivots clockwise about the upper pin 103 as shown with an arrow. This pivoting of the upper swing lever 102 causes the lower swing lever 96 and the base 90 to unmesh and the lock mechanism 46 becomes unlocked. The reaction force of the spiral spring 49 (see FIG. 13B) causes the seat back 22 to tip forward in the forward direction of the vehicle body as shown in FIG. 34B.

ST115: It is determined whether or not the lock OFF sensing switch 67 has turned ON.

ST116: When the lock OFF sensing switch 67 turns ON, because the left lock mechanism 46 of the left reclining mechanism 40 is locked, the operation of the actuator 70 of the left unlocking means 47 is stopped.

ST117: It is determined whether or not the forward tip sensing switch 66 is ON.

ST118: The actuator 70 is operated in its cable-returning direction.

ST119: It is determined whether or not the upper Hall sensor 71 has turned ON.

ST120: When the upper Hall sensor 71 turns ON, the operation of the actuator 70 is stopped.

ST121: It is determined whether or not the lock ON sensing switch 65 has turned ON. If the lock ON sensing switch 65 turns ON, the seat back 22 completes tipping forward and becomes locked.

Next, the operation of rotating the seat back 22 and stowing it in the floor recess 16 will be described, on the basis of the flow chart of FIG. 33C and FIG. 33D, and FIG. 35, FIG. 36A and FIG. 36B.

First, a cushion unlocking operation is carried out, in accordance with the flow chart shown in FIG. 33C.

Figure 35:
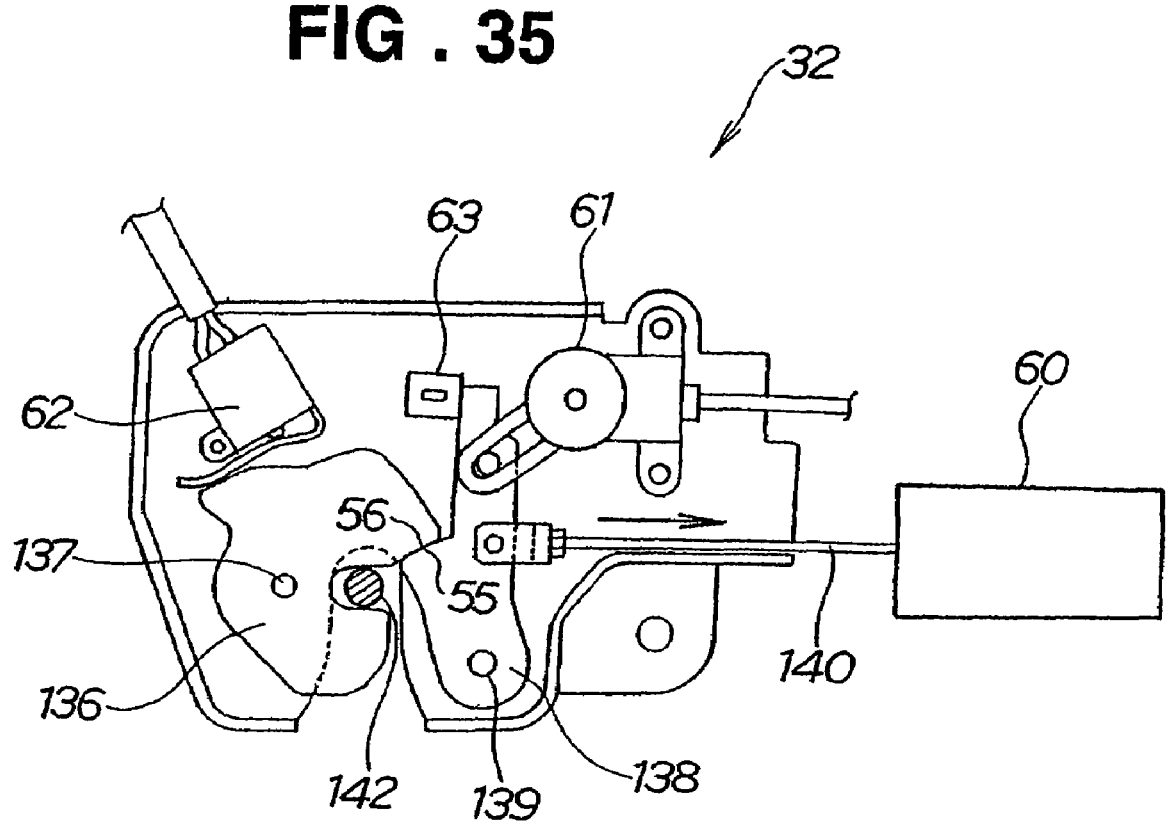
FIG. 35, FIG. 36A and FIG. 36B are views showing actions of cushion locking means being unlocked.
Figure 36A:
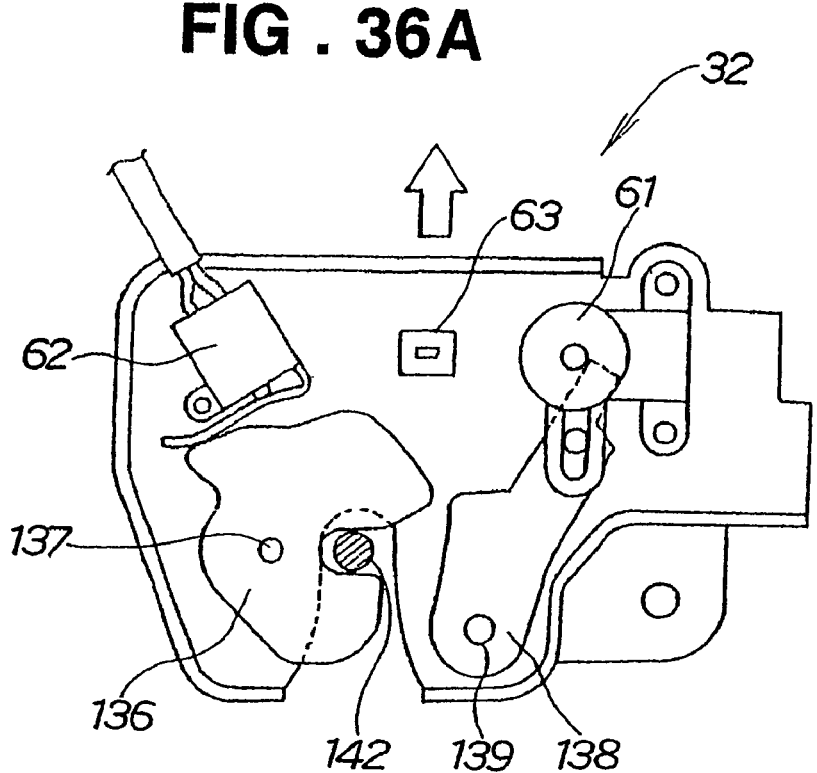

ST122: As described above, when it is detected that the lock ON sensing switch 65 is ON, as shown in FIG. 35 the cushion lock actuator 60 is operated to pull the operating rod 140 in the direction shown with an arrow. This operation of the cushion lock actuator 60 causes the ratchet 138 to pivot clockwise about the ratchet pin 139 as shown in FIG. 36A.

ST123: It is determined whether or not the release switch 61 has turned ON.

ST124: When the release switch 61 has turned ON, the operation of the cushion lock actuator 60 shown in FIG. 35 is stopped.

Figure 36B:
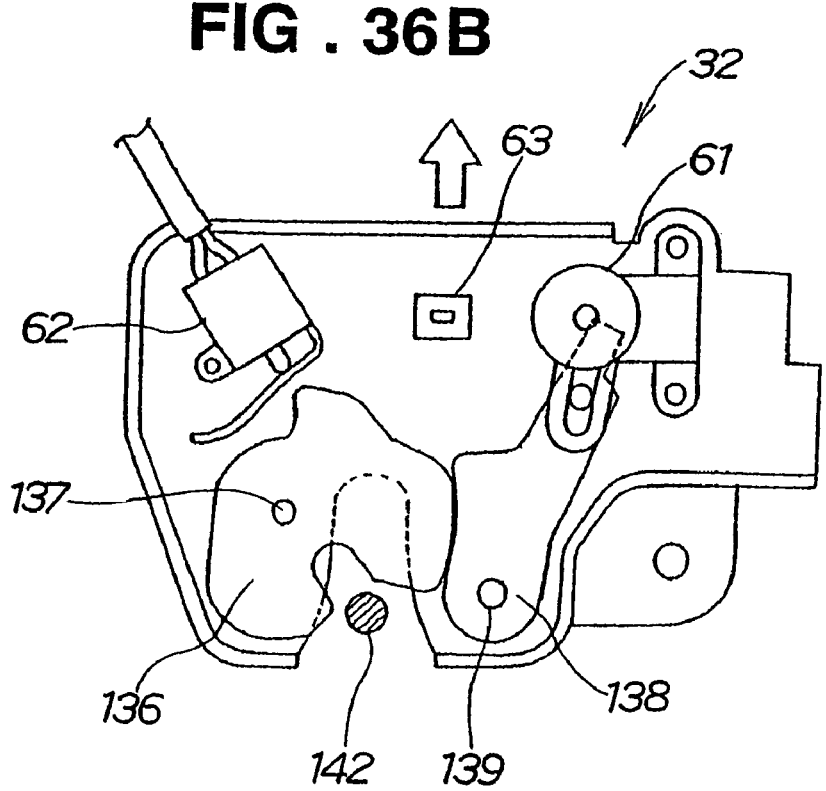

ST125: After the operation of the cushion lock actuator 60 is stopped, the drive motor 55 of the swinging means 30 shown in FIG. 3 starts. The drive of the drive motor 55 pivots the rear seat 15 in the direction in which it is stowed in the floor recess 16. Then, the latch 136 pivots as shown in FIG. 36B and disengages from the mounting bracket 53.

ST126: It is determined whether or not the latch switch 62 has turned ON.

ST127: When the latch switch 62 turns ON, the cushion lock actuator 60 operates to advance the operating rod 140. This advancing of the operating rod 140 turns the latch 136 counterclockwise about the ratchet pin 139 and returns it to its original state.

ST128: When the drive motor 55 is operating, it is determined whether or not the motor current value detected by the motor current detector 383 shown in FIG. 30 is above a predetermined value.

ST129: When the motor current value is above the pre-determined value, driving of the drive motor 55 is stopped. When the motor current value is smaller than the predetermined value, the drive motor 55 goes on being driven.

ST130: When the drive motor 55 stops, the output of the seat cushion position sensor 384 shown in FIG. 30 is detected.

Figure 37:
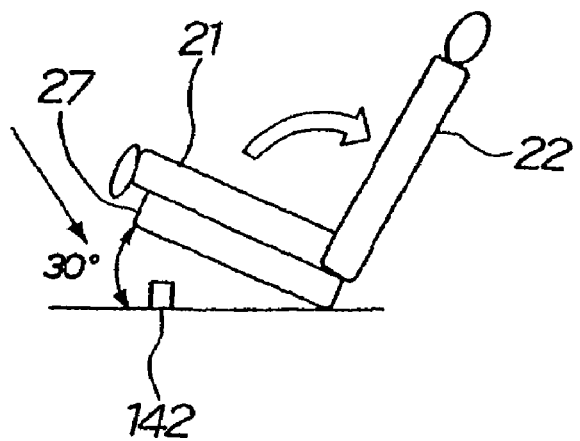
FIG. 37 is a view showing the position of a seat cushion when a warning buzzer buzzes.

ST131: It is determined whether or not the value detected by the seat cushion position sensor 384 is below a predetermined value (for example 30°) as shown in FIG. 37. When it is greater than the predetermined value, processing ends, and when it is smaller processing proceeds to ST132.

ST132: When the value detected by the seat cushion position sensor 384 is below the predetermined value, the warning buzzer 385 shown in FIG. 30 is sounded. For example the warning buzzer buzzes ten times intermittently.

Thus, in ST125, when the rear seat 15 rotates to its stowing position and stops, in ST128 the motor current detector 383 detects the motor current value, and when the motor current value is above a predetermined value due to motor load increase, in ST129 the rotating of the rear seat 15 is stopped. This completes the stowing of the rear seat 15 in the floor recess 16. The operation described above is executed only when the stowing switch 37 of the seat operating button 26 shown in FIG. 3 is ON, and when the seat operating switch 26 is turned OFF, execution is ended.

When the ignition switch 374 in FIG. 30 turns ON, the control unit 36 operates and receives an output from the seat cushion position sensor 384. Also, the control unit 36 receives an ON/OFF signal from the lock switch 63. If it is a predetermined value (for example less than 30°) of the kind shown in FIG. 37, that is, if the lock switch 63 is not ON, this is displayed on the display lamp 152 of the warning 386. By this means it is possible to avoid users sitting and traveling when the seat cushion 21 is not surely locked.

Figure 38A:
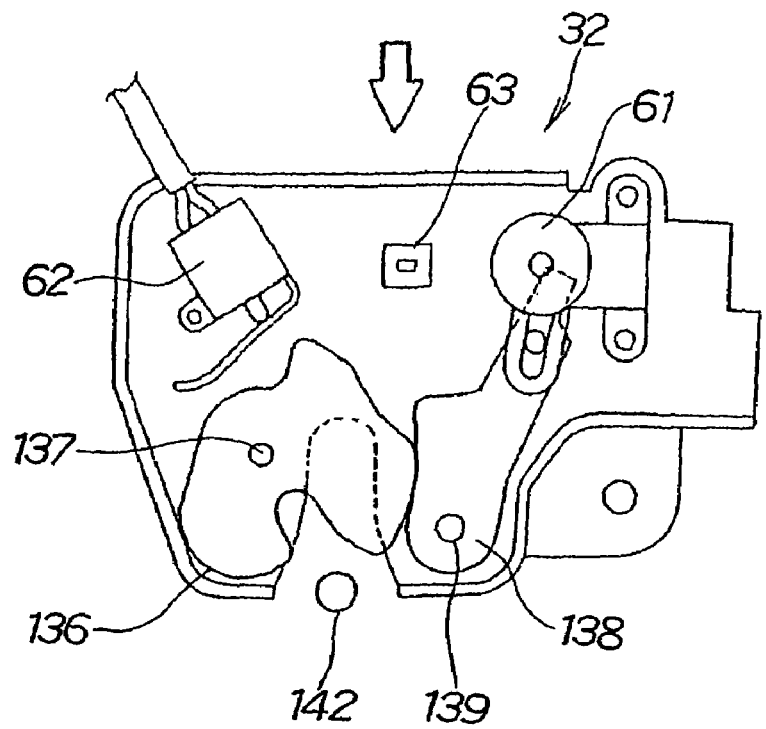
FIG. 38A and FIG. 38B are views showing actions of cushion locking means locking a seat cushion.
Figure 38B:
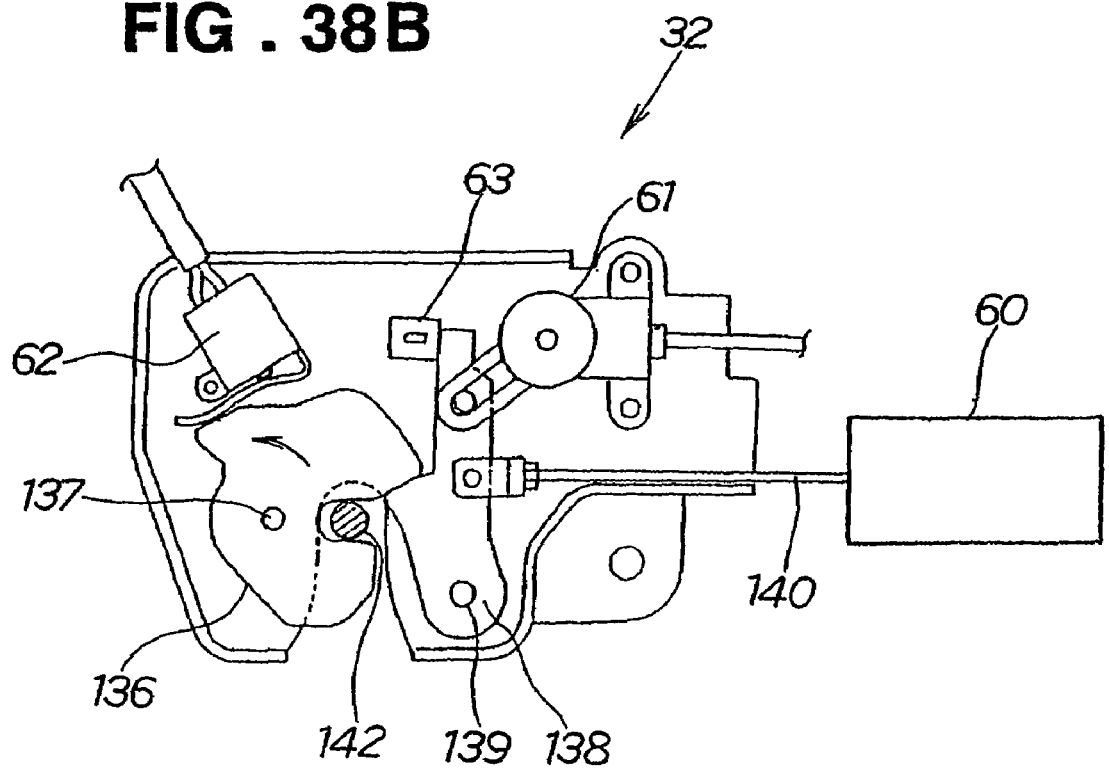

Next, the operation of the rear seat 15 moving from being stowed in the floor recess 16 to being tipped forward will be described, on the basis of the flow chart shown in FIG. 39 and of FIG. 38A and FIG. 38B.

ST340: It is determined whether or not the returning operation button (return switch) 26b of the seat operating button 26 is being pressed.

ST341: If the return switch 26b is ON, it is determined whether or not the shift position is the Park position. When the shift position is not the Park position, processing ends. When the shift position is the Park position, processing proceeds to ST342.

ST342: It is determined whether or not the parking brake is ON. When the parking brake is OFF, processing ends. When the parking brake is ON, processing proceeds to ST343.

ST343: The output from the tailgate sensor 378 shown in FIG. 30 is detected.

ST344: On the basis of the signal outputted from the tailgate sensor 378, it is determined whether or not the tailgate 146 shown in FIG. 1 is open. When the tailgate 146 is not open, processing ends. When the tailgate 146 is open, processing proceeds to ST345.

ST345: The drive motor 55 shown in FIG. 3 is driven to rotate in the return direction.

ST346: When the drive motor 55 has rotated in the seat return direction, it is determined whether or not the motor current value flowing through the drive motor 55 is above a predetermined value. When the motor current is below the predetermined value, processing proceeds to ST347 and the drive motor 55 continues to operate. When the motor current value is above the predetermined value, processing proceeds to ST348.

ST348: A stop signal is outputted to the drive motor 55, and the drive motor 55 stops.

ST349: A signal from the seat cushion position sensor 384 is received.

ST350: It is determined whether or not the detected value detected by the seat cushion position sensor 384 is below a predetermined value of the kind shown in FIG. 37 (for example 30°). When it is below the predetermined value, processing proceeds to ST351, and when it is above the predetermined value processing ends.

ST351: A signal is sent to the display lamp 152 warning 386 shown in FIG. 1, the display lamp 152 shown in FIG. 1 is lit or made to flash, and processing ends.

ST352: It is determined whether or not the latch switch 62 shown in FIG. 38A and FIG. 38B is OFF. That is, when the cushion locking means 32 shown in FIG. 38A descends as shown with an arrow, the latch 136 hits the striker 142 and as shown in FIG. 38B turns counterclockwise about the latch pin 137 as shown with an arrow. The latch 136 then abuts with the latch switch 62 and turns the latch switch 62 OFF.

ST353: It is determined whether or not the lock switch 63 is OFF. As the ratchet 138 returns as shown in FIG. 38B, the lock switch 63 turns OFF.

ST354: As a result of the lock switch 63 turning OFF, the rotational drive of the drive motor 55 is stopped. This stopping of the drive of the drive motor 55 results in the seat back 22 being in a forwardly tipped state with respect to the seat back 22, and the user pulls the left seat back 22 upright by hand.

As shown in FIG. 34B, with the seat back 22 tipped forward, the unlocking lever 106 is pivoted clockwise about the pin 107 as shown with an arrow. When this happens, one end of the upper swing lever 102 is pulled, and the upper swing lever 102 pivots clockwise about the upper pin 103. As a result of this pivoting of the upper swing lever 102, the intermediate swing lever 98 pivots counterclockwise about the intermediate pin 99, the lower swing lever 96 and the base 90 unmesh, and the lock mechanism 46 is unlocked.

After this left lock mechanism 46 is unlocked, the forwardly tipped seat back 22 is pulled upright by hand. When the left seat back 22 has reached the desired angle, the unlocking lever 106 is returned. Again the lock mechanism 46 becomes locked, and the left seat back 22 can be set at a desired angle of inclination.

After processing goes through ST351 and ends, when the ignition switch 374 turns ON, on the basis of a detection signal from the seat cushion position sensor 384 and an OFF signal from the lock switch 63, the control unit 36, if the angle of inclination of the seat cushion 21 is a predetermined value (for example below 30°) of the kind shown in FIG. 37, lights the display lamp 152 of the warning 386. Thus it is possible to avoid users sitting and traveling when the seat cushion 21 is not surely locked.

Also, when the ignition switch 374 has been turned ON, when it is detected by the forward tip sensing switch 66 that the left seat back 22 is forwardly tipped, a warning sound is emitted by the warning buzzer. Accordingly, the driver can avoid traveling with the left seat back 22 tipped forward.

Because the various mechanisms operate consecutively under the control of the control unit 36 like this, stowing and returning of the seat can be carried out just by operating the seat operating button 26.

Although in the embodiment described above an example was described wherein an operation of rotating the seat cushion 21 from the stowed state of the seat to a forwardly tipped state is carried out, alternatively, in a return to sitting step of returning the folded seat back 22 and the seat cushion 21 from the stowed state to a sitting state, the lock mechanism 46 of the left reclining mechanism 40 of the seat back 22 may be unlocked at a position where the seat cushion 21 has swung to a predetermined angle, for example 50°, and the motor drive force then applied only to the seat cushion 21.

Figure 40:
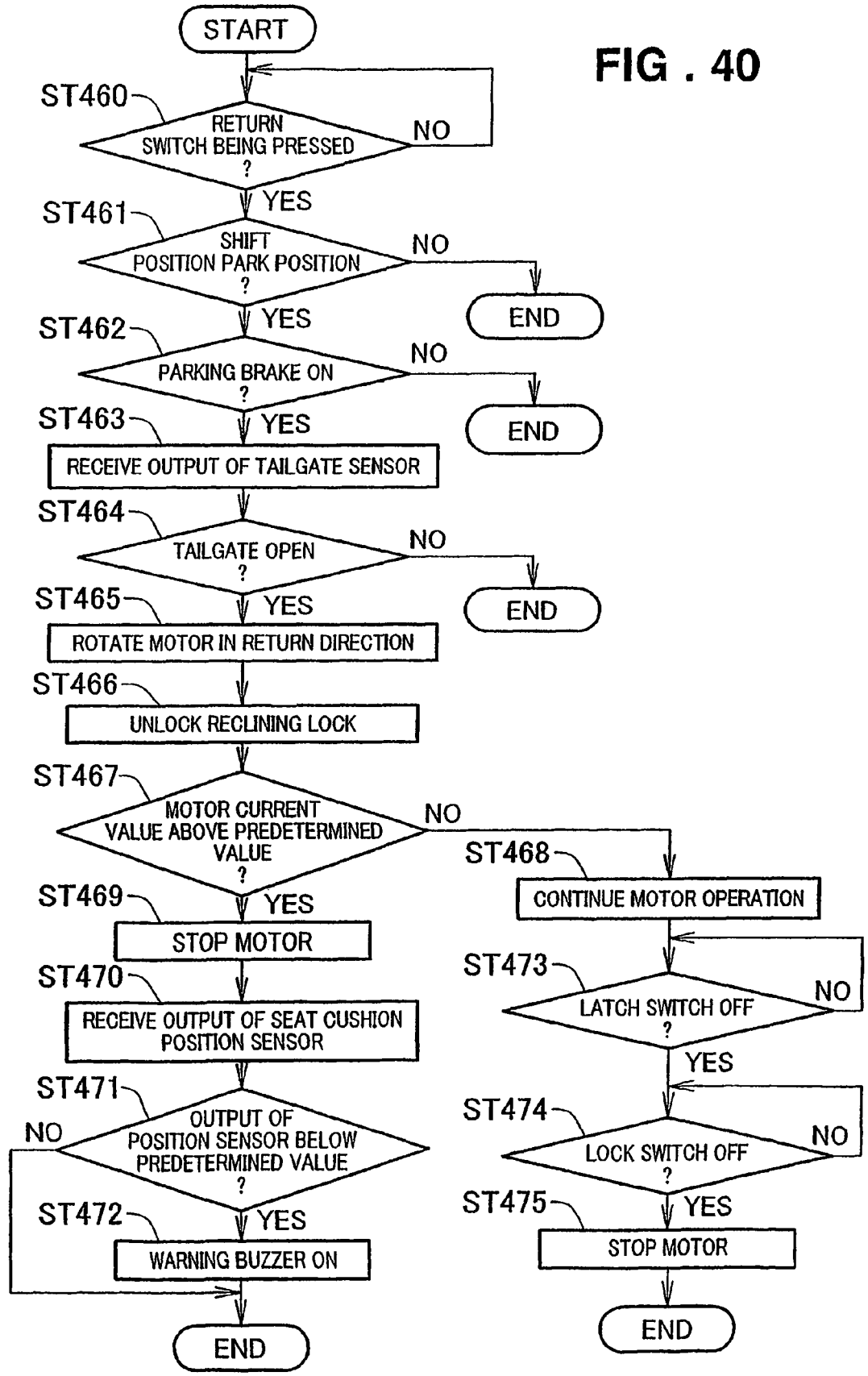
FIG. 40 is a flow chart showing the operation of a control unit when a seat is returned after a seat cushion has been rotated to a planned angle, and is another example of the operation shown in FIG. 39.

In this connection, next, an example of this kind of operation from a stowed state to a sitting return state will be described, on the basis of the flow chart shown in FIG. 40 and of FIG. 38A, FIG. 38B and FIG. 41A through FIG. 41C.

Figure 41A:
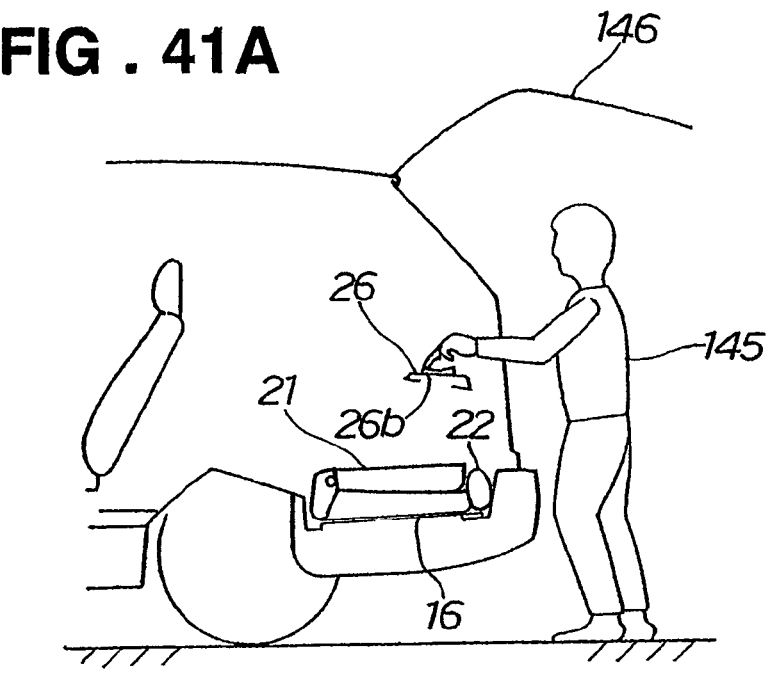
FIG. 41A through FIG. 41C are views showing movements of a seat in the operation shown in FIG. 40.

ST460: It is determined whether or not the return switch 38 is ON. As shown in FIG. 41A, with the seat back 22 and the seat cushion 21 folded and stowed in the floor recess 16, the return operation part 26b of the seat operating part 26 is pushed with a finger. This operation of the return operation part 26b turns ON the return switch 38.

ST461: It is determined whether or not the shift position is the Park position. When the shift position is not the Park position, processing ends immediately. When the shift position is the Park position, processing proceeds to ST462.

ST462: It is determined whether or not the parking brake is ON. When the parking brake is OFF processing ends. When the parking brake is ON, processing proceeds to ST463.

ST463: A signal from the tailgate switch 378 shown in FIG. 30 is received.

ST464: It is determined whether or not the tailgate 146 shown in FIG. 41A is open. When the tailgate 146 is not open, processing ends immediately. When the tailgate 146 is open, processing proceeds to ST465.

ST465: The drive motor 55 of the swinging means 30 shown in FIG. 3 is driven to rotate in the return direction.

ST466: When the detection value detected by the seat cushion position sensor 384 shown in FIG. 30 has reached 50°, the lock mechanism 46 is unlocked.

Figure 41B:
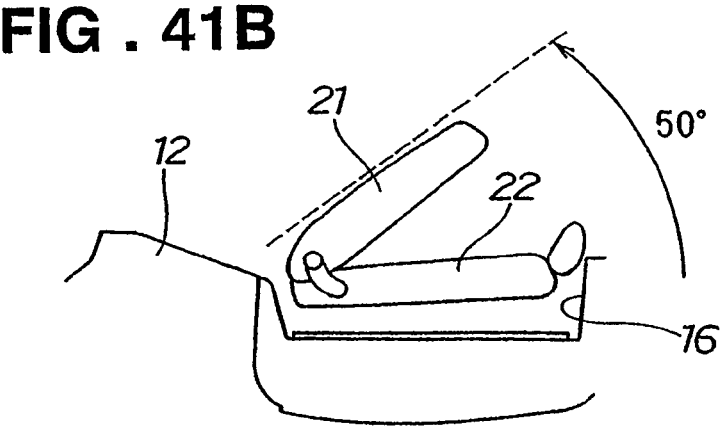

ST467: As a result of this unlocking, as shown in FIG. 41B, when the angle made by the seat cushion 21 and the floor 12 has become 50°, the seat back 22 falls downward away from the seat cushion 21 under its own weight. Then, it is determined whether or not the motor current value is above a predetermined value. When the motor current value is below the predetermined value, processing proceeds to ST468, and the drive motor 55 continues driving. When the motor current value is above the predetermined value, processing proceeds to ST469.

ST469: When the motor current value is above the predetermined value as mentioned above, a stop signal is outputted to the drive motor 55 and the drive motor 55 stops.

ST470: Then, a detection value from the seat cushion position sensor 384 is received.

ST471: It is determined whether or not the value from the seat cushion position sensor 384 is below a predetermined value (or example 30°) of the kind shown in FIG. 37. When it is above the predetermined value, processing ends immediately. When it is below the predetermined value, processing proceeds to ST472.

ST472: If it is below the predetermined value, a signal is outputted to operate the warning buzzer 385, and the warning buzzer 385 for example emits a warning sound ten times intermittently.

ST473: As a result of the drive motor 55 continuing to drive in ST468, from the state shown in FIG. 38A, the latch 136 is caused by the striker 142 to turn counterclockwise about the latch pin 137, and the latch switch 62 turns OFF.

ST474: It is determined whether or not the lock switch 63 is OFF. After it has been determined that the latch switch 62 is OFF in ST473, as shown in FIG. 38B the ratchet 138 returns to its initial position and the lock switch 63 turns OFF, and processing proceeds to ST475.

Figure 41C:
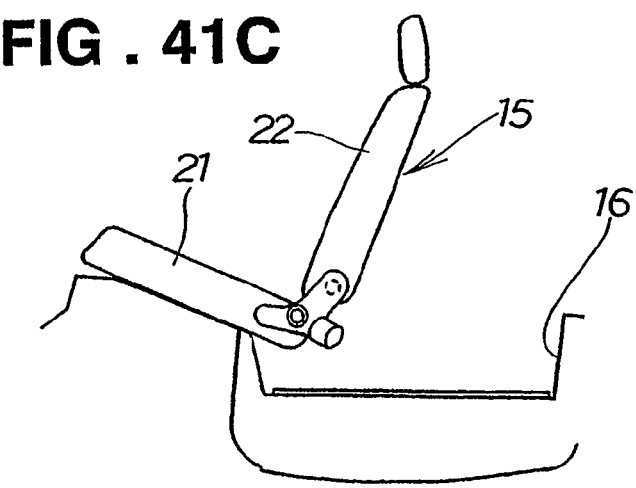
Figure 42:
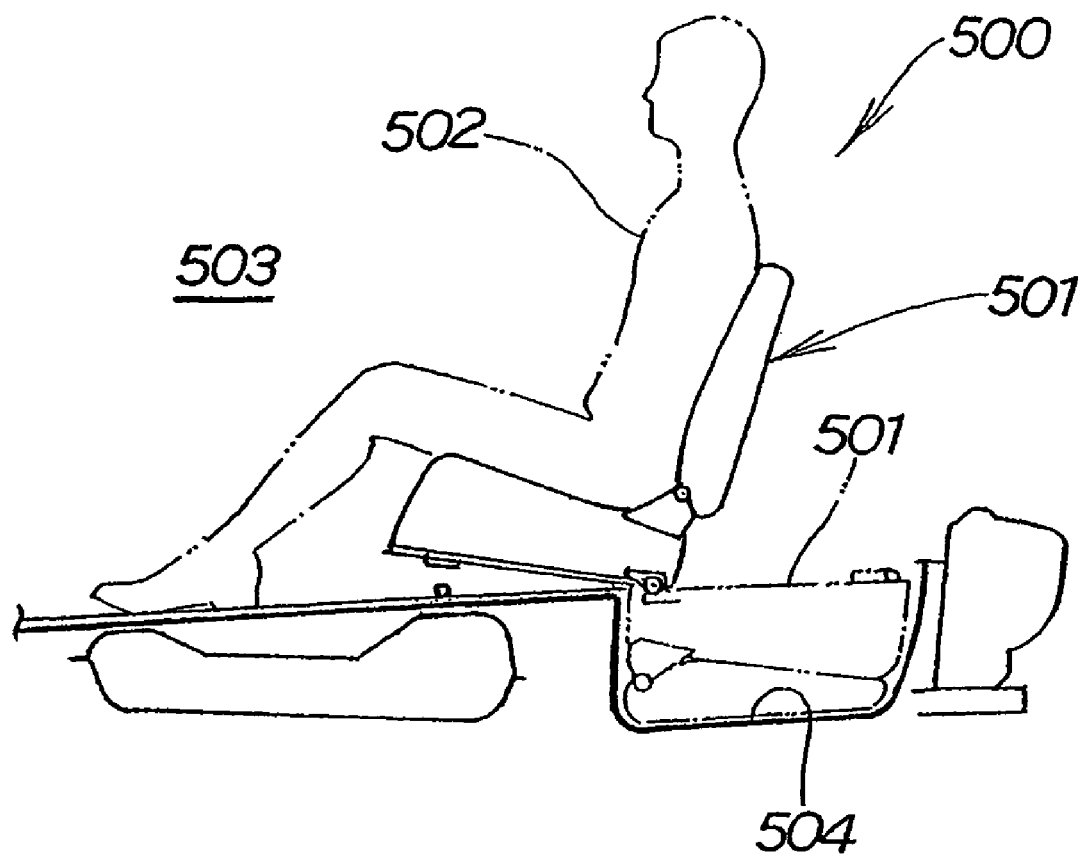
FIG. 42 is a schematic view showing a vehicle seat stowing system of related art.
Figure 43A:
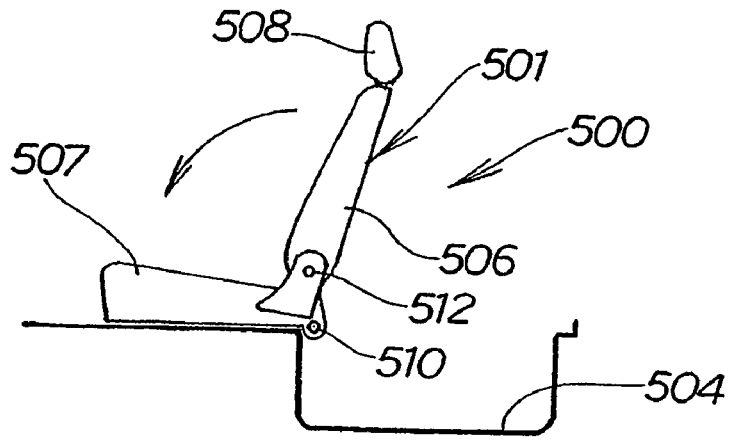
FIG. 43A through FIG. 43C are views showing actions of stowing in a floor recess a seat of a vehicle seat stowing system of related art.
Figure 43B:
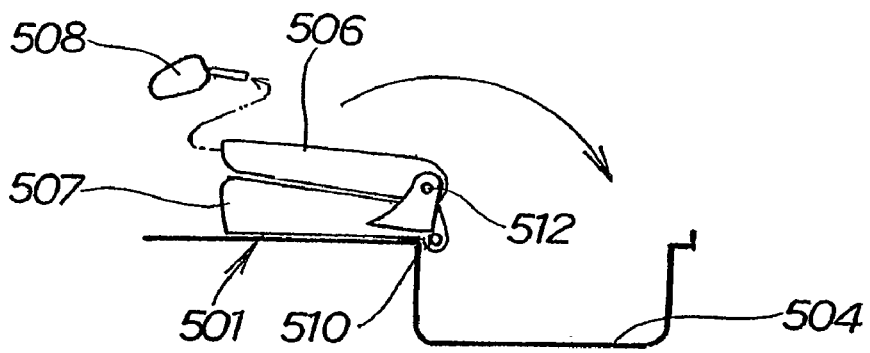
Figure 43C:
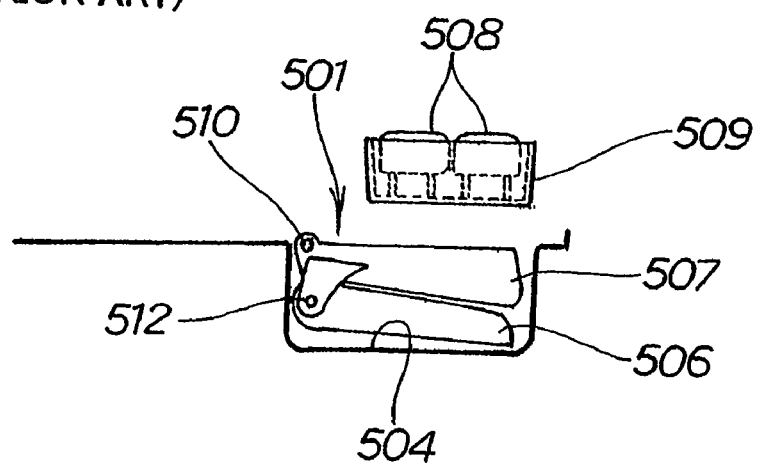

ST475: When the lock switch 63 turns OFF, the rotation of the drive motor 55 stops. As a result of the stopping of the rotation of the drive motor 55, as shown in FIG. 41C, the rear seat 15 becomes ready for sitting in.

Thus, after the rear seat 15 has been returned to a sitting position by the drive motor 55, because the seat back 22 is in position for sitting in, the work of pulling the seat back 22 upright by hand is unnecessary.

INDUSTRIAL APPLICABILITY

By making a system for stowing a rear seat in a floor recess formed behind it electric, the effort of the seat stowing task is reduced. Thus the invention is highly expedient for use in automotive vehicles and is useful.

The invention claimed is:

1. An electric stowing system for a vehicle seat for folding a seat back against a seat cushion and swinging the seat cushion and the seat back together and stowing them in a floor recess positioned behind the seat, the system comprising:
   seat back forward-tipping means for automatically tipping the seat back forward to fold it against the seat cushion;
   swinging means for automatically swinging the forwardly tipped seat back and the seat cushion as one and stowing them in the floor recess; and
   a control unit for controlling the operation of the seat back forward-tipping means and the swinging means.

2. The electric stowing system according to claim 1, wherein in returning the seat stowed in the floor recess to a sitting state, at a position where the seat cushion has swung to a predetermined angle a reclining lock of the seat back forward-tipping means is unlocked and a motor drive force is made to act only on the seat cushion.

3. The electric stowing system according to claim 1, wherein it further comprises a seat operating switch for ordering operation of the seat back forward-tipping means and the swinging means, and the seat operating switch is disposed behind the seat cushion.

4. The electric stowing system according to claim 1, wherein the control unit controls the seat cushion and the seat back to be operated automatically on the conditions that an automatic transmission of the vehicle is in a Park position, or a parking brake is operating, and a tailgate is open.

5. The electric stowing system according to claim 1, wherein the seat back forward-tipping means is incorporated into the seat back or the seat cushion.

6. The electric stowing system according to claim 1, wherein the control unit is incorporated into a central part of the seat cushion, outside of seating positions.

7. The electric stowing system according to claim 6, wherein it further comprises a dome-shaped cover member for covering an upper face of the control unit, wherein the cover member is incorporated into the seat cushion.

8. The electric stowing system according to claim 7, wherein a buckle for fastening a seat belt for passenger protection is disposed behind the cover member.

9. The electric stowing system according to claim 7, wherein the cover member has in its front end an opening through which can pass at least one harness extending from the control unit.

10. The electric stowing system according to claim 1, wherein it further comprises a seat operating switch for stowing a seat made up of the forwardly tipped seat back and the seat cushion in the floor recess, and the seat operating switch is disposed behind the rearmost seat and in the vicinity of the opening of the tailgate of the vehicle.

11. The electric stowing system according to claim 10, wherein the seat operating switch causes the operation of stowing the seat to proceed only while its ON state is maintained.

12. The electric stowing system according to claim 10, wherein when within the range of swing of the seat the seat has stopped, a warning is provided for a predetermined time.

13. The electric stowing system according to claim 10, wherein it further comprises a warning device for, when the seat cushion is not locked to the floor, warning that it is not locked, and the warning device is provided on the driver's side.

14. The electric stowing system according to claim 13, wherein the warning device is an indicator.

15. The electric stowing system according to claim 13, wherein the warning is provided when the seat is at an angle to the floor such that it can be sat upon.

16. The electric stowing system according to claim 10, wherein it further comprises a device for providing a warning sound when the seat back is in a forwardly tipped state.

17. The electric stowing system according to claim 10, wherein the swinging means comprises a drive motor, and a warning is provided when the motor current value of the drive motor is above a predetermined value.

18. The electric stowing system according to claim 17, wherein a coupling part of the drive motor has a slip clutch.

19. The electric stowing system according to claim 1, wherein the seat back forward-tipping means comprises:
   a reclining mechanism, having a spring for urging the seat back in a forward-tipping direction, which turns about a pivot shaft of the seat back; and
   unlocking means for unlocking the reclining mechanism.

20. The electric stowing system according to claim 19, wherein the reclining mechanism has unlocking means for unlocking the reclining mechanism manually.

21. The electric stowing system according to claim 19, wherein a one-way damper is provided between the seat cushion and the seat back so that a damper function acts with respect to the forward tipping direction of the seat back but the damper function does not act with respect to the return direction.

* * * * *